US 11,217,032 B1

United States Patent
Glazberg et al.

(10) Patent No.: US 11,217,032 B1
(45) Date of Patent: *Jan. 4, 2022

(54) AUGMENTED REALITY SKIN EXECUTIONS

(71) Applicant: Shmuel Ur Innovation LTD., Shorashim (IL)

(72) Inventors: Ziv Glazberg, Haifa (IL); Shmuel Ur, Shorashim (IL)

(73) Assignee: SHMUEL UR INNOVATION LTD, Shorashim (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,237

(22) Filed: Dec. 4, 2020

(51) Int. Cl.
  *G06F 3/0481* (2013.01)
  *G06T 19/00* (2011.01)
  *H04L 29/06* (2006.01)

(52) U.S. Cl.
  CPC ........ *G06T 19/006* (2013.01); *G06F 3/04815* (2013.01); *H04L 67/38* (2013.01)

(58) Field of Classification Search
  CPC .... G06T 19/006; G06F 3/04815; H04L 67/38
  See application file for complete search history.

(56) References Cited

U.S. PATENT DOCUMENTS

| 10,373,325 | B1* | 8/2019 | Karsch | G01B 11/2536 |
| 2016/0162748 | A1* | 6/2016 | Bastide | G06K 9/3266 |
| | | | | 345/633 |
| 2019/0180483 | A1* | 6/2019 | DeLuca | G06T 11/00 |
| 2020/0302664 | A1* | 9/2020 | Lee | G06T 5/20 |

* cited by examiner

*Primary Examiner* — Jitesh Patel

(57) ABSTRACT

A method, system and product including obtaining a frame from a frame sensor of an Augmented Reality (AR) system comprising an AR device; executing a first skin on the frame or portion thereof to obtain a first overlay; executing a second skin on the frame or portion thereof to obtain a second overlay, wherein the first and second skins are configured to provide an augmented overlay to be used by the AR system in determining an AR view, wherein said executing the second skin is performed without providing the first overlay to the second skin; determining whether the second overlay can be utilized for providing the AR view; generating the AR view based on the first overlay and based on said determining whether the second overlay can be utilized for providing the AR view; and providing the AR view via the AR device.

20 Claims, 16 Drawing Sheets

AUGMENTED REALITY SKIN EXECUTIONS

TECHNICAL FIELD

The present disclosure relates to Augmented Reality (AR) systems in general, and to systems, products, and methods for executing AR skins, in particular.

BACKGROUND

Augmented Reality (AR) technology has not yet fulfilled its expectations. Lack of Internet Protocols (IP) that can support the high bandwidth, the expense of high quality hardware, and low latency requirements as well as privacy concerns of people are holding wide adoption.

Some AR applications may depend on changing captured images in an augmented reality experience. For example, an AR application may change people's hair, transform cat images to dog images, or the like.

As the consumers of such streams may be mobile and as AR applications may be required to have a large bandwidth and a low latency for an enhanced user experience, Fourth Generation (4G) mobile networks may not fulfill this requirement since they are too slow and have a latency that is not small enough. Fifth Generation (5G) mobile networks may fulfill the connectivity requirements since they have a bandwidth of 10 Giga bits per second (Gbps) and a latency of 1 millisecond. Alternatively, instead of using a large bandwidth for connectivity purposes, AR applications may be used at a self-sufficient AR device without enhanced connectivity. However, such a device may require much computational and power resources.

BRIEF SUMMARY

One exemplary embodiment of the disclosed subject matter is a method performed by an Augmented Reality (AR) system, wherein the AR system is configured to provide an AR view, wherein the AR system comprises an AR device and at least one frame sensor, wherein the AR system is configured to utilize a first skin and a second skin, each of which is configured to provide an augmented overlay to be used by the AR system in determining the AR view, wherein the first and second skins are configured to process an augmented display according to a skin execution order, wherein the skin execution order defines that the second skin processes an augmented overlay provided by the first skin. The method comprises: obtaining a frame from the at least one frame sensor; executing the first skin on the frame or portion thereof to obtain a first overlay; executing the second skin on the frame or portion thereof to obtain a second overlay, wherein said executing the second skin is performed without providing the first overlay to the second skin; determining whether the second overlay can be utilized for providing the AR view; generating the AR view based on the first overlay and based on said determining whether the second overlay can be utilized for providing the AR view; and providing the AR view via the AR device.

Optionally, determining whether the second overlay can be utilized for providing the AR view comprises determining whether the first and second overlays are inconsistent with each other.

Optionally, upon determining that the first and second overlays are inconsistent with each other, the second overlay is modified based on the first overlay to obtain a modified second overlay, wherein said generating the AR view comprises utilizing the modified second overlay.

Optionally, modifying the second overlay comprises amending pixels of the second overlay, regenerating the second overlay by executing the second skin on the first overlay, or the like.

Optionally, upon determining that the first and second overlays are consistent with each other, the second overlay is utilized, without modifications, for generating the AR view.

Optionally, determining whether the first and second overlays are inconsistent with each other comprises utilizing first metadata of the first overlay or the first skin, and second metadata of the second overlay or the second skin.

Optionally, determining whether the first and second overlays are inconsistent with each other comprises identifying overlapping pixels between the first and second overlays.

Optionally, said executing the first skin and said executing the second skin are performed in parallel, simultaneously, in overlapping timeframes, or the like.

Optionally, said executing the first skin is performed at a first execution platform and said executing the second skin is performed at a second execution platform.

Optionally, the method comprises determining, based on a predictor, whether to perform said executing the second skin, wherein the predictor is configured to predict a probability that the first overlay will be inconsistent with the second overlay.

Optionally, the method comprises performing a partial execution of said executing the second skin, wherein said partial execution comprises generating a partial second overlay that is predicted to have a low probability of being inconsistent with the first overlay, wherein said generating the AR view comprises utilizing the first overlay, utilizing the partial second overlay, and completing execution of the second overlay based on the first overlay.

Optionally, the second skin is registered on an object type; the frame comprises a first object of the object type and a second object of the object type; the second overlay comprises a first sub overlay and a second sub overlay, the first sub overlay is an output provided by the second skin in response to processing the first object, wherein the second sub overlay is an output provided by the second skin in response to processing the second object; wherein said determining whether the second overlay can be utilized for providing the AR view comprises: determining that the first sub overlay is consistent with the first overlay; determining that the second sub overlay is inconsistent with the first overlay; and determining a third sub overlay based on the first overlay, wherein the third sub overlay is an overlay for the second object, wherein the third sub overlay is consistent with the first overlay; wherein said generating the AR overlay for the frame is based on the first sub overlay and on the third sub overlay.

Optionally, said determining whether the second overlay can be utilized for providing the AR view comprises: determining, based on the first overlay, that the second overlay is inconsistent with the first overlay; wherein said generating comprises executing again the second skin based on the frame and on the first overlay to obtain a new second overlay; and wherein said generating the AR overlay for the frame is based on the new second overlay.

Optionally, said executing the first skin is performed at a first execution platform; wherein the method further comprises executing the first skin on a second execution platform to obtain a shadow overlay; wherein said executing the second skin is performed at the second execution platform based on the shadow overlay.

Optionally, the method comprises obtaining a first order of execution, wherein the first order of execution defines an order of skin executions of a plurality of skins comprising the first and second skins, wherein the plurality of skins are registered on a same object in the frame, wherein the first order of execution comprises the skin execution order; obtaining a second order of execution between the plurality of skins, wherein the second order of execution defines that the second skin is to be executed before the first skin; executing the plurality of skins according to the first order of execution to obtain a first result; executing the plurality of skins according to the second order of execution to obtain a second result; and based on a determination that the first and second results are identical, determining that the first order of execution is replaceable with the second order of execution. The method of Claim 16 comprising determining that the second order of execution utilizes less resources than the first order of execution, and based on said determining, setting the second order of execution for executing skins instead of the first order of execution.

Optionally, the method comprises obtaining priority rankings of the plurality of skins, wherein the priority rankings indicate that the first skin has a higher priority than the second skin, and upon determining that execution of the first skin and the second skin utilizes resources that exceed a threshold, refraining from executing the second skin.

Optionally, the method comprises determining to perform speculative execution of the second skin prior to availability of the first overlay; and wherein said executing the second skin that is performed without providing thereto the first overlay is contingent on said determining to perform the speculative execution.

Optionally, the second skin is configured to be executed on a first execution platform, a first latency of a communication between the AR device to the first execution platform is above a threshold, a second latency of a communication between the AR device and a second execution platform is below the threshold; said determining whether the second overlay can be utilized for providing the AR view comprises determining that the second overlay cannot be utilized for providing the AR view; said executing the second skin comprises executing the second skin on the second execution platform; and said generating the AR overlay for the frame is based on the second overlay.

Optionally, the method comprises performing object recognition on the frame to obtain one or more object types; determining a refresh timeframe; obtaining one or more subsequent frames from the at least one frame sensor during the refresh timeframe; estimating that the one or more subsequent frames comprise the one or more object types; and utilizing the one or more object types for the processing the one or more subsequent frames without performing object recognition to the one or more subsequent frames during the refresh timeframe.

Optionally, the method comprises reducing a resolution level of the frame prior to said executing the first skin, thereby providing to the first skin a low-resolution frame; executing the first skin on the low-resolution frame; and restoring the resolution level after said executing the first skin.

Optionally, the method comprises distributing execution to an edge device in proximity of the AR device, wherein the edge device has one or more sensors, wherein said distributing comprises providing partial information of the frame to the edge device, thereby enabling the edge device to complete the partial information based on the one or more sensors.

Optionally, the method comprises distributing executions of the first and second skins to one or more execution platforms based on a policy, wherein the policy is configured to determine an execution schedule for executing the frame by the first and second skins, wherein the execution schedule defines for each patch of the frame a corresponding execution platform from the one or more execution platforms, wherein the execution schedule defines for each patch of the frame an execution timing, wherein the execution schedule complies with one or more constraints of the one or more execution platforms and with one or more constraints of the frame, wherein the execution schedule is configured to reduce resource utilization.

Optionally, the method comprises determining an estimated execution time for the frame, wherein the estimated execution time is determined based on a plurality of identified objects in the frame and based on corresponding layers that are registered on each of the identified objects, wherein said determining the estimated execution time comprises determining for each identified object corresponding execution times of registered layers that are registered on the each identified object.

Optionally, upon identifying that an object of the plurality of identified objects has an execution time that is greater than execution times of remaining objects from the plurality of the identified objects, determining that the object is an execution bottleneck, and distributing execution of registered layers that are registered on the object to an execution platform, wherein the execution platform is configured to have greater computational resources than the AR device.

Optionally, the method comprises upon determining that execution of the first skin utilizes resources that exceed a threshold, executing a limited version of the first skin.

Optionally, the method comprises determining that the first and second skins are real-world skins that utilize real-world frames, and executing the first and second skins on the frame simultaneously based on said determining.

Optionally, the method comprises determining that the first skin is a real-world skin that utilizes real-world frames, and that the second skin is not a real-world skin, wherein the first overlay from the first skin comprises a real-world alert of a real-world object in the frame, and determining whether to utilize the second overlay based on whether the second overlay is inconsistent with the alert or with the real-world object.

Optionally, the method comprises reducing a resolution level of a first portion the frame prior to executing the first and second layers on the frame; obtaining a subsequent frame from the at least one frame sensor; and reducing a resolution level of a second portion the subsequent frame prior to executing layers on the subsequent frame, wherein the first and second portions comprise different coordinate areas in a frame structure.

Optionally, the method comprises reducing a resolution level of a first portion the frame prior to executing the first layer on the frame; and reducing a resolution level of a second portion the frame prior to executing the second layer on the frame, wherein the first and second portions comprise different areas of the frame.

Optionally, the method comprises segmenting the frame into two or more patches; distributing executions of the two or more patches to two or more execution platforms based on an execution schedule; obtaining from the two or more execution platforms two or more corresponding overlays; and combining the corresponding overlays to generate the AR view.

Another exemplary embodiment of the disclosed subject matter is computer program product comprising a non-transitory computer readable storage medium retaining program instructions, which program instructions when read by a processor, cause the processor to: obtain a frame from at least one frame sensor of an Augmented Reality (AR) system comprising an AR device and the at least one frame sensor; execute a first skin that is configured to be utilized by the AR system, on the frame or portion thereof to obtain a first overlay; execute a second skin that is configured to be utilized by the AR system, on the frame or portion thereof to obtain a second overlay, wherein the first and second skins are configured to provide an augmented overlay to be used by the AR system in determining an AR view, wherein said execute the second skin is performed without providing the first overlay to the second skin; determine whether the second overlay can be utilized for providing the AR view; generate the AR view based on the first overlay and based on said determine whether the second overlay can be utilized for providing the AR view; and provide the AR view via the AR device.

Yet another exemplary embodiment of the disclosed subject matter is a system comprising a processor and coupled memory, the processor being adapted to: obtain a frame from at least one frame sensor of an Augmented Reality (AR) system comprising an AR device and the at least one frame sensor; execute a first skin that is configured to be utilized by the AR system, on the frame or portion thereof to obtain a first overlay; execute a second skin that is configured to be utilized by the AR system, on the frame or portion thereof to obtain a second overlay, wherein the first and second skins are configured to provide an augmented overlay to be used by the AR system in determining an AR view, wherein said execute the second skin is performed without providing the first overlay to the second skin; determine whether the second overlay can be utilized for providing the AR view; generate the AR view based on the first overlay and based on said determine whether the second overlay can be utilized for providing the AR view; and provide the AR view via the AR device.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
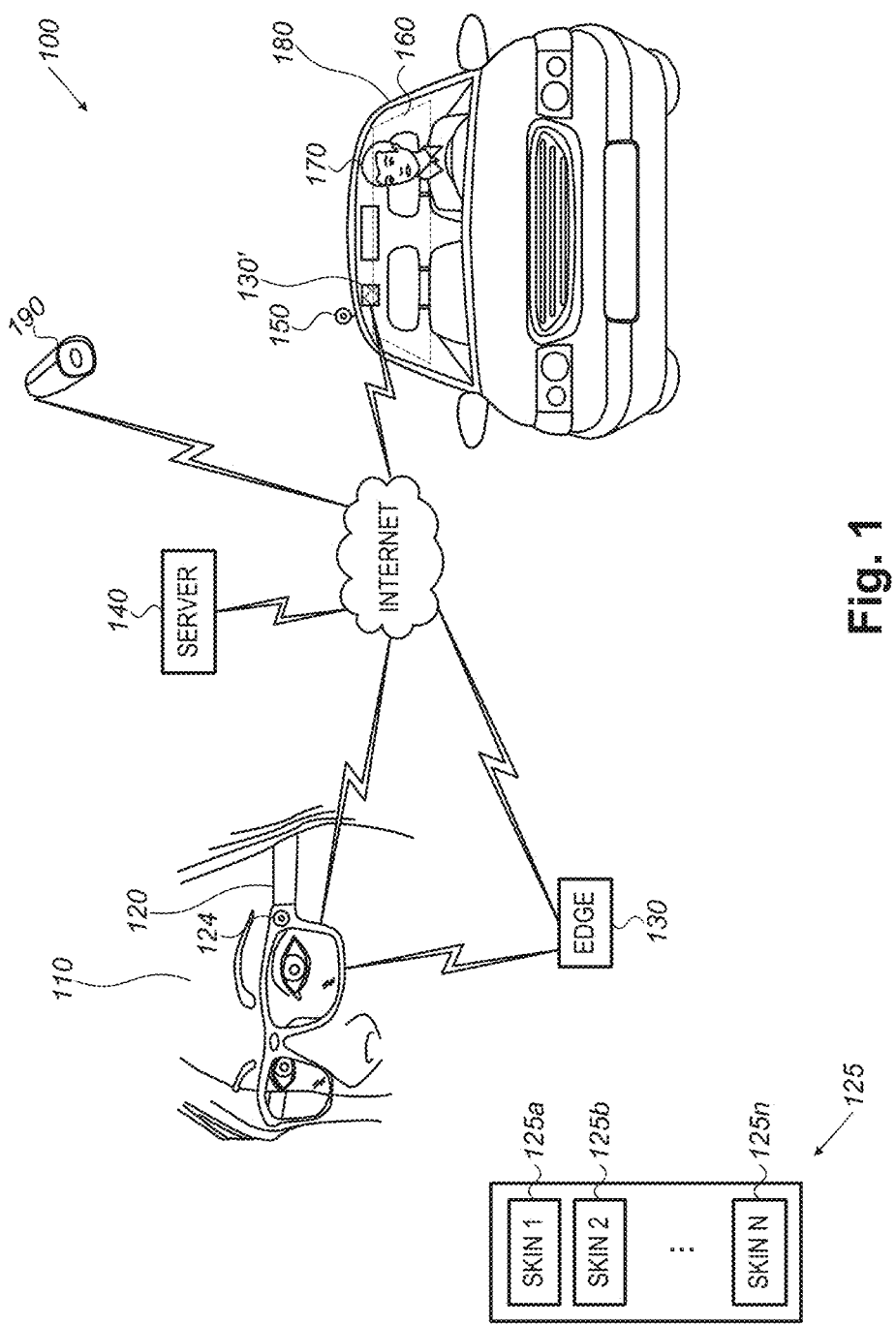
FIG. 1 shows a schematic illustration of an exemplary environment and architecture in which the disclosed subject matter may be utilized, in accordance with some exemplary embodiments of the disclosed subject matter.

One technical problem dealt with by the disclosed subject matter is providing to a user an enhanced Augmented Reality (AR) experience, e.g., to provide a low-latency AR experience, a reliable AR experience, or the like. In some exemplary embodiments, an AR experience may be generated by obtaining visual information, processing the visual information by executing software or firmware layers referred to as skins (also referred to as "layers", "applications", and "filters") thereon, and displaying an output AR view. In some exemplary embodiments, skins may be relatively small pieces of software or firmware, a software application, or the like, that may be configured to change objects in a frame, add objects to a frame, add labels to objects, add descriptive elements to objects, or the like. In some exemplary embodiments, a skin may be registered to one or more object types of interest, e.g., a human object, a cat, a human nose, or the like. As an example, skins may be used to identify humans and display their identification information near them, to replace cats with dogs, to enhance an esthetic appearance of the user's surroundings, to modify viewed humans to be seen without their clothes, to replace a first type of advertisement with a second type of advertisement, or the like. In some exemplary embodiments, a user of an AR device may select skins or filters as he desires, and they may be activated all at once, e.g., upon identifying registered objects by the AR device, continuously, periodically, upon identifying an event, upon obtaining a user activation instruction, or the like. For example, a skin may not share with the AR device a target object type, e.g., for privacy reasons, and thus may continuously search for the object type itself without relying on the object recognition of the AR device. In some exemplary embodiments, the skins may be obtained, installed, selected, or the like, from a skin store, an application store, a web source, a network source, or the like. In some exemplary embodiments, a platform may be configured to process a captured frame or image in real time, recognize objects in the frame, and provide each object or patch thereof to the relevant skins.

In some exemplary embodiments, visual information may be initially processed to identify types of objects, e.g., using one or more object recognition techniques, and each skin that is registered on an identified object type may be applied thereto. The AR framework may support a variety of objects types, such as but not limited to a person, an animal, a cat, a house, a road, a plant, a tree, a face, an eye, or the like. In some exemplary embodiments, an object may comprise other objects. As an example, an object of type person may comprise objects of types face, eyes, arms, clothes, or the like. In some exemplary embodiments, a skin may be configured to process a patch of a frame, an object in the frame, an entire frame, or the like. In some exemplary embodiments, a frame patch may refer to a portion of a frame that may be provided to one or more skins or execution platforms. In some exemplary embodiments, each skin may register on one or more object types, frame portions, or the like, and be applied only to objects of those types. In some exemplary embodiments, a skin may be configured to provide an AR overlay for an AR system, AR device, or the like, to be used to construct an AR view for the user.

In some exemplary embodiments, in case that more than one skin is registered on a same identified frame object or frame portion, on different objects that have one or more overlapping portions, on non-overlapping objects that cannot be processed simultaneously, or the like, the skins may be executed sequentially according to an order, which may slow down the system. In some exemplary embodiments, the order may affect the outcome. For example, an object of type "cat" may be registered to a first layer that colors the cat in purple, and to a second layer that replaces the cat's head with a dog's head. According to this example, changing the order of the layers may provide different results; in one order the dog's head will be purple, and in the other order the dog's head will not be colored. It may be desired to obtain the original output that is a result of executing the registered layers according to the defined order, while reducing a latency that results from the sequential manner of processing.

One technical effect of utilizing the disclosed subject is reducing a latency of executing skins for the AR view. In some exemplary embodiments, the disclosed subject matter enables to run in non-sequentially two or more subsequent skins that are registered on a same frame portion, instead of processing the skins sequentially. Additionally or alternatively, the disclosed subject matter enables to run shadow layers on different platforms in order to reduce a communication period, which in some cases may be totally eliminated due to the usage of the shadow layer. In some exemplary embodiments, implementing the disclosed subject matter may save time, reduce an overhead, and enhance an AR experience due to providing AR functionality with a lower latency.

Another technical problem dealt with by the disclosed subject matter is saving computational and power resources of an AR device. It may be desired to enhance a speed and reduce battery usage of the AR device, e.g., without compromising on the user experience. In some exemplary embodiments, the AR device that the user is using may be limited in terms of central processing unit (CPU), battery, or the like. The CPU of the AR device may not be fast enough to execute a large number of skins simultaneously, per frame, in compliance with strict latency requirements, or the like. Additionally or alternatively, executing a skin may require graphical calculations that may cause high power consumption resulting in battery drain. It may be desired to find an enhanced distribution of execution platforms and an enhanced order of execution at each device. An enhanced execution distribution may be enhanced in terms of latency and execution time, while complying with one or more constraints.

One technical solution for reducing a latency of an AR experience is to execute one or more skins that are registered on a same or overlapping object simultaneously, in parallel, without waiting for an overlay input from pervious skins, or the like. In some exemplary embodiments, an AR system may be configured to provide an AR view, e.g., as part of an AR experience. In some exemplary embodiments, the AR system may comprise at least one AR device, e.g., wearable or non-wearable, one or more frame sensors configured to capture visual input, or the like.

In some exemplary embodiments, the AR device may be configured to communicate with the frame sensors to obtain visual information, to process the visual information using one or more layers, and to display to the user the resulting AR view. In some exemplary embodiments, the AR device may comprise at least a first skin and a second skin, which may each be configured to provide an augmented overlay to be used by the AR system in determining the AR view. For example, in case the first layer is configured to replace cats with dogs, and the second layer may be configured to color noses red, a first overlay from the first layer may comprise a dog that is to replace a depicted cat object, and a second overlay from the second layer may color the dog's nose red.

In some exemplary embodiments, since more than one layer may be applied to a same object or frame patch, a skin execution order between registered skins defining an order for processing an augmented display may be determined, defined, obtained, or the like. In some exemplary embodiments, the skin execution order may define that in case the first and second skins are registered on a same object, the first skin is to be executed first and the second skin is to be executed subsequently, or vice versa. In some exemplary embodiments, the skin execution order may define that in case the first skin is to be executed before the second skin, the first skin may be configured to provide to the second skin an augmented overlay, and the second skin may be configured to process the augmented overlay as an input.

In some exemplary embodiments, the frame sensor may capture one or more frames, images, or the like. In some exemplary embodiments, the AR device may obtain a frame from the frame sensor of the AR system. In some exemplary embodiments, the frame captured by the frame sensor may depict one or more identified objects, portions, or the like, each of which may have one or more registered layers, skins, or the like. In some exemplary embodiments, in case the frame comprises portions with a single registered layer, the single registered layers may be executed in parallel. In some exemplary embodiments, in case the frame comprises overlapping portions or objects with at least two registered skins, the layers may be required to comply with the order of execution dictating the order between the registered layers.

In some exemplary embodiments, the frame may depict one or more overlapping portions or objects that are registered by both the first and second layer. For example, in case the first layer is registered on noses and the second layer is registered on human faces, a human object that comprises both a face and a nose may be considered an overlapping object having overlapping portions. In some exemplary embodiments, based on identifying that the first and second layers are registered on an overlapping portion, instead of utilizing the skin execution order, a different execution policy may be performed.

In some exemplary embodiments, the first skin may be executed on the registered portion of the frame, thereby obtaining a first overlay. In some exemplary embodiments, the second skin may be executed on the registered portion of the frame, thereby obtaining a second overlay, e.g., without obtaining the first overlay from the first skin. In some exemplary embodiments, the executions of the first and second skins may be performed simultaneously, in parallel, without waiting for an overlay input from pervious skins, or the like.

In some exemplary embodiments, before combining the overlays to obtain the AR view, the AR device may determine whether the second overlay can be utilized for providing the AR view. In some exemplary embodiments, based on whether the second overlay can be utilized for providing the AR view, and the first overlay, the AR view may be generated. In some exemplary embodiments, in case the second overlay is determined to be used for providing the AR view, the first and second overlays may be utilized and combined to generate the AR view. In some exemplary embodiments, in case the second overlay is determined not to be used for providing the AR view, the second overlay may be modified or omitted, e.g., to be regenerated using the first overlay. In some exemplary embodiments, the resulting overlays may be combined to provide the AR view via the AR device.

In some exemplary embodiments, instead of waiting, at each registered layer, for overlay inputs from previous layers according to the order of execution, the layers may process the frame in parallel, prior to obtaining a previous overlay. In some exemplary embodiments, executing the second layer prior to obtaining from the first layer the first overlay may reduce a latency caused by the waiting time to the first layer. In some exemplary embodiments, executing the first and second skins may be performed partially or fully in parallel, simultaneously, or the like. In some exemplary embodiments, executing the first and second skins may be performed at different non-parallel times, e.g., without obtaining the first layout at the second skin.

In some exemplary embodiments, after executing the skins, the output overlays from each skin may be analyzed to determine whether they can be utilized in combination with each other and potentially with previous skins, e.g., to comply with the required outcome according to the order of execution. In some exemplary embodiments, determining whether the second overlay can be utilized for providing the AR view may comprise determining whether the first and second overlays are inconsistent with each other. In some exemplary embodiments, determining whether the first and second overlays are inconsistent with each other may comprise utilizing first metadata of the first overlay and second metadata of the second overlay. In some exemplary embodiments, determining whether the first and second overlays are inconsistent with each other may comprise identifying overlapping pixels between the first and second overlays.

In some exemplary embodiments, layers may be considered to be inconsistent in case that the overlay of one layer affects the overlay of the other layer. In some exemplary embodiments, the first and second layers may be considered to be inconsistent in case implementing the first layer on a registered object causes the second layer to become irrelevant. For example, in case both layers are registered on a person object, the first layer removes the person's head and the second layer applies makeup to the person's face, then upon implementing the first layer, the second layer may become irrelevant as there may not remain any face to apply makeup to. In some exemplary embodiments, metadata regarding the skins may be utilized to identify potential inconsistencies. In some exemplary embodiments, metadata of a skin may describe one or more types of objects the skin is registered to, and one or more functionalities or effects to the objects that are configured to be performed by the skin, e.g., changing an object, removing an object, or the like. In some exemplary embodiments, the first and second layers may be considered to be inconsistent in case implementing the first layer on a registered object provides a first layout that overlaps at least on part with a layout of the second layer. For example, in case the first layer dyes hair of a dog object to purple, and the second layer adds a hat to the dog, than pixels of the dog's head that are colored in purple may overlap with pixels that are hidden by the hat, thereby causing the overlays to become inconsistent.

In some exemplary embodiments, pixels that were added or modified by each skin may be compared to identify any pixel overlaps, similar affected areas in the frame, same target objects, or the like. In some exemplary embodiments, in case no overlap of pixels, target objects, target patches, or the like, is identified, it may be determined that the output overlays of the two or more skins may be utilized by the AR system in order to display an AR view, e.g., in combination with each other. In such cases, a latency of the AR framework may be reduced, as there may be no need for sequential execution that may slow down the system. In some exemplary embodiments, in case the skins' overlays overlap or affect the same frame or object areas, an overlay outcome of the later skin (in relation to the order of execution) may be amended or dropped. In case the overlay outcome is dropped, it may be later re-computed, regenerated, or the like, while utilizing the previous overlay according to the sequential order of executions.

In some exemplary embodiments, upon determining that the first and second overlays are consistent with each other, the second overlay may be utilized, without modifications, for generating the AR view. In some exemplary embodiments, upon determining that the first and second overlays are inconsistent with each other, the second overlay may be modified based on the first overlay, e.g., to obtain a modified second overlay. In some exemplary embodiments, the second overlay may be modified by amending pixels of the second overlay to be consistent with the first overlay. In some exemplary embodiments, the second overlay may be modified by regenerating the second overlay by executing the second skin on the first overlay. In some exemplary embodiments, the AR view may be generated by utilizing the modified second overlay and the first overlay.

As an example, for a first skin or layer (L1) and a second skin (L2) that are configured to be executed according to an order of first L1 and then L2 utilizing L1's output layout, both skins may be executed in a non-sequential form and overlay results may be compared, analyzed, or the like. Alternatively, metadata of the layers may be utilized to identify whether both skins relate to an overlapping portion or object of the frame in an inconsistent manner. In case an overlap is not identified, indicating that both results can be used without interfering with each other, overlay results of both layers may be combined to create the AR view. In case an overlap is identified and is determined to be a minor overlap or an easily fixed overlap, the overlapping pixels or their area may be amended and utilized to create the AR view. In case an overlap is identified and is determined to be a major overlap that is difficult to fix, the overlay of L2 may be dropped and regenerated based on the overlay generated by L1, which may be used as an input.

In some exemplary embodiments, determining whether the second overlay can be utilized for providing the AR view may comprise determining, based on the first overlay, that the second overlay is inconsistent with the first overlay. In some exemplary embodiments, generating the AR view may comprise executing again the second skin based on the frame and based on the first overlay, e.g., to obtain a new second overlay. In some exemplary embodiments, generating the AR overlay for the frame may be performed based on the new second overlay.

As another example, layers L1, L2, L3, may all be registered on a same object type that is identified in a captured frame, the order of execution being L1, L2, and then L3. Instead of processing the layers according to the order of execution by executing L1 on the image, providing the output overlay of L1 to L2, processing the received information at L2, and providing an output overlay to L3 for further processing, they can all be processed in a non-sequential manner, e.g., simultaneously, simultaneously in part, or the like. Alternatively, the frame may be fully processed by L1, and L1's overlay output may be provided to both L2 and L3, which may both process the output of L1 in a non-sequential manner, e.g., simultaneously, simultaneously in part, or the like. In some exemplary embodiments, consistent portions of the overlays that are not affected by the order of execution may be maintained, while inconsistent portions may be recalculated using the original execution order or amended. In case L2 and L3 both perform non-sequential execution of L1's overlay, frame areas that are modified by both L2 and L3 may be identified, and the output overlay of L3 may be reprocessed with the output overlay of L2 as an input, or alternatively, the overlapping area may be amended without dropping previous calculations, e.g., in case such an amendment would require a minor computation.

As another example, the second skin may be registered on an object type, e.g., a human, an animal type, an inanimate object, or the like. In some exemplary embodiments, the frame may comprise a plurality of objects of the registered type, e.g., first and second objects of the object type. In some exemplary embodiments, the second overlay may comprise first and second sub overlays corresponding to the first and second objects. In some exemplary embodiments, the first sub overlay may comprise an output provided by the second skin in response to processing the first object, and the second sub overlay may comprise an output provided by the second skin in response to processing the second object. In some exemplary embodiments, determining whether the second overlay may be utilized for providing the AR view may comprise determining that the first sub overlay is consistent with the first overlay, and determining that the second sub overlay is inconsistent with the first overlay. In such cases, a third sub overlay may be determined or generated by the second skin, e.g., based on the first overlay. In some exemplary embodiments, the third sub overlay may comprise an overlay for the second object, that is consistent with the first overlay. In some exemplary embodiments, the AR overlay may be generated for the frame based on the first sub overlay and on the third sub overlay.

In some exemplary embodiments, non-sequential execution (also referred to as "speculative execution") of the second skin may be determined to be performed prior to an availability of the first overlay from the first skin. In some exemplary embodiments, executing the second skin that is performed without providing thereto the first overlay may be contingent on the determination as to whether or not to perform the speculative execution.

In some exemplary embodiments, a predictor, a software agent, a classifier, or the like, may be deployed to estimate outcomes of skins, e.g., to provide a determination as to whether or not to perform the speculative execution. In some exemplary embodiments, prior to performing non-sequential execution of two or more skins that are registered to a same frame portion, a predictor may estimate outcomes of each of skin and determine whether they will be inconsistent with each other. In some exemplary embodiments, the predictor may comprise a data-derived predictor, a machine learning predictor, a heuristic-based predictor, or the like. In some exemplary embodiments, the predictor may be utilized to determine whether to perform a non-sequential execution of the second skin, or whether the second skin is to be executed sequentially after obtaining the first overlay from the first skin. In some exemplary embodiments, the predictor may be configured to predict a probability that the first overlay will be inconsistent with the second overlay, e.g., based on a predicted functionality of each skin, on metadata of each skin, on identified objects in the frame, or the like.

In some exemplary embodiments, the predictor may identify whether a skin relates to a same object as another skin, whether they relate to overlapping objects, whether they relate to a same portion of a same object as another skin, whether they relate to an adjacent area of an object as another skin, or the like. In some exemplary embodiments, in case two skins are not registered to a same object or area, the skins may be estimated to be consistent. In some exemplary embodiments, in case outcomes of layers are estimated to be inconsistent, sequential processing may be performed according to the original execution order, e.g., at least for the inconsistent skins. For example, a person object that is estimated to be engaged in an activity of running towards another person object may be estimated to potentially be inconsistent with layers of the other person, e.g., as the persons may have an overlapping frame area with overlapping pixels, which may cause the layers to be inconsistent with each other, and thus sequential layer execution may be advantageous to non-sequential execution.

In some exemplary embodiments, in response to identifying that the first and second overlays are inconsistent in a certain frame area, such as a small frame area, a partial execution of the second skin may be performed, e.g., excluding the certain area. In some exemplary embodiments, a partial execution may be performed in case the inconsistent area is determined to be smaller than a threshold, in case the layers' objective is determined to have a low score of inconsistence, e.g., below a threshold, in case the layers' execution time is estimated to be time consuming, in case the layers are estimated to use heavy computation sources, or the like. For example, a first layer that is configured to change legs of a human and a second layer that is configured to change a shirt of the human may be considered to have a low score of inconsistence, e.g., as the objective to not necessarily contradict, and even in case they do contradict, the overlapping area is estimated to be small. In some exemplary embodiments, an objective of a skin may be determined based on metadata thereof, history data thereof, registered objects thereof, or the like.

In some exemplary embodiments, a partial parallel execution may include generating a skin overlay on portions of the frame that are not estimated to be affected by another skin. In some exemplary embodiments, the partial execution may be implemented by generating a full first overlay of the first skin and generating a partial second overlay that is predicted to have a low probability of being inconsistent with the first overlay. In some exemplary embodiments, the first overlay and the partial second overlay may be generated in a non-sequential way, e.g., simultaneously, in parallel, or the like. In some exemplary embodiments, generating the AR view may comprise utilizing the first overlay, utilizing the partial second overlay, and completing execution of the second overlay based on the first overlay. In some exemplary embodiments, a supplement second overlay may be obtained by executing the second skin on the missing frame area using the first overlay, e.g., which may be a low latency execution as it comprises a partial execution. In some exemplary embodiments, since the partial second overlay may not be executed sequentially compared to the first overlay, generating the partial second overlay may have a reduced latency, thereby reducing the overall latency.

In some exemplary embodiments, a partial parallel execution may include generating a lower quality skin overlay for such portions, e.g., in low resolution. This may save computational power and reduce latency. In some exemplary embodiments, in addition to or instead of generating a full first overlay of the first skin and generating a partial second overlay of the second skin, the second skin may be executed on a low resolution version of the frame, e.g., to reduce a latency thereof, and the supplement second overlay may be generated on a non-consistent portion of the frame, e.g., in full or low resolution.

Another technical solution for reducing a latency of an AR experience is executing one or more shadow layers, in addition to executing the defined layers. In some exemplary embodiments, skins may be executed by one or more devices such as a server, the AR device, an edge device of the same user, remote cloud server, or the like. In some exemplary embodiments, skins may be executed on different execution platforms according to one or more execution schedules or allocations, e.g., executing the first skin may be performed at a first execution platform, and executing the second skin may be performed at a second execution platform.

In some exemplary embodiments, in addition to implementing the one or more execution schedules or allocations of execution platforms for each skin, additional shadow skins may be executed, e.g., in order to reduce an execution latency. In some exemplary embodiments, a shadow layer or skin may refer to executing a layer in an addition execution platform, e.g., in parallel, simultaneously, in anon-sequential manner, or the like. In some exemplary embodiments, the shadow layer may perform a partial or full execution of the original layer, may be executed on a reduced-resolution of full resolution version of the frame, may obtain the entire skin or metadata thereof, or the like. In some exemplary embodiments, a shadow layer of a skin may be executed on a server or any other execution platform while a corresponding layer is processed at the AR device, an edge device, or the like.

In some exemplary embodiments, shadow layers of skins may be executed in case an execution platform is at least partially idle during an estimated execution period of the layers or has extra computational power or time that may be utilized for generating an overlay of the shadow layer. In some exemplary embodiments, shadow layers may be executed in case an execution platform is configured to process a subsequent layer. In such cases, the subsequent layer may be processed on the outcome of the shadow layer, prior to receiving outcome from the original layer processed at the original execution platform, e.g., thereby reducing a communication latency.

In some exemplary embodiments, executing the first skin may be determined to be performed at a first execution platform, e.g., according to an execution schedule. In some exemplary embodiments, the first skin may be executed on a second execution platform, in addition to the first execution platform, in order to obtain a shadow overlay of the first skin. In some exemplary embodiments, execution of the second skin may be determined to be performed at the second execution platform, e.g., according to the execution schedule. In some exemplary embodiments, the second skin may be executed on the shadow overlay instead on the first overlay provided from the execution on the first execution platform. In some exemplary embodiments, instead of waiting for the first overlay to be provided via a communication medium to the second execution platform, the second execution platform may generate the second overlay without any latency or waiting time using the shadow overlay.

In some exemplary embodiments, upon receiving the first overlay at the second execution platform from the first execution platform, the first overlay and the shadow overlay may be compared, e.g., to identify whether they are consistent, identical, match, or the like. In some exemplary embodiments, in case the first overlay and the shadow overlay are consistent with each other, the second overlay generated by the second execution platform may be utilized to provide to AR view. In some exemplary embodiments, layers may be considered consistent in case the pixel are identical or in case a difference between the layers is identified as being a non-semantic difference such as a resolution difference, a lighting difference, or the like. In some exemplary embodiments, in case the first and shadow overlays do not match, are inconsistent, or the like, the second overlay may be amended or regenerated using the first overlay instead of the shadow overlay.

For example, in case a first layer (L1) is being executed at the AR device, but a second layer (L2) that is registered to the same object as L1 is scheduled to be executed at a server, the server may reduce a latency of communicating the output overlay of L1 to the server by executing a shadow layer of L1, referred to as L1', at the server. In some exemplary embodiments, L1' may be executed at the server during the execution of L1 at the AR device, e.g., enabling the server to immediately execute L2 on the outcome of L1' without waiting to receive the outcome of L1. Upon receiving the output of L1 from the AR device, the server may compare the outcomes of L1 and L1' to verify that they are identical. In case a difference is found between the outcomes of L1 and L1', the server may reprocess L2 on the original L1, or perform minor amendments to L2, e.g., if possible.

Yet another technical solution is prioritizing layers, e.g., in case not all layers can be implemented due to a lack of resources. In some exemplary embodiments, some skins that are registered to frame objects may not be performed, implemented, or the like, e.g., in order to reduce an overall latency of the AR view. In some exemplary embodiments, skins may be determined not to be performed based on priority levels of the skins. In some exemplary embodiments, a user may indicate his priorities regarding the registered layers, e.g., via a user interface. In some exemplary embodiments, priorities may be indicated indirectly, based on default settings, or the like. In some exemplary embodiments, priorities may be determined automatically, e.g., based on heuristics, based on a popularity criteria, or the like. In some exemplary embodiments, based on the obtained priorities, low priority skins may not be performed in case an estimated execution time is longer than required timeframes, in case the system is determined to be lacking sufficient CPU resources to execute all layers, or the like.

In some exemplary embodiments, priority rankings of a plurality of skins may be obtained. In some exemplary embodiments, the priority rankings may indicate that a first subset of the skins has priority over a second subset of skins, which may have priority over a third subset, and so on. In some exemplary embodiments, the priority rankings may represent a utility of each skin relative to the resources it consumes, user preferences, or the like. In some exemplary embodiments, resources that are required for performing the skins may be estimated, e.g., based on metadata of the skins, a code of the skins, or the like. In some exemplary embodiments, upon determining that executing the plurality of skins has one or more drawbacks, e.g., utilizing more CPU than available, draining the battery of the AR device, or the like, one or more skins may be refrained from being executed. In some exemplary embodiments, skins may be determined to be refrained from execution based on a calculation considering parameters such as the priority of the skins, the resource required by each skin, the utility of each skin, alternative heuristics, or the like. In some exemplary embodiments, the parameters used for the calculation may be weighted evenly, differently, based on the rules, based on user determined weights, default settings, or the like.

In some exemplary embodiments, the priority rankings may indicate that the first skin has a higher priority than the second skin, e.g., or vice versa. In some exemplary embodiments, a possibility of executing both skins may be predicted, calculated, or the like. In some exemplary embodiments, upon determining that execution of the first skin and the second skin utilizes resources that exceed a threshold, and that the first skin is indicated as having a higher priority than the second skin, the AR framework may refrain from executing the second skin, or vice versa. In some exemplary embodiments, upon determining that execution of the first skin and the second skin utilizes resources that comply with a threshold, both skins may be executed.

Yet another technical solution is running a limited version of one or more skins, e.g., in case computational and time resources are not sufficient to perform a full execution of the registered skins, upon determining that execution of a skin utilizes resources that exceed a threshold, in case a reduced latency is desired, or the like. In some exemplary embodiments, a limited skin version may be implemented by limiting skin computations such as object recognition computations, limiting resolution levels of the frame, or the like.

In some exemplary embodiments, implementing a limited version of one or more skins may comprise limiting an object recognition functionality. In some exemplary embodiments, upon obtaining a frame, the frame may be processed using one or more object recognition techniques that are configured to identify objects in the frame, e.g., thereby enabling to detect which skins are registered to which object, and to process the skins to obtain the AR view. In some exemplary embodiments, object recognition techniques may utilize one or more resources such as computational resources, time resources, power resources, or the like. In some exemplary embodiments, instead of implementing object recognition functionality for each frame separately, results of a previous object recognition execution determined for a previous frame may be utilized by registered skins.

In some exemplary embodiments, object recognition may be performed, implemented, executed, or the like, on a determined frame to obtain one or more object types identified in the frame. In some exemplary embodiments, a refresh timeframe for performing object recognition may be determined, defined, or the like, such as periodically, every determined event, upon obtaining user input, or the like. In some exemplary embodiments, one or more subsequent frames that are subsequent to the frame may be obtained from the frame sensor during the refresh timeframe, e.g., before the refresh period is expired. In some exemplary embodiments, instead of performing object recognition to each of the one or more subsequent frames, the one or more subsequent frames may be estimated to comprise the same one or more object types that were detected for the determined frame. In some exemplary embodiments, the one or more object types may be utilized for the processing the one or more subsequent frames without performing object recognition to the one or more subsequent frames during the refresh timeframe.

In some exemplary embodiments, object recognition calculations may be performed every defined refresh timeframe so that the results will be refreshed and new objects that enter the user's AR view will be detected. In some exemplary embodiments, upon expiration of the refresh timeframe, object recognition may be performed to the following frame and results may be utilized until expiration of a subsequent refresh timeframe, and so on. In some exemplary embodiments, since object identities do not tend to change entirely in a high frequency, performing object recognition for each and every frame may not be always necessary. In some exemplary embodiments, using already existing results may reduce calculation time and resource consumption.

In some exemplary embodiments, implementing a limited version of one or more skins may comprise limiting a resolution level of one or more frames portions, frame patches, or the like. In some exemplary embodiments, an entire or partial resolution level of the frame may be degraded or reduced, e.g., by 10 percent, 5 percent, or by any other percentage, prior to execution of one or more layers. In some exemplary embodiments, a resolution of an image may be reduced during processing of one or more layers. In some exemplary embodiments, after execution of the layers, the resolution may be restored or enhanced, e.g., to a High Definition (HD) level, to a previous resolution level, or to any other resolution level. In some exemplary embodiments, the resolution may be restored or enhanced using one or more super-resolution techniques, one or more graphic enhancement techniques, or the like. In some cases, the resolution may not be enhanced after execution.

In some exemplary embodiments, in order to provide an overall high-resolution experience in which the quality degradation is not noticeable, the degradation may be performed in a different portion of the image every captured frame, every skin execution, or the like. For example, a first portion of 2/50 of the frame may be degraded in a first frame, a different 2/50 portion of the frame may be degraded in the next frame, or the like. In some exemplary embodiments, a portion of the frame that is converted to lower resolution may be selected randomly, selected based on an importance score of frame objects, selected based on objects of interest, selected based on user priorities, or the like. In some cases, the size of the portion that is degraded in quality may be determined randomly or defined.

In some exemplary embodiments, a different portion of a frame may be reduced in resolution for each captured frame, for one or more selected frames, for each nth frame, n being a selected number, or the like. In some exemplary embodiments, a resolution level of a first portion a frame may be reduced prior to executing first and second layers on the frame. In some exemplary embodiments, a subsequent frame may be obtained from the frame sensor. In some exemplary embodiments, a resolution level of a second portion the subsequent frame may be reduced prior to executing layers on the subsequent frame. In some exemplary embodiments, the first and second portions may comprise different or randomly selected coordinate areas in a frame structure.

In some exemplary embodiments, for each skin registered on a frame, a different portion of the frame may be reduced in resolution. In some exemplary embodiments, a resolution level of a first portion a frame may be reduced prior to executing a first skin on the frame. In some exemplary embodiments, a resolution level of a second portion the frame may be reduced prior to executing a second skin on the frame. In some exemplary embodiments, the first and second portions may comprise different areas in the same frame.

Yet another technical solution of the disclosed subject matter is determining an enhanced order of skin executions for skins that are registered to a same or overlapping frame object, portion, or the like. Additionally or alternatively, the order of execution may be determined for skins that are registered to different objects but cannot be processed simultaneously, e.g., due to a lack in computational resources, in power resources, or the like. In some exemplary embodiments, a user may define an original order of execution. Alternatively, an original order of execution may be obtained from a computing device such as a server, determined by the AR framework, or the like. In some exemplary embodiments, an order of execution may be dynamically modified, selected or controlled based on a context. For example, in case a user is outside, the user may wish to utilize a selected order of execution that provides useful real-world information. In case the user is playing a social game indoors, e.g., where the actors are replaces with virtual historical figures, the user may wish to obtain fictious information of the historical figures, e.g., using a different order of execution.

In some exemplary embodiments, the order of execution may define an order of skins receiving overlay from previous skins, processing the overlays, and providing outcome overlays as an input to the next skin in the order. In some exemplary embodiments, the order of execution may define that an object that is created by a layer will not be processed by any previous layer. For example, an order of execution may define an order of execution between a deepfake skin that replaces depicted people with famous people, and a face recognition skin that indicates an identity of the depicted people. In case the deepfake skin is executed first, replacing a person with a famous person, e.g., Donald Trump, the face recognition skin may indicate that the person is Donald Trump. Otherwise, in case the face recognition skin is executed first, the depicted Donald Trump may be indicated as having the identity of the previously-depicted person. In some exemplary embodiments, although an order of execution may be defined, it may be desired to identify alternative ordering that may provide the same result while using less resources. Specifically, a more efficient order of layer executions may be desired.

In some exemplary embodiments, an attempt of modifying the order of execution may be performed. In some exemplary embodiments, the attempt may include grouping non-consecutive layers in a consecutive order, reordering the order of execution, or the like. In some exemplary embodiments, the modified order may be selected based on determining an order with reduced resource utilization, an enhanced speed, or the like, which may be determined based on one or more classifiers, predictors, or the like. In some cases, the modified order may be determined randomly, based on instruction, based on rules, or based on any other information. In some exemplary embodiments, in some cases, the modified order may be configured to omit one or more layers that are estimated as having no influence on a resulting view. For example, a first skin that dresses a person with yellow clothes may be followed by a second skin that dresses the person with purple clothes. As the output overlay of the first skin is overrun by the overlay of the second skin, omitting the first skin from the order of execution may not modify an overall outcome.

In some exemplary embodiments, a first order of execution, a skin execution order, an original order of execution, or the like, may be obtained. In some exemplary embodiments, the first order of execution may determine or define an order of skin executions of a plurality of skins comprising the first and second skins. In some exemplary embodiments, the plurality of skins may be registered on a same object in the frame, or may not be processed together for any other reason. In some exemplary embodiments, the plurality of skins may be executed according to the first order of execution, e.g., to obtain a first result.

In some exemplary embodiments, a second order of execution between the plurality of skins may be obtained, determined, defined, or the like. In some exemplary embodiments, the second order of execution may be determined to utilize less resources than the first order of execution. In some exemplary embodiments, the second order of execution may define that the second skin is to be executed before the first skin. In some exemplary embodiments, the plurality of skins may be executed according to the second order of execution to obtain a second result.

In some exemplary embodiments, the first and second results may be compared. In some exemplary embodiments, based on a determination that the first and second results are identical, the first order of execution may be determined to be replaceable with the second order of execution. In some exemplary embodiments, in case the second order of execution is determined to utilize less resources than the first order of execution, and the first and second results are determined to be identical, the second order of execution may be set for executing skins instead of the first order of execution.

Yet another technical solution is distributing computations of the AR device to an edge device. In some exemplary embodiments, skins may be executed on different execution platforms, e.g., while complying with one or more constraints. In some exemplary embodiments, since the AR device may be comparatively weak in its computations, and communicating with a remote cloud server may be time consuming and battery consuming, it may be advantageous to execute skins on one or more nearby edge devices having greater computational power that the AR device, which may enable swift communications with the AR device without draining the AR device's battery for communication and execution purposes.

In some exemplary embodiments, an edge device may include a user's car's computer, a computing device of the user, e.g., at his home, an office device, or the like, that is nearby the user. In some exemplary embodiments, it may be desired that an execution of a layer, including the roundtrip between the executing device and the AR device, will be performed swiftly, e.g., not longer than 1/50 of a second, or any other time threshold. In some exemplary embodiments, in order to further enhance a computational speed of executing a layer, different portions or patches of the frame may be cropped and processed separately in different devices, and then returned to form the full overlay output of the layer. For example, one object of a frame may be cropped and processed at the edge device, while a remaining object may be processed at the AR device.

In some exemplary embodiments, execution of skins, e.g., the first and second skins, may be distributed to an edge device in proximity of the AR device. In some exemplary embodiments, the edge device may consist of one or more sensors, e.g., imaging sensors. In some exemplary embodiments, the edge device may be associated with the sensors, communicate therewith, or the like. Alternatively or additionally, sensors may be integrated as part of the edge device. In some exemplary embodiments, in case the edge device comprises one or more sensors, the entire frame data from the AR device may not be required to be provided to the edge device, e.g., since the edge device may be able to independently accumulate supplement sensor information and recreate the original frame based thereon. In some exemplary embodiments, in case the sensors capture visual information that overlaps at least in part with the captured frame, the edge device may utilize the sensor information from the sensors in order to obtain supplement frame information. In some exemplary embodiments, in such cases, distributing the execution to the edge may comprise providing partial information of the frame to the edge device, thereby enabling the edge device to complete the partial information based on its supplement frame information from the one or more sensors.

For example, the AR device may provide the edge device with partial information of the captured frame, and the edge device may complete the missing frame information based on sensor information gathered at from the one or more sensors of the edge device of the same area, e.g., in a slightly different angle. In some exemplary embodiments, image processing techniques or any other technique may be utilized by the edge device in order to align its sensor information with the angle of the AR device. In some exemplary embodiments, the AR device may provide to the edge device sufficient sensor information so that an angle of the AR device's sensors may be determinable based thereon. In some exemplary embodiments, distributing only a portion of the AR device's sensor information may reduce the AR device's latency, battery drain, transmission costs, or the like. In some exemplary embodiments, calculations performed by the edge device may be provided to the AR device to be used thereby. As an example, the AR device and the edge device may observe the same scene, e.g., including an object such as a person identified by the edge device. In some exemplary embodiments, the edge device may provide the AR device with the identification of the object, thereby reducing the load of the AR device.

Yet another technical solution is determining an enhanced work distribution between a plurality of execution platforms. In some exemplary embodiments, the AR device may distribute its executions to a the plurality of execution platform, e.g., edge devices, servers, or the like. In some exemplary embodiments, a skin in a distributed AR system may be applied locally on the AR device, applied on one or more edge devices which may be trusted or not, applied on one or more servers such as remote cloud servers, or the like. In some exemplary embodiments, a user may indicate preferred or required execution locations indicating which devices are to execute what layers, thus constituting a user constraint in the AR framework. In some exemplary embodiments, certain layers may technically not be able to be executed on certain devices or platforms, thereby constituting an additional technical constraint. For example, a facial recognition layer that is configured to recognize faces of the user's friends may require a personal database of friend images, which may only be accessible at certain devices such as the AR device, a cloud server, or the like. As another example, devices that don't have an installed version of AR applications or layers may not be able to execute them.

In some exemplary embodiments, executions of the first and second skins may be distributed to one or more execution platforms based on a policy. In some exemplary embodiments, the policy may be configured to determine an execution schedule for executing a frame by a plurality of registered skins, e.g., including the first and second skins. In some exemplary embodiments, the execution schedule may be configured to schedule executions while reducing resource utilization. In some exemplary embodiments, the execution schedule may define for each patch of the frame, for the entire frame, or the like, a corresponding execution platform from one or more execution platforms. In some exemplary embodiments, the execution schedule may define for each patch of the frame an execution timing, order, or the like.

In some exemplary embodiments, when determining or generating the execution schedule, the policy may ensure that the schedule complies with one or more technical constraints of the one or more execution platforms, with the one or more user constraints of the frame such as a privacy constraints, with the expected power usage (battery power), or with any other constraint. In some exemplary embodiments, a privacy constraint may constitute a soft constraint, e.g., which may be overwritten in an overall calculation, or a hard constraint, which must require full compliance. For example, in case a user wishes to keep his usage of a certain skin private, e.g., an undressing skin, the user may indicate that the skin is only to be executed on trusted devices, as a hard constraint. In some exemplary embodiments, regarding soft constraints, the schedule allocator may be configured to determine an average cost of complying with the soft constraints, and upon reaching a constraint threshold, e.g., indicating a soft constraint is too expensive to be complied with, the schedule allocator may overrun the soft constraint. In some exemplary embodiments, the policy may configure the execution schedule to reduce overall computational cost, performance speed, communication costs, battery usage, overhead, latency, or the like, e.g., using one or more resource allocation algorithms.

In some exemplary embodiments, the schedule allocator may determine a number of layers that are registered on each object in a frame and determine a predicted execution time of each patch, e.g., based on indications from a predictor that is configured to estimate execution times, based on metadata of skins indicating a type of functionality of the skin, based on a binary analysis of each layer, based on previous execution time lengths that were measured, based on a number of objects for each type, obtained from one or more devices, or the like. In some cases, an object that has a large number of registered layers that have a long estimated execution time, may be sent to an execution platform with a strong CPU in order to complete the execution in line with the latency requirements. As an example, the schedule allocator may consider that a certain device, e.g., the user's laptop, has a strong CPU and based on this consideration, allocate computationally challenging tasks to the laptop, e.g., in case the user constraints and technical constraints enable it to do so. In some exemplary embodiments, bottleneck skins may be identified according to estimated execution times of layers, a count of layers that are registered on same objects, or the like. As an example, a predictor may estimate an execution time of a cat-processing layer on a frame by identifying a number of cats in the frame and multiplying the number of cats with an estimated execution time of the layer on each cat, e.g., based on previous executions of the layer on a cat, based on analysis of the skin's binary or program code, or the like. In some exemplary embodiments, during runtime, execution estimations may be updated accordingly.

In some exemplary embodiments, a frame may be segmented into two or more patches, prior to being distributed. In some exemplary embodiments, executions of the two or more patches may be distributed to two or more execution platforms based on the execution schedule. For example, a first patch depicting a first object may be distributed to a first execution platform that was scheduled to executed a first skin registered on the first object, and a second patch of the frame depicting a second object may be distributed to a second execution platform that was scheduled to executed a second skin registered on the second object. In some exemplary embodiments, instead of patching or segmenting the frame, the entire frame may be provided to one or more execution platforms. For example, an entire frame depicting first and second objects may be distributed to a first execution platform that was scheduled to executed a first skin registered on the first object, and a patch or segment of the frame depicting the second object without the first object may be distributed to a second execution platform that was scheduled to executed a second skin registered on the second object. In some exemplary embodiments, after performing the execution tasks, resulting overlays may be obtained from the execution platforms, e.g., respectively. In some exemplary embodiments, the corresponding overlays may be combined to generate the AR view.

One technical effect of utilizing the disclosed subject matter is to reduce battery consumption of an AR device. In some exemplary embodiments, distributing execution tasks to different devices may be useful for a plurality of scenarios, reducing the AR resource consumption and providing a high level AR experience with lower latency and less consumption of electrical power. In some exemplary embodiments, bottleneck tasks requiring a large amount of computational power may be distributed to an execution platform that has a strong CPU, thereby solving bottleneck issues and reducing a latency.

Another technical effect of utilizing the disclosed subject matter is enabling to detect and utilize advantageous skin execution orders, e.g., in order to reduce a latency, a CPU utilization, a battery drain, or the like. Additionally or alternatively, the disclosed subject matter enables to prioritize different layers, e.g., according to personalized preferences, in order to provide to the user high-priority functionality in case not all the functionality can be provided, in case a latency level impairs the AR experience, or the like. Additionally or alternatively, the disclosed subject matter enables reducing an overall latency without reducing an overall experience by reducing a resolution level of a different portion of a frame for each skin or captured frame, in a manner that does not damage the AR experience and is unnoticeable. Additionally or alternatively, the disclosed subject matter enables to reduce unnecessary computations, such as of object recognition computations, thereby reducing a latency with a reduced damage to a quality of the AR view.

Another technical problem dealt with by the disclosed subject matter is to provide an augmented reality experience to a user while hiding sensitive information from non-trusted computerized devices. In some exemplary embodiments, there may be several options for processing visual information, for executing skins, or the like. A skin may be applied locally, applied on an edge server, applied on a remote cloud server, or the like. In some exemplary embodiments, an AR device, such as AR glasses, a Virtual Retinal Display (VRD), or the like, may be owned and controlled by the user, as opposed to other external devices which are not owned or controlled by the user. As a result, the AR device may be considered as the most trusted device. The AR device may be configured to use an edge device, a cloud server, or the like in order to harness their additional resources, such as computational power and energy. As the user may not have control over the external devices, it may be desired to limit the amount of information that is shared with such devices, e.g., to non-sensitive information. In some exemplary embodiments, it may be desired to preserve a user's privacy so that untrusted devices will not process private information, gain access to private information, or the like. In some exemplary embodiments, as the mere view of a user may be considered to be private information, this may prevent the AR device from sharing basic information with untrusted devices, including certain objects, a captured field of view, or even the entire frame such as in case the user's location is private.

In some exemplary embodiments, private information may comprise certain images that are being captured by a frame sensor that is operationally coupled with the AR device. Sensitive images may comprise images of faces, children, confidential documents, places such as security zones, or the like. Additionally or alternatively, the private information may comprise one or more skins that a user is using. As an example, a married woman may use a dating skin. She may wish to hide the usage of the skin and to prevent it from being executed on an external device, e.g., in order to prevent possible data leaks. Additionally or alternatively, the private information may comprise information about the field of view of the user. Additionally or alternatively, the private information may comprise metadata determined by the AR framework or by applied skins. For example, using facial recognition, identities of bystanders may be ascertained. The facial recognition may be applied by the AR framework itself or by a specific skin. The information regarding the identity of the bystander may be retained in metadata within the AR framework for future processing. It may be desired that exposure of the metadata to non-trusted devices will be limited, such as to prevent a wife from learning the identity of her husband's mistress.

One technical solution is to provide a filter application. In some exemplary embodiments, certain types of objects or portions thereof may be determined to be filtered. For example, faces of human objects may be determined to be filtered. In some exemplary embodiments, objects that are classified as sensitive may be filtered by removing or cropping the object from the image so that the layers will not be executed on the sensitive object. In some exemplary embodiments, skins may register to remaining objects in the frame or remaining portions of an object that remain after filtering out the sensitive portions. In some exemplary embodiments, after executing the skins on the remaining portions and obtaining a resulting overlay, the sensitive objects may be added back to the frame to obtain a full AR view. In some exemplary embodiments, filtered objects may be stored as short-term memory that cannot be loaded out of the cache and saved at a long-term memory location, e.g., due to privacy requirements.

In some exemplary embodiments, the filter application may be configured to filter out sensitive frame portions. In some exemplary embodiments, the filter application may identify, classify, or categorize frame portions as sensitive. In some exemplary embodiments, certain categories of objects, skins, or portions thereof, may be determined as sensitive information by default. In some exemplary embodiments, the user may select or indicate that certain categories of objects are sensitive. In some exemplary embodiments, the user may indicate a classification of people of interest such as roommates, friends, or the like. For example, a user's spouse may not wear full clothing when inside the house, and the user may wish that certain body areas of her husband should not be shared with other devices when not covered. In some exemplary embodiments, the user may indicate a category of non-human objects of interest such as knives, guns, illegal drugs, or the like. In some exemplary embodiments, a classifier may be applied on a captured frame to recognize one or more objects in the frame and match them against sensitive categories to identify as sensitive objects, sensitive patches, sensitive object parts, or the like, e.g., using facial recognition techniques, image processing techniques, or the like. In some exemplary embodiments, facial recognition may be performed to human objects to classify them to corresponding groups, e.g., of acquaintances, friends, strangers, romantic partners, or the like, some of which may be indicated as sensitive categories. In some exemplary embodiments, non-human objects may be recognized according to any image processing technique as intimate objects, dangerous objects, or the like. In some exemplary embodiments, certain types of objects may automatically be filtered. For example, a law may require that driving signs will not be filtered out with AR layers at all. According to this example, when identifying a driving sign in a frame, the driving sign may be filtered out and may not be processed by any layer. Additionally or alternatively, authenticated skins such as translation skins may be permitted to process the frame.

Another technical solution is defining trust levels that are required from computerized devices in order to execute certain skins thereon, execute skins on certain sensitive objects, or the like. In case that there are no computerized devices having a trust score that is above a determined threshold that is necessary for executing a skin on an object or portion thereof, the AR system may refrain from executing the skin, refrain from executing skins of the object, or the like.

In some exemplary embodiments, the trustiness property of a device may be determined by the user, determined based on heuristics such as ownership of the device, or the like. In some exemplary embodiments, the trustiness property of a device may differ based on context. For example, an AR device that is lent to the user by third parties may be considered a non-trusted device. An edge device that is owned by the user, such as an edge device installed in his car or in his home or a mobile device acting as an edge device, may be considered as a trusted device, while an edge device installed in a rental car, in a hotel room, in a shopping mall, or the like, may be considered as a non-trusted device. As another example, the trustiness property of the cloud server may variate. In some cases, the user may trust the cloud server as it is owned and controlled by a company that he trusts, even more so than an edge device controlled by a third party. In other cases, the cloud server may not be trusted.

In some exemplary embodiments, the operation of providing an augmented reality experience to a user may comprise performing tasks that can be classified as private tasks and to non-private tasks. The non-private tasks may be executed by a non-trusted device, while the private tasks may be executed by a trusted device, e.g., as a privacy constraint on the execution schedule, the policy, or the like. An overlay display that may comprise the output of a private task or of a non-private task may be generated and presented to a user.

In some exemplary embodiments, determining whether a task is private or non-private may be based on a privacy policy of a user. In some exemplary embodiments, a private task may comprise executing a private skin on a frame, or executing a skin on private information or frame portions. As an example, the privacy policy may comprise a restriction requiring executing certain skins such as a skin that is configured to identify faces, on a trusted device. According to this example, the private task may comprise applying the skin on a frame, and such private task may be executed by a trusted device, such as an edge server, the AR device, or the like. Additionally or alternatively, the non-private task may comprise executing other skins on non-trusted devices or on trusted devices. As another example, the privacy policy may comprise a restriction requiring depicted faces of a frame, or any other frame portion, to be processed on trusted devices only.

In some exemplary embodiments, some skins may be defined as private, e.g., so that information regarding the skin will not leak. In some exemplary embodiments, a user may not want other devices to receive access to data indicating one or more active layers. For example, an active layer may include an embarrassing layer such as an undressing application. In some exemplary embodiments, in order to prevent from such information to be obtained by untrusted devices, some layers may be defined as private. In some exemplary embodiments, private layers may only be executed and processed on trusted devices, or alternatively, may not be shared in full to an untrusted device. In some exemplary embodiments, metadata of private layers, such as metadata indicating an objective or functionality of the layer, metadata indicating a type of object that the layer is registered to, or the like, may not be shared with untrusted devices, and in some cases, may not be shared with trusted devices either.

Yet another technical solution is to utilize information about the field of view of the user, while avoiding sharing, directly or indirectly, such information with a non-trusted device. In some exemplary embodiments, an AR device may be configured to monitor the point of fixation of the user, e.g., using a sensor, an eye tracking device, a camera, an infrared camera, or the like. The AR device may be configured to utilize field of view information in preparing the AR display. In some exemplary embodiments, it may be desired to save power by downscaling the overlay display in the peripheral portion of the frame. For example, in order to decrease power consumption of the AR display, resolution of the AR display may be downscaled in the areas of a frame that are outside the point of fixation of the user or are captured by the peripheral vision of the user, e.g., thereby utilizing the user's field of view. As another example, in some cases, objects that are not in the point of fixation of the user, may not be processed by one or more skins. For example, a skin may analyze people that the user is looking at and provide additional information about them, such as name, position, or the like. Although the eye tracking information may be useful and required for such processing, the user may wish to guard his privacy and avoid sharing such information. As an example, a user may be watching a football with her spouse and may not wish to reveal that she was looking at the sofa the entire match.

In some exemplary embodiments, in order to conceal the user's field of view, information about the field of view may not be provided to layers that process the skin. In some exemplary embodiments, in case the viewing direction is used to enhance a resolution of the viewed area, a resolution of the viewing direction may be degraded prior to being sent to the untrusted device, and after receiving the output overlay, may be enhanced again at the trusted device. In such cases, the skins may process entire frames in high resolution, and the AR device may downscale a resolution of objects that were outside the field of view portion of the frame.

In some exemplary embodiments, in order to conceal the user's field of view, information about the field of view may be provided implicitly to processing layers. As an example, the AR device may provide an indication of a number of portions of the frame that are to be processed in high resolution, while the portions include the field of view portion of the frame. In some cases, the additional portions may comprise randomly selected portions, or any other portions. In some exemplary embodiments, a number of areas may be randomly determined to have an enhanced resolution, including the viewing direction, so that the viewing direction may not be determinable at the untrusted device. In some exemplary embodiments, the AR device may downscale a resolution of the additional portions upon receiving results from the layers. As another example, in case only objects that are in the field of view of the user are to be processed, the AR device may provide one or more additional patches of the frame to be processed, in addition to patches depicting the objects that are included in the user' field of view.

In some exemplary embodiments, in order to conceal the user's field of view from external execution platforms, information about the field of view may be utilized at trusted devices only. In some exemplary embodiments, in order to conceal the user's field of view, information about the field of view may be disabled, may not be shared, or the like. In some exemplary embodiments, while using untrusted devices to execute a layer, the viewing direction may not be shared, or alternatively, the identity of the user may not be shared.

One technical effect of utilizing the disclosed subject matter is to exploit computational resources external to the AR device while keeping the privacy of the user. In some exemplary embodiments, executing some tasks on external devices without compromising on the user' privacy may reduce the AR device's battery drain and electricity consumption while retain the privacy. Additionally, or alternatively, the AR framework enables to execute tasks requiring a large amount of computational power on another computerized device that are not trusted, without compromising on the user's privacy. The disclosed subject matter may be used to distribute computations with a trusted edge device, thereby retaining the privacy of the user and reducing a communication overhead. In some exemplary embodiments, the disclosed subject matter enables to communicate only partial sensor information to an edge device in case the edge device has its own sensors. Thereby, a usage of communication resources is further reduced, thus saving the AR device time, battery power, and computational power. In some exemplary embodiments, the disclosed subject matter enables to classify tasks as private or non-private, and schedule the tasks accordingly to private and non-private platforms, thereby reducing resource utilization without compromising on the privacy.

Another technical effect of utilizing the disclosed subject matter is keeping a privacy of a user while considering user-specific preferences, such as preferred execution platforms. In some exemplary embodiments, the disclosed subject matter enables to utilize field of view functionalities without sharing such information with other platforms. In some exemplary embodiments, the disclosed subject matter enables to filter frame features or objects without providing them to be processed at execution platforms, e.g., in order to retain a privacy of the features by not providing them to other platforms.

Yet another technical problem dealt with by the disclosed subject matter is modifying the AR view according to an overall vision, plan, or the like, which may be configured to ensure a harmonic and high level experience. In some exemplary embodiments, the overall vision may comprise, for example, ensuring that one or more object types of portions thereof will not be modified, that boundaries of certain objects will not be corrupted, that overlays that are partly modified will not maintain meaningless portions, or the like. In some exemplary embodiments, It may be desired to define one or more portions of a frame as non-touchable portion, e.g., to enhance an AR experience of the user, or the like.

One technical solution is defining unmodifiable objects or portions thereof (referred to as "final objects") of a frame. In some exemplary embodiments, certain frame regions or objects may be defined as final portions that are untouchable, unmodifiable, or the like. In some exemplary embodiments, regions or objects in a frame may be determined to be final based on instructions, user indications, rules, classifiers, heuristics, or the like. For example, a graphic designer may determine that certain objects should not be modified, e.g., in order to enhance an esthetic aspect of the AR experience. In some exemplary embodiments, regions or objects of overlays that are artificial may also be defined as final.

In some exemplary embodiments, in contrary to filtered objects that are not processed by any layer, and are not shared with external execution platforms, an object that is indicated as final may be processed by any layer at any execution platform, as long as the output does not overwrite any part of the final object. In case a layer modifies the object itself, the layer may not be applied. For example, an AR application that adds descriptive labels near objects, may process balloon objects that may are defined to be final, and add the label "balloons" near the balloons without modifying any pixel of the balloons themselves. In some exemplary embodiments, registered skins may be analyzed to determine whether they are expected to modify the registered object, e.g., based on skin metadata, based on historic skin execution, based on binary analysis of the skin, based on a classification of the object, or the like. Alternatively, all registered skins may be applied on the object, and after applying the skins, the result overlays may be compared to the original object to ensure they do not overlap with the object's pixels.

In some exemplary embodiments, a final object may be implemented by a bitmap indicating which pixels of the frame are allowed to be modified (e.g., having a value of "0") and which pixels depict final objects and thus are forbidden from being modified (e.g., having a value of "1", or vice versa). In some exemplary embodiments, a final output of the AR view may be examined prior to being provided to the user, to ensure that the final objects are visible and were not modified.

In some exemplary embodiments, an end stage may be configured to ensure no final pixels were overwritten. In some exemplary embodiments, the end stage may comprise a final processing stage of the frame before providing the resulting AR view to the user. In some exemplary embodiments, the end stage may be configured to apply resulting overlays that were provided from one or more skins on the frame, e.g., in case the overlays were not applied by the layers themselves. In some exemplary embodiments, a layer may output an indication that a certain action is to be performed to one or more areas of the frame, and the end stage may be configured to implement the action. For example, a skin that outputs labels may provide a label and indicate that the label should be placed anywhere near a certain object, in a manner that matches the final AR view configuration. According to this example, at the end stage, the label may be inserted near the object at a frame location that does not conflict with other overlays provided by other layers, that is not considered to be important by a semantic analyzer, or the like.

Another technical solution is identifying one or more objects or portions thereof as a closed unit that is to be kept together in order to remain meaningful. In some exemplary embodiments, for each unit, one or more conditions regarding the unit may be utilized. In some exemplary embodiments, the one or more conditions may indicate when to remove portions of the unit, the entire unit, or the like. For example, a label that is placed near an object to describe the object may be considered useless if part of the text is hidden, or if the object is removed. In such cases, when only a portion of the unit is available, the entire unit should be removed. In some exemplary embodiments, in case a final object hides a portion of a closed unit, the unit may be entirely removed. As an example, a peanut alert may be indicated as a final portion that is forbidden to be overwritten, and may hide a portion of the label "balloons" which may be placed near a balloon object. According to this example, the entire "balloons" label may be removed, or in case the augmented unit include the balloons as well, e.g., in case the balloons are part of an overlay, the balloons may be removed too. In some exemplary embodiments, portions of the unit may be classified as necessary, and only when those portions are modified the unit is to be removed entirely.

One technical effect of utilizing the disclosed subject matter is enhancing an AR experience by enabling to define untouchable features, e.g., for a plurality of functionalities such as to enhance an esthetic aspect of the AR view. In some exemplary embodiments, the disclosed subject matter enables to indicate connections between different frame features that are part of a same content unit, depicting unit, or the like, and that are meaningful only as a unit. This enables to remove any meaningless portions in the AR view.

Yet another technical problem dealt with by the disclosed subject matter is providing real-world functionalities. In some exemplary embodiments, it may be desired to differentiate between original portions of a frame that depict objects that are present in the real-world environment surrounding the user, and AR portions that are artificial, manipulated, generated, include one or more generated overlays, or the like. In some exemplary embodiments, the real-world functionalities may comprise keeping one or more real-world portions of a frame as non-touchable portions, performing one or more actions in response to identifying a real-world object, providing an alert to the user, or the like.

One technical solution is verifying if an object is real or not, e.g., in order to determine whether real-world functionalities should be implemented. For example, for a user that is allergic to peanuts, it may be desired to identify whether a displayed peanut in a frame is a real world peanut, or whether the peanut is an overlay from a previous layer, is manufactured by a skin, is displayed by a screen in the real-world surroundings of the user, is displayed by a sign in the real-world surroundings of the user, or the like. In case the peanut is indeed a real-world peanut, it may be desired to alert the user and indicate the danger. In some exemplary embodiments, false positives alerting the user of a fake peanut, e.g., that is filmed in a movie, may not be desired.

In some exemplary embodiments, in order to differentiate between original real objects and artificial objects, a plurality of techniques may be utilized such as image processing techniques, three-dimensional (3D) analysis of distances within the frame, identification of screens, a semantic analyzer, or any other classification technique. In some exemplary embodiments, an entire frame may be classified as a real-world frame or not, or each object or patch in the frame may be classified as a real-world object or not. In some cases, a semantic analyzer may be used to identify minor changes to the original frame that do not change a semantic meaning of the frame, e.g., different lighting configurations, visual filters changing color scheme, or the like. In some exemplary embodiments, some portions of a raw frame that is captured may not be considered to be real-world portions, e.g., in case the original frame depicts a virtual object such as a virtual banana depicted in a real-world television screen.

In some exemplary embodiments, one or more skins may be defined as real-world skins that are configured to utilize real-world input. In some exemplary embodiments, the real-world skins may be tagged as such, may be indicated as such in their metadata, may be classified as such, or the like. In some exemplary embodiments, based on identifying layers as real-world layers, semi real-world layers, or regular layers, an optimization algorithm may be implemented to determine desired execution configurations, execution orders, and execution platforms of the layers, that comply with any constraints (if exist).

In some exemplary embodiments, prior to determining an order of execution of registered layers that are registered on a frame, the registered layers may be classified as real-world layers that are registered on real-world data, semi real-world layers that are registered on at least some real-world data, or regular layers that are not sensitive in any way to real-world data and may receive as an input one or more overlays or manipulated frames from previous layers (if such exist). In some exemplary embodiments, real-world layers or applications may be processed based on the original frame alone or portions thereof, while semi real-world layers may be processed based on the original frame or based on a combination of the original frame and an output overlays from previous layers. In some exemplary embodiments, real-world layers may be executed in parallel to layers that are first in the order of execution, as a first layer in the order of execution, in a non-sequential manner, or the like.

In some exemplary embodiments, first and second skins may be determined to be real-world skins that utilize real-world frames. In some exemplary embodiments, the first and second skins may be executed on the frame simultaneously based on determining that they are real-world frames. In some exemplary embodiments, based on determining that they are real-world frames, the first and second skins may be executed on the frame in a non-sequential way that may or may not be simultaneous.

In some exemplary embodiments, outputs of real-world layers and semi-real-world layers may or may not be considered to be high priority outputs. For example, real-world layers that produce lifesaving alerts may be considered a high priority layer, while real-world layers that are directed to entertainment objectives may not be considered a high priority layer. In some exemplary embodiments, real-world layers that are not prioritized may include, for example, a real-world layer that adds glasses to real-world cats only. In some exemplary embodiments, layers may be determined as being high-priority layers in case they are real-world layers, semi-real-world layers, or the like, and that they are indicated as being high priority by a user, based on heuristics, by default, based on the skin's metadata, or the like.

In some exemplary embodiments, after executing all the layers, at an end stage, output overlays may be combined to create one harmonious display. In some exemplary embodiments, the final output of all layers may be examined to ensure that results from high priority layers are fully viewable, are not hidden, or the like, e.g., that warnings, alerts, or any other high priority cue is visible. In some exemplary embodiments, the end stage may be configured to ensure no final pixels were overwritten, that real-world alerts or other high priority outputs are visible, or the like.

In some exemplary embodiments, a first skin may be determined to be a real-world skin that utilizes real-world frames, and a second skin may be determined to not be a real-world skin. In some exemplary embodiments, a first overlay obtained from the first skin may comprise a real-world alert of a real-world object in the frame, e.g., in high priority. In some exemplary embodiments, a second overlay may be obtained from a second skin. In some exemplary embodiments, based on whether or not the second overlay is inconsistent with the alert or with the real-world object, the final stage may determine whether or not to utilize the second overlay.

In some exemplary embodiments, high priority outputs of the real-world layers may have priority over other layers in when generating the final output at the final stage, and in some cases, they may cancel previous AR effects. In some exemplary embodiments, outputs of the real-world layers, the real-world objects themselves, or the like, may be defined as final, may be filtered, or the like, so that any conflicting frame portion may be removed or overwritten. For example, an application may warn a person that is allergic to pickles of a real pickle that is detected. In some cases, the pickle warning may cancel any processing that was done to the pickle, any post-processing that was done to the warning, that was done to a location of the warning, or the like.

One technical effect of utilizing the disclosed subject matter is enabling to differentiate between real life objects and artificial objects, and utilizing this classification for a plurality of applications, functionalities, or the like. In some exemplary embodiments, the disclosed subject matter enables to provide real-time alerts of real-life identified objects, while ensuring the alerts are accurate and were not based on artificial data.

Referring now to FIG. 1 showing an environment, in accordance with some exemplary embodiments of the disclosed subject matter. Environment 100 may be an environment where an AR framework is implemented. The AR framework may be a framework for providing augmented reality experience to a user, by executing skins. Skins and AR frameworks are disclosed, inter alia, in U.S. Pat. No. 9,865,088, entitled "Evaluation of Augmented Reality Skins", dated Jan. 9, 2018, U.S. Pat. No. 9,953,462, entitled "Augmented Reality Skin Manager", dated Apr. 24, 2018, U.S. Pat. No. 9,990,772B2, entitled "Augmented reality skin evaluation", dated Jun. 5, 2018, and U.S. Pat. No. 10,192,359B2, entitled "Subject selected augmented reality skin", dated Aug. 18, 2016, all of which are incorporated herein by reference in their entirety without giving rise to disavowment.

Environment 100 may comprise a Person 110. Person 110 may be wearing AR Glasses 120. AR Glasses 120 may comprise a frame sensor such as Camera 124 for capturing images that are processed by the AR framework. Lenses of the AR Glasses 120 may be configured to display an overlay display that is seamlessly interwoven with the physical world as perceived by Person 110, such as by adding layers over perceived objects, modifying perceived objects, removing perceived objects, or the like. Environment 100 may comprise a Car 180. Car 180 may be driven by a Person 170. Car 180 may comprise a Frame Sensor 150. Frame Sensor 150 may be associated with the field of view of Person 170.

Car 180 may comprise an AR Display 160 embedded within the windshield of Car 180. An AR framework may display the overlay display using AR Display 160, so as to provide an augmented display of the physical world. In some exemplary embodiments, frames from Frame Sensor 150 may be analyzed by the AR framework, which may generate overlay display to be presented using AR Display 160.

In some exemplary embodiments, Skins 125 may be utilized to provide the augmented display. Skins 125 may comprise a plurality of skins, e.g., Skin 125a, Skin 125b, and Skin 125n, or the like, each of which configured to analyze the frame or portion thereof and provide an overlay display thereon. The overlay displays may be combined, on top of each other, to provide the final overlay display that is presented to the user (e.g., Person 110, Person 170) to provide augmented reality experience. In some exemplary embodiments, the AR framework may be configured to analyze the frame, identify objects therein, invoke the Skins 125 or portion thereof, collect output therefrom, and provide the final output for display. In some exemplary embodiments, the AR framework may be configured to invoke a skin, schedule an invocation of a skin, determine the order in which skins are invoked, determine which execution environment would execute each skin, or the like.

Environment 100 may comprise an Edge 130. Edge 130 may comprise a processor, a receiver, a transmitter, a memory, or the like. Edge 130 may be a computer, a smartphone, or the like. Similarly, an Edge 130' may be an edge computer that is installed within Car 180. Additionally, or alternatively, Edge 130' may be a smartphone of Person 170, the infotainment system of Car 180, or the like. Edges 130, 130' may be utilized by the AR framework to execute one or more skins. In some exemplary embodiments, Edges 130, 130' may constitute an execution environment for executing skins. Edges 130, 130' may communicate with the AR framework, or components via a computerized network.

Environment 100 may comprise Server 140. Server 140 be a remote cloud server and/or any other network server. In some exemplary embodiments, Server 140 may be configured to obtain information from the AR framework, execute a skin, provide the output of the skins to the AR framework, or the like. Additionally, or alternatively, Server 140 may be utilized by the AR framework to execute one or more skins. In some exemplary embodiments, Server 140 may constitute an execution environment for executing skins.

Environment 100 may comprise Frame Sensor 190 that is external to AR Glasses 120 and to Car 180. Frame Sensor 190 may be associated with the field view of Person 170 or Person 120. Frame Sensor 190 may transmit frames to Edge 130, 130' or to Server 140. An AR framework may utilize frames sent from Frame Sensor 190, such as to augment the display of the user, to identify objects to be analyzed, or the like.

In some exemplary embodiments, the AR device, such as AR Glasses 120, AR Display 160, or the like, may be connected to an edge computer, such as Edges 130, 130', and to cloud server, e.g., Server 140. The edge computer, however, may be closer to the AR device than the cloud server, such as having a reduced latency thereto, requiring reducing power consumption to reach it, or the like. For example, the edge computer may be directly connected, such as using a Bluetooth connection, using Wi-Fi connection, using local cellular connection, or the like. Additionally, or alternatively, the edge computer may be connected to a same Local Area Network (LAN) as the AR device, may be physically connected thereto using a cabled connection, or the like. In some exemplary embodiments, communication to Server 140 may be provided through a Wide Area Network (WAN), through the Internet, or the like. For example, Server 140 may be a cloud computing platform that is used by various AR devices that are located remotely therefrom and from one another.

In some exemplary embodiments, different execution environments may have different resources. For example, Server 140 may have more computational resources, memory resources, or the like than Edge 130. Additionally, or alternatively, each execution environment may have different power resources. The AR device, such as AR Glasses 120 may have limited power supply. Additionally, or alternatively, Edge 130, which may be implemented by a mobile device, may also have limited power supply. Additionally, or alternatively, different execution platforms may retain, locally, or have connectivity to, different data storages. For example, a database used for identifying a person using facial recognition may be retained on Server 140, or on any other device or location. AR Glasses 120 may have limited memory capacity and may be able to retain only a portion of such database, such as a portion comprising frequently identified persons, people who are known to be at the same location, people that are deemed VIPs for the user, or the like. As a result, it may be desired to perform some computations off-device, on Edge 130 or on Server 140. As an example, Skin 125a may be executed on AR Glasses 120, Skin 125b may be executed on Edge 130 and Skin 125n may be executed on Server 140. In some exemplary embodiments, each skin, or a portion thereof, may receive, as input, the output of the previous skin, in accordance with an order of execution, so as to add a layer on top thereof. As an example, Skin 125a may add an image of a cat, and Skin 125b may process the image of the cat and modify its appearance. The AR framework may be configured to invoke execution of each skin, in accordance with predetermined rules and based on the content of the frame, to select for each skin an execution environment, to gather input for the skin and obtain the output of the skin, and generate the final overlay display to be displayed by the AR device.

Figure 2:
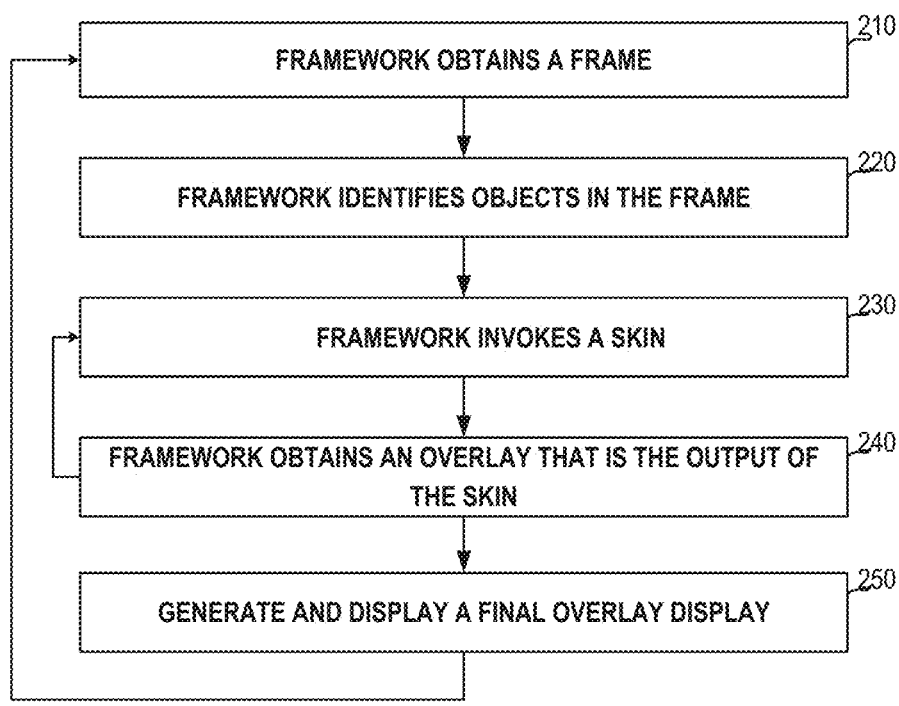
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 210, the framework obtains a frame. The frame may be obtained by a frame sensor, such as camera, that may be operatively coupled with the framework. The frame may be obtained directly from a frame sensor that is associated with a view of a user, such as a camera embedded in AR glasses (e.g., AR Glasses 120 of FIG. 1). Additionally or alternatively, the frame may be obtained from a computerized environment such as an edge device, a remote cloud server, or the like. Additionally or alternatively, the frame may be obtained from an external frame sensor, such as 190 of FIG. 1, that may be utilized to capture information that may be obscured and blocked from the view of the user. In some exemplary embodiments, images may be obtained from a plurality of sources and may be integrated together to create the frame.

On Step 220, the framework identifies objects that are in the frame. The framework may be configured to identify objects using object recognition algorithms such as Regions Convolutional Neural Network (RCNN), Faster RCNN, Scale-Invariant Feature Transform (SIFT), template matching, edge matching, or the like. In some exemplary embodiments, each skin may register on one or more object type. In some exemplary embodiments, in order to improve performance, the framework may only try to identify objects on which at least one skin is registered. As an example, in case that skins are registered on objects of type "face" and "hat", the framework may skip large objects such as a car, a house, or the like. In some exemplary embodiments, the framework may analyze the frame and maintain a metadata record representing the frame identifying each object appearing in the frame. Additionally or alternatively, the metadata may be indicative to the surrounding of the user, to people that may be with the user, or the like.

On Step 230, the framework may invoke a skin. The framework may hold a list of available skins and corresponding objects and pull information regarding the identified faces from a social network database, or from any other database. Each skin may be executed on its registered object and provide an overlay based thereon. In case more than one skin is registered on a same frame object, the AR framework may determine whether sequential execution is necessary or whether non-sequential execution is to be performed. In case non-sequential execution is performed, resulting overlays are to be examined to identify whether they are inconsistent or conflict each other, which may result with additional processing.

On Step 240, the framework obtains an overlay that is the output of the skin. In some exemplary embodiments, in case that the skin was not executed locally (e.g. executed on an edge computer, on a cloud server, or the like), the overlay may be obtained therefrom via a communication channel. In some exemplary embodiments, the skin may be executed locally as function. The overlay may be the output of the function. Additionally or alternatively, the skin may be executed remotely. The overlay may be provided to the AR framework as a stream. Additionally or alternatively, the overlay may comprise a bitmap image and a bitmap mask. The bitmap image may comprise the content of the pixels to be drawn, while the bitmap mask may comprise a corresponding bitmap, where each cell corresponds to a bit. The value of the bit in the bitmap mask may indicate whether or not the value of the overlay is to be used. As an example, consider a frame f, an overlay bitmap image, o, and a mask, m. For each pixel (x,y), the output value (out) representing the AR final display may be computed as $dis(x,y)=o(x,y) \cdot m(x,y)+f(x,y) \cdot (1-m(x,y))$. The overlay display (od), however, may be computed as $od(x,y)=o(x,y) \cdot m(x,y)$. Bitwise operations may be performed on the bitmasks, such as dis=(o AND m)XOR (f AND¬m), and od=o AND m. In some exemplary embodiments, the mask may be either 0 (do not use the overlay bit) or 1 (use the overlay bit). Additionally or alternatively, values in between 0 and 1 may be used to provide for opaqueness and transparency properties.

In some exemplary embodiments, the overlay may be an image in the size of the frame, or a smaller sized image that is configured to be presented in front of the frame. In some exemplary embodiments, the AR framework may combine the overlay with the frame at an end phase, or alternatively, the processing skin may combine the overlay with the frame. In some exemplary embodiments, in case the overlay is of the size of the image, the overlay may comprise certain pixels from the output of the skin and transparent pixels when no skin output is received for a certain location in the frame. Additionally or alternatively, the overlay may comprise an image that may be the output of the skin and its relative position in the frame. In some exemplary embodiments, in case the AR framework is to combine the overlay with the frame, the overlay may comprise information or metadata regarding the importance the position of the skin output in the frame. As an example, an informative skin that adds labels to objects may be agnostic regarding the position of the label. Additionally or alternatively, a skin that adds location-sensitive information such as a skin applying lipstick to lips may be configured to set its location requirement to a high and/or maximal score, e.g., such as "high", "1", or the like.

In some exemplary embodiments, if the view of the AR device is shared, the overlay display may be overlaid over the frame to generate the AR frame, which represents the view that is perceived by the user using the AR device.

In some exemplary embodiments, Steps 230-240 may be performed iteratively, or in a non-sequential manner such as simultaneously, until all skins that are registered on available objects or skins that are estimated to be created are invoked. In some exemplary embodiments, each overlay may be obtained and added to the frame subsequently. Additionally or alternatively, the overlays may be combined with one another, and maintained separately from the frame itself. The skins may receive the frame and the combined (previous) overlays. Additionally or alternatively, the skins may receive an augmented frame, comprising the frame and combined (previous) overlays, for processing. Additionally or alternatively, skins may be processed on the same frame in a non-sequential manner, without waiting for an overlay input or an overlay-combined frame from the previous skin.

On Step 250, the final overlay display that is generated, based on the combined overlays of the invoked skins, may be displayed. It is noted that the overlay is configured to be seamlessly interwoven with the physical world, which is represented by the original frame of Step 210. As a result, the overlay display is overlaid over the physical world, without combing the frame itself. In some exemplary embodiments, the AR glasses may not be transparent, but rather may include screen-lenses that hide the real environment from the user. In such cases, the AR glasses may combine the captured frame, which may be captured from any location, with the AR view and display both on the glasses' screens. In some exemplary embodiments, in case the AR device comprises a non-wearable device such as a user device with a screen, the device may capture the real-world surroundings and combine it with artificial overlays.

In some exemplary embodiments, an AR framework may be operatively coupled with one or more frame sensors. The frame sensors may produce a stream of frames. The AR framework may obtain the streams. In the case that there are several frame sensors, the AR framework may combine multiple streams of frames into a single stream. In case that a skin is registered on types of objects that the single stream comprises, the AR framework may apply the skin on an appropriate object for each frame. In some exemplary embodiments, steps 210-250 may be repeated.

In some exemplary embodiments, a user may configure the AR framework to execute a skin at a specific location, for a specific time duration, or the like. As an example, a user may be using his AR glasses constantly. When he enters the supermarket, a skin that shows prices of products may be added to the list of active skins and may be invoked as long as the user is in the supermarket. When the user leaves the supermarket, the skin may be deactivated. In some cases, the user may set his personal preferences for activation or deactivation of skins, such as based on his location, based on a context, based on a time of day, based on a social environment in which he his located, based on activations of other skins, or the like. In some exemplary embodiments, a user may configure the AR framework to prefer certain layers over others, e.g., in case not all the skins can be executed. In some exemplary embodiments, a user may configure the AR framework to retain a privacy of one or more skins. In some exemplary embodiments, a user may configure the AR framework to implement one or more constraints.

Figure 3:
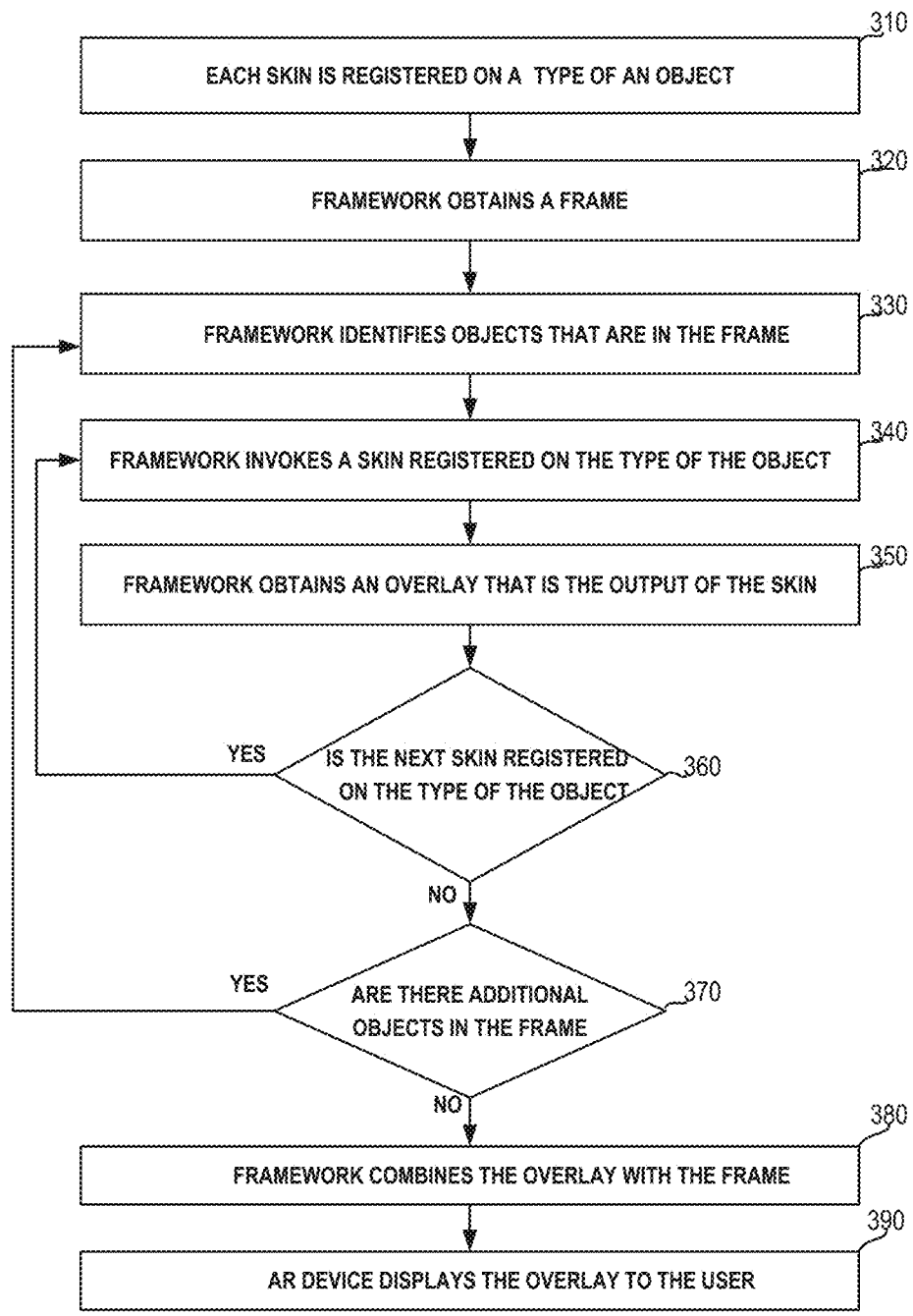
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter.

On Step 310, each skin is registered on a type of an object. In some exemplary embodiments, each skin may register with the AR framework to receive notification and handle specific types of objects. In some exemplary embodiments, some skins may not utilize or rely on the AR framework, and may identify frame objects independently or using alternative resources. In some exemplary embodiments, some skins may not be registered to objects but to the frame itself, such as skins enhancing a lighting of a frame, thereby automatically registering to every frame without relying on classifications of the AR framework. The AR framework may support a variety of objects types, such as but not limited to a person, an animal, a house, a road, a plant, a tree, a face, an eye, or the like. In some exemplary embodiments, an object may be classified as having a plurality of object types, such as objects that are an abstraction or instantiation of one another (e.g., a police officer may be an instantiation of an abstract person type), objects that have more than one attribute corresponding to an object type (e.g., a person may be both an adult, a female and a Caucasian), or the like. In some exemplary embodiments, an object may comprise other objects. As an example, an object of type person may comprise objects of type face, eyes, arms, clothes, or the like.

On Step 320, the AR framework obtains a frame. The frame may be obtained from a frame sensor such as a camera that is embedded in an AR Glasses, from a camera that is embedded in a mobile phone, from a surveillance camera, from a thermographic camera, from an infrared camera, or the like. The frame sensor may capture one frame after the other and produce a stream of frames. The frame sensor may obtain frames that may be processed to generate output overlays for the frames in a rate such as 90 Frames per Second (FPS), 60 FPS, or the like. In some exemplary embodiments, a rate which is lower than 60 may result in a quality which may be poor for human users.

The AR framework may obtain a frame from a frame sensor and may send the frame, transmit the frame, save the frame, or the like for future processing. In some exemplary embodiments, the AR framework may obtain several frames from multiple sources in a single time unit and merge the frames to a single frame prior to processing the frame. As an example, the AR framework may not have access to a frame as viewed from the field of view of the user. Using a plurality of cameras, several different images may be transformed and merged together to provide an estimated frame of the view of the user. The image of the room or of the person may be taken from several image sensors. Frames from different image sensors may be merged to a single frame. Combining images from different view points may enable to enhance the user's AR vision, such as by enabling the user to see "through" objects, e.g., using one or more skins that utilize the additional fields of view. Additionally, in a configuration that combines different fields of view, the combined frame may be used for a plurality of nearby AR devices of different users.

On Step 330, the AR framework identifies objects that appear in the frame. An object appearing in the frame may be identified and classified to a type. The AR framework may employ object recognition, computer vision techniques, Artificial Intelligent (AI) algorithms, or the like, to identify the objects in the frame. Additionally or alternatively, metadata about objects may be available in other manners, such as using wireless transmission, RFID, consultation with 3D maps, or the like. In some exemplary embodiments, objects not appearing in the frame may be identified too, e.g., in case a skin is estimated to add such an object.

In some exemplary embodiments, the AR framework may classify the objects to types and may build a list comprising the types of the objects that comprised by the frame. In some exemplary embodiments, the AR framework may create or maintain a metadata record. The metadata record may be updated to comprise each identified object and properties thereof. For example, the metadata record may indicate for an object its type, its location in the frame, its dimensions, or the like. In some exemplary embodiments, skins that are executed by the AR framework may access the metadata record, utilize its content, and potentially update it.

In some exemplary embodiments, an object may not have existed in the frame as captured by the frame sensor. A skin may process the frame or portion thereof and add an object record to the metadata record to indicate the existence of the new object, to ensure it is processed correctly. As an example, a skin may add a label to be presented near an existing object, a skin may add an object of a cat, a navigation skin may add a graphical representation of a route on top of the road, or the like. As another example, the AR framework may add images of family members of a person that is shown in a frame, a garden near a house, or the like.

On Step 340, the AR framework invokes a skin which is registered on the type of the detected object in the frame. As each skin may have registered on types of objects which are of interest to it (e.g., Step 310), the AR framework may invoke only skins that have objects of interest in the frame to avoid having each skin determine, dynamically, whether objects of interest appear in the frame, requiring resource consumption, such as energy and processing resources.

In some exemplary embodiments, the AR framework may be executed by a device, such as but not limited to the AR device (e.g., AR Glasses 120) itself, an edge computer (e.g., Edge 130, 130' of FIG. 1), a server (e.g. Server 140 of FIG. 1), or a combination thereof. In some cases, each skin may be executed on a different device, for example, on an AR device (e.g., AR Glasses 120 of FIG. 1), on an edge computer (e.g., Edges 130,130' of FIG. 1), on a server (e.g., Server 140 of FIG. 1), or the like. The AR framework may invoke the skin on the relevant computing environment to process the objects of interest. As an example, the skin may begin execution upon a command of the AR framework. As another example, the skin may be executed by a daemon process that pre-exists and begins processing in response to a command from the AR framework. In some cases, if several skins are registered on the same object, the AR framework may invoke them one after the other.

In some exemplary embodiments, the AR framework may provide the invoked skin with a frame, a portion of the frame (also referred to as a "sub frame" or "patch"), or the like. In some exemplary embodiments, the AR framework may provide the skin with the sub frame that consists of the object of interest. If several objects appear, the AR framework may invoke the skin a plurality of times, each of which with a different sub frame. Additionally or alternatively, the AR framework may provide the skin with the metadata of the object, for accessing and potentially for updating. For example, if the skin performs facial recognition, the skin may update the metadata properties of the object to indicate the identified person of the object. Other skins that perform facial recognition may avoid performing facial recognition and rely on the output of a previous skin. Additionally or alternatively, the output of the previous skin may be verified prior to being relied upon.

Additionally or alternatively, the AR framework may provide the skin as an input an editable section of the frame. The editable section may be an area in the frame or patch on which the output of the skin may be drawn.

Additionally or alternatively, the input provided to the skin may comprise the metadata record. The metadata record may comprise data such as a list of objects that are in the frame or patch, properties of the objects, coordinates on which the skin is allowed to draw on, the context in which the frame was taken, properties regarding the person using the AR device, or the like. Additionally or alternatively, due to privacy and security considerations, the metadata record may not be supplied to the skin directly, but may be made accessible thereto, such as by a mechanism of queries that the skin may invoke. In some exemplary embodiments, a context of the frame may comprise the location in which the frame was taken, information about the location (e.g. a private house, a work place, information from Geographic Information System (GIS), or the like), the date in which the frame was taken, data regarding the date (e.g. a birthday, an anniversary, or the like), data regarding the frame sensor used to obtain the frame, or the like.

In some exemplary embodiments, the skin may modify the object in a constructive manner, such as by augmenting the object with additional objects, decorations, ornaments, or the like. Additionally or alternatively, the skin may modify the object in a destructive manner, such as painting over the object to remove the object, replacing the object by another object, or the like.

In some exemplary embodiments, the skin may provide an output. The output may comprise an overlay to be displayed over the frame or provided patch, as determined by the skin. As an example, a skin may add a balloon to appear in a hand of a child. The output may thus by an overlay that, when applied over the frame, adds the balloon at the determined location. As another example, a skin may add a green line on a road, indicating a route on the road. In that case, the output of the skin may be provided using a set of coordinates and a corresponding color, defining the overlay implicitly. As yet another example, the output of the skin may comprise a label with text comprising information about the input object.

Additionally, or alternatively, the skin output may comprise the metadata record. In some cases, the metadata record may be updated by the skin to add information gathered by the skin to existing objects, to add new objects (e.g., the balloon added in the example above), or the like. Additionally, or alternatively, the metadata record may comprise painting instructions to be implemented by the AR framework. As an example, if a skin paints a label before having the final augmented frame, labels may be positioned in a sub-optimal location, such as in a distribution that is too dense, blocking important objects or other visual information, or the like. The skins may add instruction for the AR framework to add labels to objects, such as a name near a person, a material of a structure near the structure, a price tag near a merchandise, a speed indication near a windshield, or the like. After all the skins are executed, and after the overlay display is generated (Step 380), the AR framework may determine the location, size, and other visual properties of the labels, and draw them, to add an additional overlay layer, referred to as a label overlay.

In some exemplary embodiments, the metadata record outputted by the skin may be the updated metadata record. Additionally, or alternatively, the metadata record may comprise the added information only, so as to allow the AR framework to modify the metadata record accordingly at its discretion.

On Step 350, the AR framework obtains an overlay that is the output of the skin. In case that the skin is being executed in the same apparatus as the AR framework, the overlay may be pointed by a pointer that was the input of the skin, or the like. In some exemplary embodiments, the skin may be executed on a different execution platform, such as an edge computer, a server, or the like. The remote platform may send, transmit, or the like, its output as a stream to the AR framework. Additionally or alternatively, the executing platform may store the output of the skin on a local storage device, on a remote cloud server, or the like. The AR framework may access the medium on which the output of the skin is retained and pull the overlay.

In some exemplary embodiments, the skin may output the first overlay followed by outputting updates when its output changes. Each output beside the first overlay may be the delta from the previous output.

As explained above, in some cases, labels may be added at a later stage, allowing other objects to be drawn, as the location of the label may be less important compared to the location of other objects. As an example, in some cases, the label may be drawn far from the object it is associated with and connected thereto using an arrow, a line, or the like. As an example, a label with information about an historical place may be above, below, on the left or on the right of the image of that place. The AR framework may determine the exact location of the label, its size, and other graphical properties after the overlay display is generated.

On Step 360, it may be determined if there is another skin that is registered on the same type of object. If so, Steps 340 and 350 may be performed again with the respect to the next skin, which may process the same objects. Otherwise, Step 370 may be performed.

On Step 370, in case there is another object in the frame that was not yet processed, Steps 330-360 may be repeated with respect to the additional object. As a result, the AR framework may iterate over each object that is in the frame and invoke skins thereon. Otherwise, Step 380 may be performed.

It may be noted that in some cases, skins may be executed in parallel. In some cases, skins that are registered on different types of objects may be executed in parallel to reduce overall computation time. In some cases, a first skin may be registered on a first type of object before a second skin. The second skin may also be registered on another type of object. The first skin may process an object of the first type in parallel to the second skin processing an object of the second type. After the first skin completes its processing, the second skin may process the object of the first type. As another example, if there are a plurality of objects of the first type, the first skin may process the first object, provide an output for the second skin to process the first object sequentially. While the second skin processes the first object, the first skin may continue to process, in parallel, a next object of the same type, creating a pipeline between the first skin and the second skin. In some exemplary embodiments, parallel execution may be performed on different execution platforms. Additionally or alternatively, parallel execution may be useful to reduce latency which may be caused by extra processing time. In some exemplary embodiments, the final output may be provided within a target time, so as to enable an output display stream at a desired rate, such as for example, a rate of 20 FPS, 60 FPS, 90 FPS, or the like (e.g., ±10%).

On Step 380, the AR framework may combine overlays from different skins to provide an output overlay. The output overlay may be displayed to the user, providing an augmented reality experience with augmentation over the frame viewed by the user. Additionally or alternatively, a label overlay may be generated by the AR framework and combined with the skin-generated overlays.

In some exemplary embodiments, the AR framework may add the overlay of each skin to the overlay as soon as the overlay is available. Additionally or alternatively, it may be useful to postpone adding an overlay in order to save processing time. A second skin may be registered on an object that is the output of the first skin. The second skin may change the objects that the first skin generated. Hence, there may be no need to draw the output of the first skin, and any computation time spent in adding it may be wasted.

In some exemplary embodiments, the metadata record which may be passed between the skins and the framework and potentially modified by the skins, may comprise privacy settings. The privacy settings may be settings of an object appearing in the frame or in the overlay display. As an example, the privacy settings may indicate whether the image may be retained, may be shared with other people, or the like. Privacy settings may be defined by the user, may be updated by the skins, or the like. In some exemplary embodiments, the AR framework may enforce the restrictions defined by the privacy settings. For example, if the privacy settings allow retaining and sharing of the frame, the frame may be retained and shared. Additionally or alternatively, the AR framework may combine the frame and display overlay for generating the AR view to be shared and retained for future use. If the privacy settings do not allow sharing of the frame, the frame itself may not be shared with others. Additionally or alternatively, if the privacy settings prevent the sharing or storage of specific objects in the frame, the AR framework may edit and redact portions of the frame, of the display overlay, combination thereof, or the like, based on the privacy settings.

On Step 390, the overlay display is displayed using the AR device. As a result, the overlay display is overlaid over the physical world, without combining the frame itself. In some exemplary embodiments, the overlay display is displayed by the AR glasses, providing personalized AR view of the world to the user. Additionally or alternatively, the AR device may be the windshield of a vehicle, providing a passenger of the vehicle with an augmented view of the surroundings of the vehicle. In other embodiments, the AR device may be located at any other location and/or device.

Figure 4:
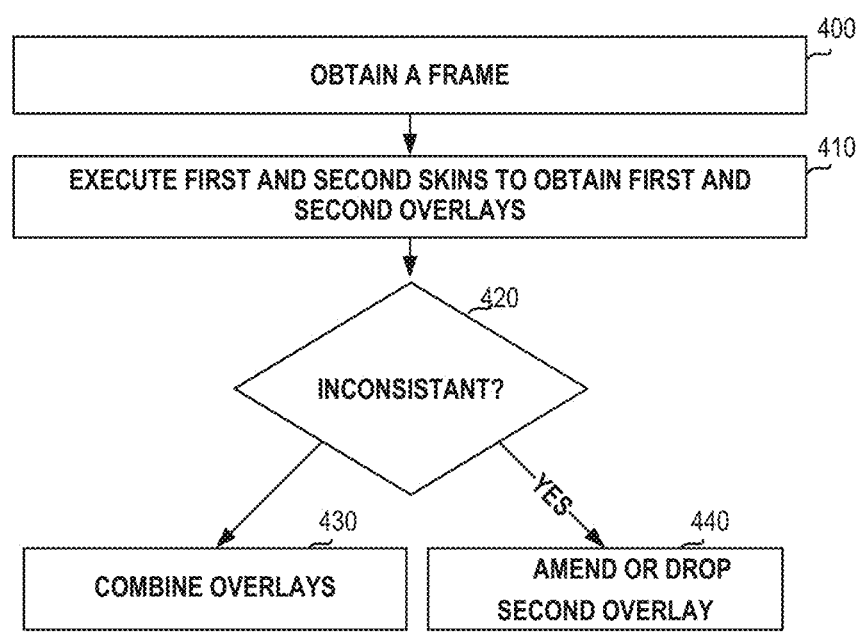
FIG. 4 shows a flowchart diagram of a method, in accordance with some exemplary embodiments of the disclosed subject matter.

Referring now to FIG. 4 illustrating a flowchart diagram of a method, in accordance with some exemplary embodiments of the disclosed subject matter.

On Step 400, a frame may be obtained by an AR system, an AR framework, or the like, which may be configured to provide an AR view. In some exemplary embodiments, the frame may be obtained from one or more frame sensors of the AR system such as a camera of an AR device, an indoor camera, a street camera, or the like. In some exemplary embodiments, the AR device of system may consist of AR glasses, which may enable to display augmented overlays that combine naturally with the surroundings of the user. In some exemplary embodiments, an AR device may include a user device with a screen and a camera, such as a camera device, a personal computer, a television, a mobile device, a Tablet, or the like. In such cases, applications in the user device may be used to capture photos or videos, and augment thereto virtual overlays. For example, a television may obtain television frames from a content source, and utilize one or more skins to generate and display one or more virtual overlays over the television frames. As another example, a mobile device application such as the ZOOM™ application may utilize one or more skins to generate and display one or more virtual overlays over the rendered ZOOM™ videos, e.g., changing a background of a video, changing a human depicted in a video, or the like.

In some exemplary embodiments, the frame may be obtained in a similar manner to Step 210 of FIG. 2, to Step 320 of FIG. 3, or the like. In some exemplary embodiments, one or more objects in the frame may be identified. In some exemplary embodiments, each identified object may or may not have one or more registered layers, skins, or the like. In some exemplary embodiments, the AR system may be configured to utilize or invoke one or more registered skins on the frame or portion thereof, each of which may be configured to provide an augmented overlay or an indication thereof to be used by the AR system for generating the AR view. In some exemplary embodiments, the registered skins may include at least a first skin and a second skin that are both registered on a same object, portion, overlapping objects, or the like, of the frame. In some exemplary embodiments, an identified object in the frame that has at least two registered skins may have a skin execution order between the registered skins, indicating that the first skin is to be executed before the second skin.

On Step 410, in spite of the order of execution, at least a portion of the skins may be executed in a non-sequential order by one or more devices such as a remote server, an edge device, the AR device, or the like. In some exemplary embodiments, the first skin may be executed on a frame, on one or more patches thereof, one or more objects thereof, or the like, e.g., in order to obtain a first overlay. In some exemplary embodiments, the frame may comprise an original captured frame or a processed frame which may comprise a frame that has gone through execution of one or more skins and has one or more overlays, instructions, labels, or the like as outcome from the execution. In some exemplary embodiments, the second skin that is subsequent to the first skin may be executed on the same frame or patch as the first skin, e.g., in order to obtain a second overlay. In some exemplary embodiments, the first and second skins may be executed in a non-sequential manner, e.g., simultaneously, in parallel, in partially overlapping times, or the like. In some exemplary embodiments, executing the second skin may be performed without obtaining the first overlay from the first skin, e.g., in contrary to the skin execution order that requires to first obtain the previous overlay before generating a next overlay. In some exemplary embodiments, the first skin and the second skin may be executed in parallel, simultaneously, in timeframes that have one or more overlaps, or the like, e.g., in order to reduce a computational time.

In some exemplary embodiments, the determination as to whether the first and second layers should be executed in a non-sequential way, or whether they should be executed sequentially one after the other may be ruled by a predictor. In some exemplary embodiments, the predictor may be trained to estimate outcomes of each layer and estimate whether or not they conflict, are inconsistent, or the like. In some exemplary embodiments, the predictor may be data-driven, configured based on heuristics, or the like. In some exemplary embodiments, in case the estimations of outcomes are determined by a data-driven predictor such as a machine learning classifier, the estimations' accuracy may improve over time as more data regarding success of previous estimations may be gathered. In some exemplary embodiments, the predictor may be utilized for a single object that has different registered layers, and for different objects that may overlap, e.g., two people hugging each other. In some exemplary embodiments, the predictor may provide a predication as to what is the probability that a skin will be inconsistent with another skin. In case the probability indicates that the skins will be inconsistent, the skins may be processed sequentially. Otherwise, they may be processed in a non-sequential manner. For example, a predictor may indicate to a third layer that is registered on an object that certain portions of the object will probably not be affected by the two previous layers, e.g., in case a probability is below a threshold. In such cases, the frame may be processed by the third layer prior to obtaining a second overlay from the second layer, with a small chance of requiring further amendments or processing.

In some exemplary embodiments, the predictor may be configured to predict whether or not objects are added or removed by a skin in a manner that affects subsequent skins. In some exemplary embodiments, in case the predictor indicates that the first overlay and the second overlay are consistent, the first and second skins may be executed in a non-sequential manner. In some exemplary embodiments, in case the predictor indicates that the first overlay will be inconsistent with a small portion of the second overlay, e.g., below a threshold, a partial execution of the second skin may be performed, e.g., in areas that are not predicted to be affected by the first overlay. In some exemplary embodiments, performing the partial execution may comprise generating a partial second overlay that is predicted to have a low probability of overlapping with pixels of the first overlay. In some exemplary embodiments, the AR view may be generated by utilizing the first overlay, utilizing the partial second overlay, and completing execution of the second overlay based on the first overlay. In some exemplary embodiments, the predictor may predict which pixels are most likely to be affected by the previous layers, and those pixels may not be processed until the previous layer's execution is completed. For example, a predictor may indicate to a third layer that is registered on an object that certain portions of the object are probably not going to be affected by the two previous layers, and thus those portions may be processed by the third layer prior to obtaining the previous overlay. In some exemplary embodiments, in case the predictor indicates that the first overlay will be inconsistent with a large portion of the second overlay, e.g., above a threshold, the skins may be executed sequentially.

As an example, the first layer may be configured to modify a hairstyle of people objects to a funky hairstyle with spiky hair, while the second layer may be configured to place a hat on human heads. For bold people, the skins may be estimated to be consistent as there may be no overlap between affected pixels by the layers. For people with short hair that does not stick out of the intended hat's boundary, the skins may be determined to be mildly inconsistent as a conflicting area may require a minor amendment that places that hat above the spiky hair. For people with long hair that sticks out of the intended hat's area after being processed by the first layer, the skins may be determined to be largely inconsistent as the conflicting area is complex and large. In such cases, sequential execution may be advantageous.

On Step 420, the first and second overlays that are outputted from the first and second skins may be compared to each other in order to identify whether they are inconsistent with each other. In some exemplary embodiments, an inconsistency or a consistency between the first overlay and the second overlay may be measured. In some exemplary embodiments, in case the first and second overlays are inconsistent with each other, the inconsistency measurement may be compared to an inconsistency threshold. In some exemplary embodiments, in case the inconsistency measurement is smaller than the inconsistency threshold, the second overlay may be modified. Additionally or alternatively, in case that inconsistency measurement complies with the inconsistency threshold, the second overlay may be regenerated. In some exemplary embodiments, the inconsistency measurement may comprise a ratio given by the following formula:

(overlap area)/(area of the first overlay+area of the second overlay)

In some exemplary embodiments, the overlap area may be the area in which the first overlay and the second overlay overlap. Additionally or alternatively, the inconsistency function may be configured to measure a ratio based on the number of pixels affected by each overlay as given by the following formula:

(number of pixels in the overlapping area)/(number of pixels comprised by the first overlay+number of pixels comprised by the second overlay)

In some exemplary embodiments, the output overlays from each skin may be analyzed to determine whether the output of a skin can be utilized in combination with the previous skin, e.g., to comply with the required outcome according to the order of execution. In some exemplary embodiments, the pixels or objects that were added or modified by each skin may be compared to identify any overlaps, same affected areas in the frame, semantic modification, or the like. In some exemplary embodiments, based on the comparison between the overlays, it may be determined whether or not the second overlay can be utilized as is for providing the AR view. In some exemplary embodiments, the AR view may be generated based on the first overlay and based on the determination as to whether the second overlay can be utilized for providing the AR view.

In some exemplary embodiments, a computation may be performed to determine whether new objects to which the second skin is registered were added to the frame by the first skin.

In some exemplary embodiments, overlays may be determined to be inconsistent with each other in case they increase a latency above a threshold. In some exemplary embodiments, in some cases, the second skin may be configured to be executed on a first execution platform, and a first latency of a communication between the AR device to the first execution platform may be determined to be above a latency threshold, e.g., indicating the latency is unacceptable. In some exemplary embodiments, a second latency of a communication between the AR device and a second execution platform may be determined to be below the latency threshold, e.g., complying therewith. In some exemplary embodiments, in such a case, determining whether the second overlay can be utilized for providing the AR view may comprise determining that the second overlay cannot be utilized for providing the AR view. In some exemplary embodiments, executing the second skin may comprise executing the second skin on the second execution platform. In some exemplary embodiments, generating the AR overlay for the frame may be based on the second overlay.

On Step 430, in case the comparison indicates that the first and second overlays are consistent with each other, do not overlap, do not comprise overlapping pixels, or the like, the second overlay may be determined to be utilized for generating the AR view. In some exemplary embodiments, the output overlays of both skins may be utilized by the AR system in order to display an AR view, e.g., in combination. In some exemplary embodiments, the first and second overlays may be applied to the frame as part of generating the AR view. In some exemplary embodiments, a latency of the AR framework may be reduced, as there may be no need for sequential execution. Specifically, instead of waiting for the output of the first skin prior to starting execution of the second skin, both skins are executed in the same time. In some exemplary embodiments, any other number of skins may be executed in parallel. For example, three skins, four skins, or the like.

On Step 440, in case the comparison indicates that the first and second overlays are inconsistent with each other, or that new objects were created that invoke the second skin, the second overlay may be amended or dropped. In some exemplary embodiments, upon determining that the first and second overlays comprise a small number overlapping pixels, or that amending the second overlay to become consistent with the first overlay utilizes minor resources, the second overlay may be modified to obtain a modified second overlay that may be utilized for generating the AR view. In some exemplary embodiments, modifying the second overlay may comprise executing the second overlay on portions of the frame using the first overlay, executing an image processing algorithm on the frame, or the like. In some exemplary embodiments, in case modifying the second overlay is infeasible, e.g., due to the second overlay affecting large pixel areas, or the like, the second overlay may be dropped to be later re-computed, regenerated, or the like, and the new overlay may be utilized for generating the AR view.

In some exemplary embodiments, modifying the second overlay may include regenerating a portion of the second overlay, e.g., an overlapping pixel area that overlaps with the first overlay, or any other portion of the second overlay, and utilizing the regenerated portion as well as the remaining original second overlay as the modified second overlay. In some exemplary embodiments, in case a new object was created by the first skin to which the second skin is registered, the second overlay may be amended by regenerating the second skin only on the new object, without regenerating the entire second overlay. In some exemplary embodiments, the AR view may be generated by utilizing the modified second overlay.

In some exemplary embodiments, in case the overlapping pixels comprises a large number of pixels that is above a threshold, or amending the inconsistency is determined to be resource consuming, an amendment may not be advantageous. In some exemplary embodiments, a new overlay or portions thereof may be generated by the second layer based on the first overlay, e.g., in accordance to the order of execution. In some exemplary embodiments, the AR view may be generated by utilizing the regenerated second overlay.

In some exemplary embodiments, the AR overlay may be generated. The AR overlay may be generated base on the frame. In some exemplary embodiments, the AR overlay may comprise a combination of the first overlay, the second overlay in its original or amended version, and any other layer that registered to the frame or portions thereof. In some exemplary embodiments, the AR overlay may be displayed by the AR device to a user.

Steps 400-440 may be performed repeatedly, iteratively, or the like, for a stream of frames captured by one or more frame sensors. In some exemplary embodiments, Steps 400-440 may be performed for each frame that is obtained by the AR device that has one or more layers that are registered on a same object, on overlapping objects, or the like.

Referring now to FIG. 5A-5E illustrating an exemplary scenario according to the method of FIG. 4, in accordance with some exemplary embodiments of the disclosed subject matter.

In some exemplary embodiments, a first skin may be configured to provide an overlay that adds a hat on top of human objects' heads. In some exemplary embodiments, a second skin may be configured to provide an overlay that colors hair of any object, e.g., human or non-human, to blond.

Figure 5A:
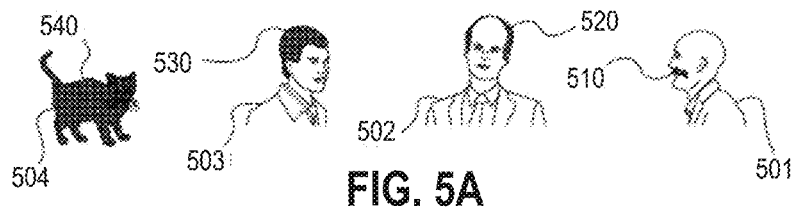
FIGS. 5A-5E show a schematic illustration of an exemplary scenario in which the disclosed subject matter may be utilized, in accordance with some exemplary embodiments of the disclosed subject matter.

FIG. 5A illustrates a raw-data frame that was not yet processed by layers. The frame may be captured by a frame sensor. As illustrated in FIG. 5A, the frame includes a Person 501 having a Mustache 510, a Person 502 having Hairstyle 520, a Person 503 having Hairstyle 530, and a cat 504 Having Fur 540. In some exemplary embodiments, Mustache 510, Hair 520, Hair 530 and Fur 540 may be black.

Figure 5B:
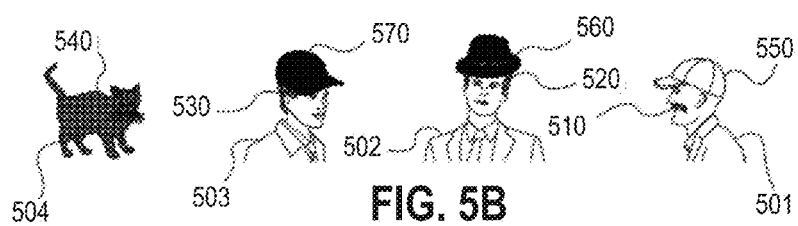

FIG. 5B illustrates the frame of FIG. 5A after being processed by the first skin that is configured to add hats, e.g., providing a first overlay. As illustrated in FIG. 5B, the first overlay added Hat 550, Hat 560 and Hat 570 to Person 501, Person 502, and Person 503, respectively.

Figure 5C:
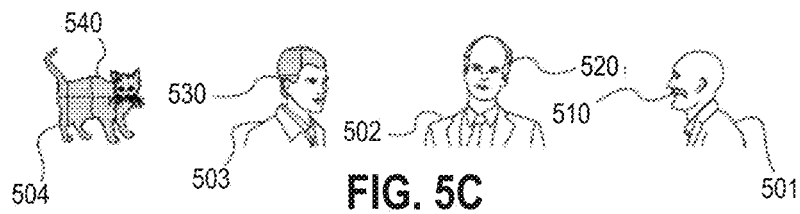

FIG. 5C illustrates the frame of FIG. 5A after being processed by the second skin that is configured to color hair or fur, e.g., providing a second overlay. The second skin may be processed in a non-sequential manner, without obtaining the first overlay from the first skin. As illustrated in FIG. 5C, the second overlay colored the hairs of Mustache 510, Hair 520, Hair 530 and Fur 540, to a blond color.

Figure 5D:
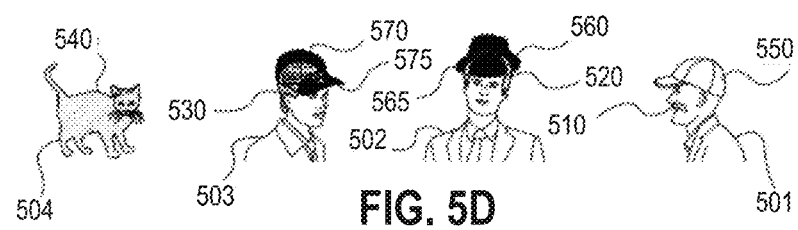

FIG. 5D illustrates an inconsistency between the first overlay of FIG. 5B and the second overlay of FIG. 5C. As illustrated in FIG. 5D, a first inconsistency 565 occurs when the second overlay overlaps with pixels of Hat 560 that was modified by the first overlay. As illustrated in FIG. 5D, a second inconsistency 575 occurs when the second overlay overlaps with pixels of Hat 570 that was modified by the first overlay.

Figure 5E:
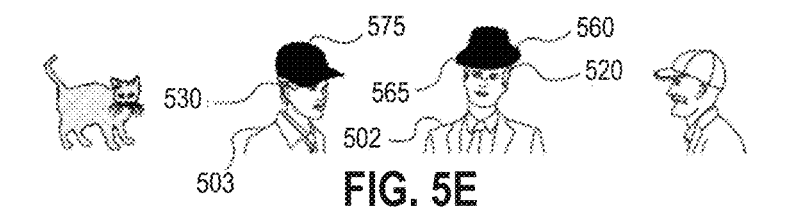

FIG. 5E may illustrate a correction of FIG. 5D. As illustrated in FIG. 5E, conflicting pixels between the first and second overlays such as inconsistencies 565 and 575 are amended. In some exemplary embodiments, the inconsistency between the layers may be determined to be relatively minor, so that an amendment of the conflicting pixels may suffice for solving the inconsistency. In some exemplary embodiments, in case the inconsistency between the layers is determined to be major, the second overlay of FIG. 5C may be dropped, and the second skin may be executed again on the first overlay of FIG. 5B.

In case that modifying the second overlay is determined to be more efficient than regenerating the entire second overlay, the inconsistency may be determined to be minor. In case that modifying the second overlay is determined to be less efficient than regenerating the entire second overlay, the inconsistency may be determined to be major.

Figure 6:
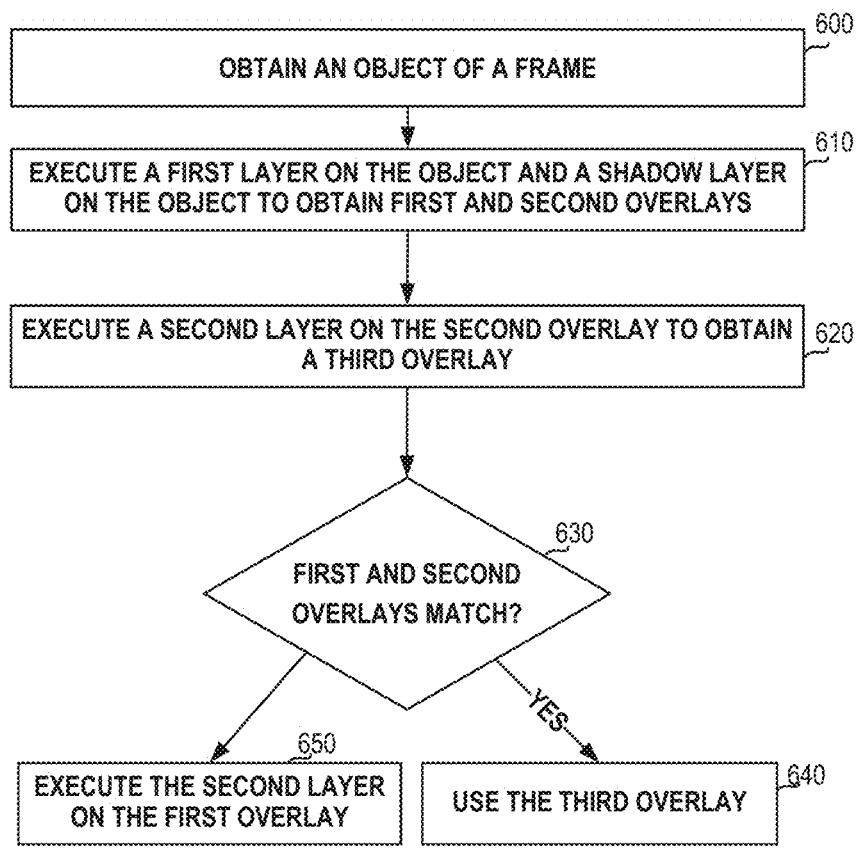
FIG. 6 shows a flowchart diagram of a method, in accordance with some exemplary embodiments of the disclosed subject matter.

Referring now to FIG. 6 illustrating a flowchart diagram of a method, in accordance with some exemplary embodiments of the disclosed subject matter.

On Step 600, an object depicted in a frame may be obtained. In some exemplary embodiments, the frame may include a raw-data frame, a partially processed frame, or the like, which may depict at least one object. In some exemplary embodiments, at least a first layer and a second layer may be registered on the object.

On Step 610, the first layer may be executed on the frame at a first execution platform, and simultaneously the first layer may be executed on the frame at a second execution platform (referred to as "shadow layer" or "shadow skin"). In some exemplary embodiments, a skin execution order may define that the first layer is to be executed at the first execution platform, and that the second layer is to be executed at the second execution platform, e.g., after obtaining the overlay of the first layer form the first execution platform. In some exemplary embodiments, the shadow layer, which may be executed at the second execution platform, may comprise a layer that is identical to the first layer. In some exemplary embodiments, the shadow layer may be a copy of the first layer, that is configured to perform the same operation as the first skin while running on a different execution platform, e.g., the second execution platform.

In some exemplary embodiments, the execution of the first layer on the object may provide a first overlay at the first execution platform, and execution of the shadow layer on the object may provide a second overlay that may be a shadow overlay of the first overlay. In some exemplary embodiments, the execution of the shadow layer may be performed in addition to the regular execution of the first layer, e.g., in a non-sequential manner, in overlapping timeframes, simultaneously, or the like.

In some exemplary embodiments, shadow layers may be determined to be executed in case two subsequent layers are configured to be executed at different execution platforms, and a shadow layer of the first layer is enabled to be executed at the second platform. In some exemplary embodiments, shadow layers may be executed in case the second execution platform is at least partially idle during an execution of the first layer or has extra computational power that can be utilized for the task. In some exemplary embodiments, shadow layers may be executed at a server or any other second execution platform while the original first layer may be processed at the first execution platform, e.g., the AR device, a cloud server, or the like. In some cases, a shadow layer may be preferably executed at a server or edge device, e.g., since the AR device may have less resources available compared to a server or an edge device. In other cases, shadow layers may be executed at any other device.

On Step 620, the second layer may be executed at the second execution platform, e.g., based on the second shadow overlay. In some exemplary embodiments, the execution of the second layer may provide a third overlay that is based on the output of the shadow layer, e.g., which is immediately available at the second execution platform upon completion of execution of the shadow layer. In some exemplary embodiments, the shadow overlay may be utilized as an input to the second skin, which may be executed at the second execution platform.

In some exemplary embodiments, in order to reduce a latency of executing the first layer at the first execution platform, e.g., the AR device, and communicating the output overlay of the first layer to the second execution platform, e.g., the server, prior to starting to execute the second layer, the second execution platform may execute the second layer immediately using the shadow overlay. In some exemplary embodiments, utilizing the shadow overlay may eliminate any waiting time for obtaining the first overlay from the first execution platform.

On Step 630, the first and second overlays may be compared to determine whether they are consistent, match, are identical, or the like. In some exemplary embodiments, after executing the first layer at the first execution platform to produce a first overlay, the first overlay may be communicated to the second execution platform. In some exemplary embodiments, the second execution platform may compare the first overlay with the second shadow overlay, to determine whether the second overlay can be utilized for providing the AR view. In some exemplary embodiments, in case the second overlay of the shadow layer is consistent with the first overlay of the first execution platform, this may indicate that the shadow layer was successful in imitating the first overlay and can therefore be utilized instead of the first overlay. In such a case, the flow may continue to Step 640. In some exemplary embodiments, in case the second overlay of the shadow layer is not consistent with the first overlay of the first execution platform, this may indicate that the shadow layer was unsuccessful in imitating the first overlay and can therefore not be utilized instead of the first overlay. In such a case, the flow may continue to Step 650.

On Step 640, in case the first and second overlays are determined to be consistent with each other, match each other, or the like, the third overlay may be determined to be accurate, and may be utilized to provide the AR view. It is noted that overlays may be considered as matching if they are identical, if they are semantically identical, or the like. In some exemplary embodiments, the matching may be determined based on a pixel by pixel comparison. Additionally or alternatively, the matching may be determined using semantic comparators determining that two images are semantically identical. As an example, a semantic comparator may be implemented using an ANN that is trained to receive two images and predict if they are semantically identical or not. In some exemplary embodiments, images may be manipulated in a manner retaining semantic meaning as well as in a manner modifying semantic meaning. Such images may be utilized as part of a training set that can be utilized to train the ANN. Other machine learning methods may be utilized to implement the semantic comparator. Additionally or alternatively, semantic comparator may be implemented using computer vision specific algorithms that are aimed at identifying semantic difference.

On Step 650, in case the first and second overlays are determined to be inconsistent, different from each other, not matching, or the like, the second layer may be re-executed on the first layout from the first layer, on a portion of the first layout, or the like, e.g., instead of using the second shadow overlay. In case a difference is found between the outcomes, the second execution platform may reprocess the second layer on the first overlay, or perform minor amendments to the third overlay, e.g., if possible.

In some exemplary embodiments, a schedule allocator may be configured to determine whether or not shadowing should be performed for a certain layer based on a schedule of layer executions at each execution platform, device, or the like, based on technical layer constraints, based on user constraints, privacy constraints, or the like. In some exemplary embodiments, shadow layers may be generated at a variety of devices, e.g., a cloud server, an edge device, the AR device, a combination thereof, or the like. In some exemplary embodiments, the schedule allocator may utilize one or more optimization algorithms, resource allocation solvers, or the like, to determine whether or not shadowing of a skin is advantageous.

In some exemplary embodiments, the schedule allocator may utilize a classifier, a predictor, or the like, such as a same classifier as described previously or a different one. In some exemplary embodiments, the classifier may be deployed to determine which layers perform well when being shadowed, e.g., based on information gathered over time, success rates of previous classifications, success rates of previous shadowing, locations of frame sensors, heuristics, metadata of layers, or the like. For example, layers that require personal information, e.g., a database of friend images, may not shadow well at a server that has no access to such personal information databases. As another example, a layer that requires certain resources that are not available in the shadowing platform may not be successfully shadowed. In some exemplary embodiments, the classifier may comprise a data-driven classifier or any other classifier that is trained generally for all clients, personally for each client based on the client's history data, or the like. In some exemplary embodiments, the classifier may be trained based on any other information, using any classification technique.

In some exemplary embodiments, the classification may indicate attributes that enhance shadowing, such as location, weather, or the like. For example, a mushroom layer that is applied to tree frames only, e.g., adding mushrooms to tree images, can be shadowed well when after a first layer that replaces trees with frogs, providing an overlay without any trees, so that the mushroom layer will not be applied at all. This may save calculation time and reduce latency. In some exemplary embodiments, skin metadata may indicate what objects are modified and in what way, enabling the classifier to enhance its predictions.

Figure 7:
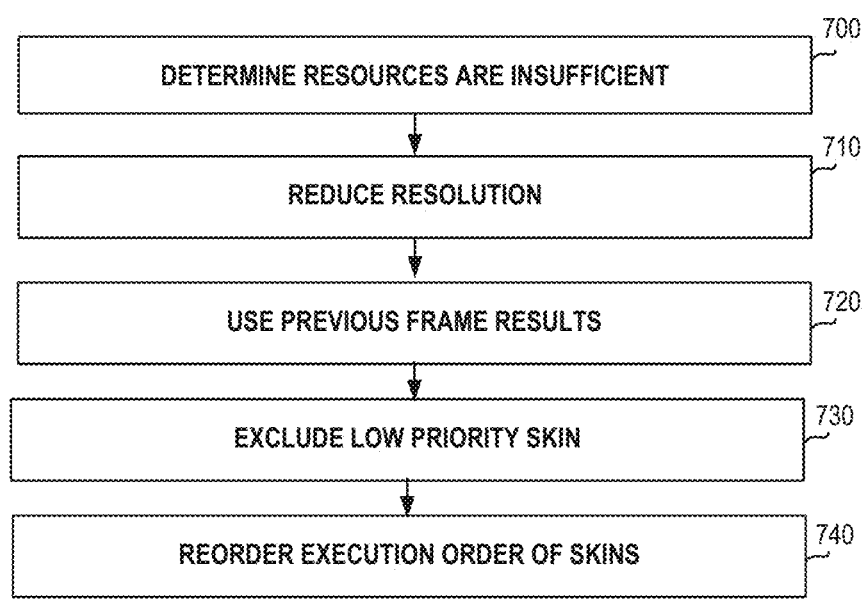
FIG. 7 shows a flowchart diagram of a method, in accordance with some exemplary embodiments of the disclosed subject matter.

Referring now to FIG. 7 illustrating a flowchart diagram of a method, in accordance with some exemplary embodiments of the disclosed subject matter.

On Step 700, resources for executing at least one layer on one or more defined execution platforms, devices, or the like, may be determined to be insufficient. In some exemplary embodiments, the resources may include time resources, computational resources, battery or power resources, CPU resources, or the like, which may be required for completing executing the at least one layer. In some exemplary embodiments, in case the resources are determined to be insufficient for executing the at least one layer, a limited version of the at least one layer may be determined and executed. In some exemplary embodiments, the limited version may include performing partial computations, limiting resolution levels, or the like, according to at least one of Steps 710-740.

On Step 710, a resolution level of frame provided to a layer may be reduced. In some exemplary embodiments, an entire or partial resolution level of the frame may be degraded or reduced, e.g., by 10 percent, 5 percent, or by any other percentage, during execution of the at least one layer. In some exemplary embodiments, a resolution of a frame portion may be reduced in case it is considered to be a low-priority portion, e.g., in case the frame portion does not depict a person or a high-priority object, in case the frame portion is not part of the user's field of view, or the like. In some exemplary embodiments, a resolution of the frame may be reduced prior to the layer processing. After execution, the resolution may or may not be restored, e.g., to an HD level, or to any other resolution level. In some exemplary embodiments, for a frame having one or more skins that are registered thereto, a resolution level of the frame may be reduced prior to executing the skins at one or more execution platforms. In some exemplary embodiments, the resolution level may be restored after executing the skins. In some exemplary embodiments, the resolution of the peripheral portion of the frame may be reduced, saving power while not compromising the privacy of the user. Additionally or alternatively, the resolution of one or more overlays of the frame may be reduced.

In some exemplary embodiments, a resolution level of a frame may be reduced prior to executing a first skin on the frame, thereby providing to the first skin a low-resolution frame. In some exemplary embodiments, the first skin may be executed on the low-resolution frame. In some exemplary embodiments, the resolution level may be restored after executing the first skin on the low-resolution frame. In some exemplary embodiments, a resolution level of a frame may be reduced for all registered skin, for some registered skins, or the like.

In some exemplary embodiments, instead of reducing a resolution level of the entire frame, only portions of the frame may be reduced in resolution. In some exemplary embodiments, a portion of the frame that is converted to lower resolution may comprise a randomly selected portion with a random size, a randomly selected portion with a defined size, a portion selected based on an importance score of frame objects, a portion selected based on a field of view of the user, or the like. In some exemplary embodiments, an importance score of objects may be assigned by the user, by an operator, based on rules, or the like. For example, a program developer or a classifier may define that human objects that are dancing should be allocated a higher importance score than a street sign, e.g., since their resolution level may be more noticeable. According to this example, a frame depicting a human dancer and a street sign may convert the street sign to lower resolution while retaining high resolution for the dancer.

In some exemplary embodiments, in order to provide an overall high-resolution average in which the degradation is hardly or not noticeable, the degradation may be performed in a different portion of the image every frame, instance, or the like. For example, a portion of 2/50, or any other percentage, of the frame may be degraded in a first frame, a different portion of the frame may be degraded in the next frame, or the like. In some exemplary embodiments, the same percentage of the frame may be degraded every frame at a different portion of the frame, or alternatively, a different portion size may be utilized for different frames.

On Step 720, in order to reduce resource utilization, partial object recognition computations may be performed. In some exemplary embodiments, instead of implementing object recognition functionality such as facial recognition for each frame separately before providing the frames to registered layers, results of a previous object recognitions that were determined for one or more previous frames may be utilized. For example, object recognition results of a previous frame that indicate types of objects in a frame may be used for one or more subsequent frames. In some exemplary embodiments, using already existing results may reduce usage of resources such as time and computational resources. In some exemplary embodiments, typically, subsequent frames do not depict entirely different objects, thus performing object recognition for each frame may not be necessary.

In some exemplary embodiments, object recognition may be performed on a first frame to detect or identify one or more object types of objects in the first frame, object boundaries, object segmentations, or the like. In some exemplary embodiments, based on the object recognition results, one or more layers that are registered to the identified objects may be identified. In some exemplary embodiments, the object recognition may be performed at one or more execution platforms, e.g., at a server, an edge device, an AR device, or the like. In some exemplary embodiments, after recognizing the one or more object boundaries, one or more subsequent frames may be obtained from at least one frame sensor. In some exemplary embodiments, the one or more subsequent frames may include frames that are captured in subsequent time periods. In some exemplary embodiments, the one or more object types determined for the first frame may be utilized for the one or more subsequent frames.

In some exemplary embodiments, object recognition calculations may be performed statically every defined timeframe or number of frames, so that the object recognition results will be refreshed and new objects that enter the user's AR view will be detected. In some exemplary embodiments, new object recognition calculations may be performed every defined number of frames, every defined time period, upon identifying changes in the user's field of view, or the like.

In some exemplary embodiments, object recognition calculations may be performed dynamically according to a dynamic schedule, e.g., using a classifier, a predictor, or the like. In some exemplary embodiments, a classifier or predictor may be deployed to determine when new object recognition calculations should be performed, e.g., based on captured frames, information gathered over time, success rates of previous classifications, locations of frame sensors, heuristics, or the like. For example, a person that is sitting in a lecture is not predicted to view new objects for a long period of time, e.g., at least 10 minutes in average, while a person that is looking out of a train window is predicted to view a large number of different objects changing swiftly. In some exemplary embodiments, the classifier may be trained based on a historic dataset, based on heuristics, based on any other information, using any classification technique, or the like.

On Step 730, in order to reduce resource utilization, low priority skins may be excluded from the AR framework. In some exemplary embodiments, in case not all layers can be implemented due to a lack of resources, layers may be prioritized and selected to be executed accordingly. In some exemplary embodiments, a lack of resources may slow a performance, enlarge a latency, an unsmooth AR view, or the like, which may downgrade the AR experience. In some exemplary embodiments, in order to avoid such setbacks, some skins that are registered to one or more objects of a frame may not be executed.

In some exemplary embodiments, skins may be determined to have a low priority based on implicit or explicit user indications, based on heuristics, default settings, or the like. In some exemplary embodiments, a user may indicate his priority scores regarding his installed layers explicitly or implicitly, e.g., via a user interface. In some exemplary embodiments, an explicit indication may include a selection of priorities by the user. In some exemplary embodiments, an implicit indication may include other settings of the user that may indicate his priorities, e.g., muting certain layers for long periods of time, reactivating a layer, or the like. In some exemplary embodiments, an implicit indication may include a user feedback to priorities that were automatically determined by the AR framework. For example, the AR framework may determine that some layers should be considered of low priority, and deactivate those layers. In return, the user may indicate that the priorities were wrongly considered of low priority, e.g., by reactivating deactivated layers, by indicating low levels of satisfaction, or the like. Alternatively, the user may indicate that the priorities were correctly considered of low priority, e.g., by ignoring the new settings that omit the layers, by indicating high levels of satisfaction, or the like.

In some exemplary embodiments, a classifier or predictor may be deployed to determine priority ranks of layers, e.g., based on user explicit or implicit indications, feedbacks from a plurality of clients, layer-related information such as layer metadata gathered over time, an environmental context, success rates of previous classifications, heuristics, or the like. In some exemplary embodiments, a layer that is determined to have a low impact on the AR view on one or more contexts may be classified as having a low priority. In some exemplary embodiments, an impact of a layer may correspond to a probability that the layer will make a difference in the AR view, may correspond to an importance of the functionality of the layer, or the like. For example, a layer that is estimated to be overwritten by a subsequent layer may be estimated to have no impact on the AR view. As another example, a layer that adds long fluffy fur to animals for entertainment purposes may be considered to have an objective that is less important than a layer that is configured to alert the user of dangers or translate a spoken language to assist a user. Upon executing the layer, the classifier may identify whether or not the prediction was accurate, e.g., whether or not the layer had a low impact on the AR view. For example, a layer that changes an eye color of detected humans may be determined to have a low impact in case that observed human are far away and their eye color is not noticeable. According to this example, the classifier may assign such a layer with a low priority when humans in the environment are identified as being far from the user.

In some exemplary embodiments, the AR framework may obtain priority ranks of the plurality of skins, and refrain from executing a low priority skin upon determining that execution of all of the plurality of skins is not advantageous, is not supported, may increase a latency, or the like. For example, lower priority layers may not be performed in case a time limit is not estimated to be sufficient to perform all registered layers, but the time limit is estimated to be sufficient when refraining from executing the low priority skin, the low priority skin may not be executed. As another example, in case the system is determined to be lacking sufficient CPU resources to perform all layers, but the CPU resources are estimated to be sufficient when refraining from executing the low priority skin, the low priority skin may not be executed.

On Step 740, in order to reduce resource utilization, an execution order of skins may be reordered. In some exemplary embodiments, layers that are registered on a same object or portion of a frame, may have a defined order of execution. In some exemplary embodiments, the order of execution may define which output of which skin is to be utilized as an input of another skin. In some exemplary embodiments, an order of execution may not necessarily be optimal in terms of resource utilization.

In some exemplary embodiments, for layers registered on overlapping objects, same objects, or the like, the order of execution may affect the outcome. For example, an object of type "cat" may be registered to a first layer that colors the cat in purple, and to a second layer that generates a new cat object. According to this example, changing the order of the layers may provide different results; in the correct order one cat will be colored purple while the second cat will not, and in the wrong order both cats may be colored. In some exemplary embodiments, layers that create or delete new objects may introduce further complications, e.g., as their order may cause new layers to register thereto. In some exemplary embodiments, the order of execution may define that an object that is created by a layer will not be processed by any previous layer.

In some exemplary embodiments, although an order of execution may be defined, it may be desired to identify alternative ordering that may provide the same result or a similar result while using less resources. Specifically, a more efficient order of layer executions may be desired. In some exemplary embodiments, the order of execution may be obtained from a user, determined based on default settings, determined based on an order of layer activations by the user, determined based on an order of layer installation, determined based on heuristics, or the like. In some exemplary embodiments, a user may define one or more orders of execution. Alternatively, one or more orders of execution may be obtained, determined by the AR framework, or the like.

In some exemplary embodiments, an attempt of modifying the order of execution may be performed. In some exemplary embodiments, the attempt may include grouping non-consecutive layers in a consecutive order, reordering the order of execution, or the like. In some exemplary embodiments, the modified order may be selected based on determining an order with reduced resource utilization, an enhanced speed, or the like, which may be determined based on one or more classifiers, predictors, or the like, to provide the same result as the original order of execution. For example, layer metadata may be utilized to determine which layers influence each other, perform actions that influence each other, or the like, and based on the identified influences, a modified order of execution may be determined that is expected to provide the same resulting AR view. In some exemplary embodiments, in addition to utilizing predictors or classifiers, the modified order may be determined using any other mechanism such as randomly, based on instructions, rules, or based on any other information.

In some exemplary embodiments, two or more subsequent layers that are registered to an object may be executed according to their order of execution, and according to a different order as part of a new ordering attempt. In some exemplary embodiments, the new attempt may be performed simultaneously to the execution that uses the original order, in a non-sequential manner thereof, or the like. Alternatively, the new attempt may be performed at a different time period from the execution using the original order, e.g., after the original execution. For example, for an original order of layers from L1-L3, two executions may be performed: one execution may include a sequential execution of L1-L3 according to the defined order, and a second newly-ordered execution may include a sequential execution according to an alternative order, e.g., L2, L1, L3, or any other alternative order. In some exemplary embodiments, the alternative executions may be performed at a same platform, at different platforms, portions thereof may be distributed for execution to different devices, or the like. In some exemplary embodiments, the alternative executions may be performed upon identifying sufficient resources for an additional frame execution that are not determined to be used for a sufficient period of time.

In some exemplary embodiments, a first order of execution that defines an order of skin executions of a plurality of skins that are registered on a same object in the frame, may be obtained. In some exemplary embodiments, the first order of execution may define an order of skin executions between at least first and second skins. In some exemplary embodiments, the first order of execution may define that the first skin is to be executed before the second skin. In some exemplary embodiments, the first skin may be determined to be executed right before the second skin, a few skins before the second skin, or the like.

For example, the plurality of skins may include four skins: L1, L2, L3, and L4, and the first order of execution may define an order of L1, L4, L3, and L2 (starting at L1). In some exemplary embodiments, a second alternative order of execution between the plurality of skins may be determined, obtained, or the like, e.g., at the AR framework. In some exemplary embodiments, the second order of execution may define that the second skin, e.g., L2, is to be executed before the first skin, e.g., L1. For example, instead of the defined order of L1, L4, L3, and L2, the second order of execution may define an alternative order L2, L3, L1, and L4.

In some exemplary embodiments, the plurality of skins may be executed according to the first order of execution to obtain a first result, e.g., a first overlay. In some exemplary embodiments, the plurality of skins may be executed according to the second order of execution to obtain a second result, e.g., a second overlay. In some exemplary embodiments, the executions may be performed in overlapping timeframes, in different timeframes, or the like, at one or more execution platforms, e.g., at a same device, at different devices, portions thereof may be distributed for execution to different devices, or the like. In some exemplary embodiments, the execution according to the second order of execution may be performed upon identifying idle or sufficient computational power at one or more execution platforms that can be utilized for the task.

In some exemplary embodiments, the results from both executions may be compared, e.g., to identify any differences between the resulting layouts. In some exemplary embodiments, in case a resulting overlay of the original execution is identical or matches to the resulting overlay of the modified order, the new order may be determined to be replaceable with the original execution. In some exemplary embodiments, results may be determined to match based on a difference in pixels that is below a threshold, based on a classifier determining that they are identical, or the like. In some exemplary embodiments, in case the modified order is determined to utilize less resources than the original order, and they are determined to be replaceable, the modified order may be utilized in future executions instead of the original order. In some exemplary embodiments, in case the second order of execution is determined to utilize less computational resources than the first order of execution, the skin execution order may comprise the second order of execution instead of the first order of execution, e.g., thus replacing the execution order without changing the user's AR view in a noticeable manner.

In some exemplary embodiments, upon identifying within an order of execution a sub-order that was previously determined to be replaceable with a more efficient alternative order, the sub-order may be replaced with the alternative order.

In some exemplary embodiments, upon identifying that resources are not sufficient, at least one of Steps 710-740 may be selected and performed, e.g., based on a predictor, a classifier, user input, heuristics, or the like. In some exemplary embodiments, a predictor may be configured to predict which one or more of Steps 710-740 should be performed, e.g., based on information gathered over time regarding resource reduction rates from previous steps, success rates of previous classifications, heuristics, or the like. Based on such a prediction indicating which steps are to be taken, the steps may be executed by the AR framework. In some exemplary embodiments, the predictor may predict an estimated outcome of performing each of Steps 710-740, e.g., in terms of resource utilization, and perform the minimal number of steps that are estimated to comply with the available resources. Upon executing steps that were selected based on the predictor, the predictor may identify whether or not the prediction was accurate, e.g., whether or not the steps used the estimated amount of resources that was predicted, whether or not the steps reduced the resource utilization in a predicted manner, or the like. In some exemplary embodiments, failure and success rates of the predictor may be utilized to further enhance precision and accuracy of the classifier's predictions.

Figure 8:
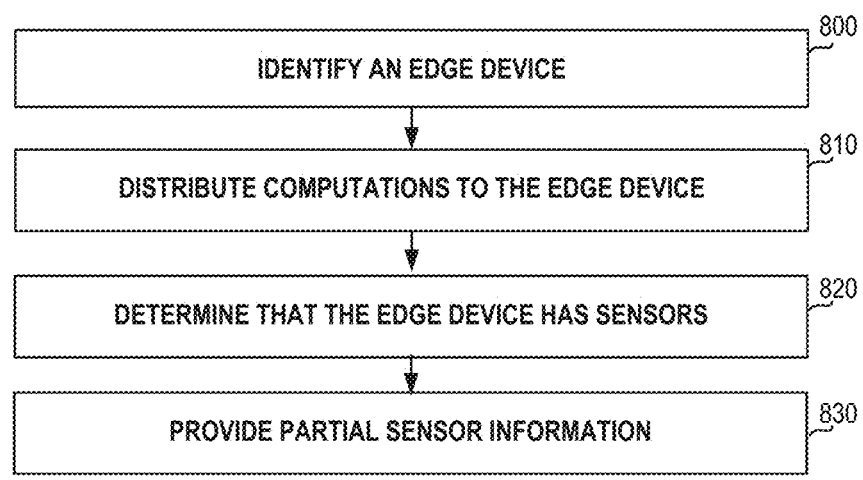
FIG. 8 shows a flowchart diagram of a method, in accordance with some exemplary embodiments of the disclosed subject matter.

Referring now to FIG. 8 illustrating a flowchart diagram of a method, in accordance with some exemplary embodiments of the disclosed subject matter.

On Step 800, an edge device may be identified. In some exemplary embodiments, one or more edge devices may be utilized for distributing skin executions, object recognition, facial recognition, or any other computation task. In some exemplary embodiments, an edge device may include a user's car's computer, a computing device of the user, e.g., at his home, an office device, a nearby mini tower of a smart city, or the like, that is nearby the user, or any other user-owned or user trusted device.

In some exemplary embodiments, the AR device that the user is using may be limited in terms of CPU, battery, or the like. The CPU of the AR device may not be fast enough to execute a large number of skins simultaneously, per frame, in compliance with strict latency requirements, or the like. Additionally or alternatively, executing a skin may require graphical calculations that may cause high power consumption resulting in battery drain. In some exemplary embodiments, since the AR device may be comparatively weak, and communicating with a remote cloud server to distribute executions thereto may consume long periods of time and utilize much battery power, it may be advantageous to at least partially execute skins on a nearby edge device that has more computational power that the AR device, enables swift communications with the AR device and does not drain the battery for communication purposes.

In some exemplary embodiments, in order to enhance a computational speed of executing a layer, a frame or different portions thereof may be cropped and processed separately at different execution platforms, devices, or the like, and then returned to form the full overlay output of the layer. For example, an object of a frame may be cropped and processed at the edge device, while a remaining object may be processed at the AR device.

On Step 810, computations of the AR device may be distributed at least in part to the edge device. In some exemplary embodiments, the distributed computations may include object recognition computations, facial recognition computations, skin executions, scheduler computations, classifier training or inferences, or the like. In some exemplary embodiments, the distributed computations may be executed by a combination of the AR device and the edge device, by one or them alone, or the like.

In some exemplary embodiments, performing collaborative execution may constitute a privacy issue, as the user may wish his private information to be retained in the AR device, or at trusted devices only. In some exemplary embodiments, in order to comply with privacy requirements, the AR device may perform a collaborative execution with the edge device in case the edge device is a trusted device. For example, the edge device may include a laptop of the user that is trusted by the user, a Tablet of the user, a smartphone of the user, or the like. In some exemplary embodiments, an AR device, such as AR glasses, a VRD, or the like, may be owned and controlled by the user, as opposed to other external devices which are not owned or controlled by the user and may not be trusted. As a result, the AR device may be considered as the most trusted device. In some exemplary embodiments, in addition to the AR device, an edge device may be determined to be trusted based on a user's indication, upon identifying that a same user owns both the AR device and the edge device, or the like.

In some exemplary embodiments, skins may be executed on different execution platforms, e.g., while complying with one or more constraints such as privacy constraints, time requirements, or the like. In some exemplary embodiments, privacy constraints may define that certain skins, types of objects, or the like, may be executed only on trusted devices. In some exemplary embodiments, time requirements may define that an execution of a layer, including the roundtrip between the executing device and the AR device, will be performed swiftly, e.g., not longer than 1/50 of a second or than any other time threshold.

In some exemplary embodiments, in case the edge device is not determined to have its own sensors, or in case utilizing the edge device's sensors is not estimated to be useful, Step 820-830 may not be performed.

On Step 820, the edge device may be determined to have its own sensors, e.g., a camera. In some exemplary embodiments, in case the edge device is located near the AR device, the edge device may utilize its sensors in order to capture frames depicting the same objects as the AR device. For example, a user may wear AR glasses and observe a neighbor that came for a visit, while the user's cellphone that may be held by the user, may function as an edge device and may capture the same neighbor from a slightly different angle.

On Step 830, partial sensor information may be provided to the edge device. In some exemplary embodiments, in case the edge device has its own sensors, not all the sensor data from the AR device may be necessarily provided to the edge device, e.g., since the edge device may be able to independently accumulate supplement sensor information to restore the original frame based thereon. For example, the AR device may provide the edge device a portion of the captured frame, and the edge device may complete the missing frame information based on sensor information gathered at the AR device depicting the same area, e.g., in a slightly different angle. In some exemplary embodiments, image processing techniques may be utilized by the edge device to match its sensor information with the captured angle of the AR device. In some exemplary embodiments, the AR device may provide sufficient sensor information so that an angle of the AR device may be determinable based thereon. In some exemplary embodiments, distributing only a portion of the AR device's sensor information may save time and transmission costs.

Figure 9:
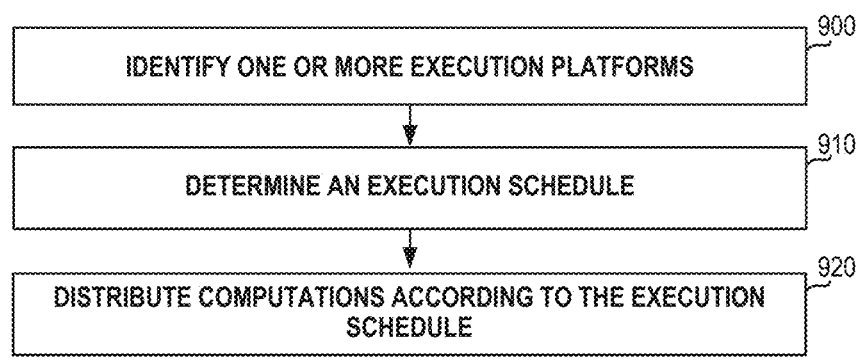
FIG. 9 shows a flowchart diagram of a method, in accordance with some exemplary embodiments of the disclosed subject matter.

Referring now to FIG. 9 illustrating a flowchart diagram of a method, in accordance with some exemplary embodiments of the disclosed subject matter.

On Step 900, one or more devices or execution platforms may be identified, e.g., an edge device, a remote cloud server, a nearby server, or the like. In some exemplary embodiments, it may be desired to reduce a battery drain of the AR device by executing some tasks on one or more other execution platforms, devices, or the like. Additionally, or alternatively, some tasks may require a large amount of computational power that the AR device may lack. Hence, it may be desired to execute some tasks on another computerized device or platform.

In some exemplary embodiments, a distributed execution of one or more skins may be performed by distributing an execution of a layer on an object of a frame, a portion of a frame, an entire frame, a portion of the layer's functionality, a full layer's functionality, or the like, to the one or more devices. In some exemplary embodiments, a skin in a distributed AR system may be applied locally on the AR device, applied on an edge server which may be trusted or not, applied on a remote cloud server, or the like.

In some exemplary embodiments, a user may indicate preferred or required execution locations indicating which devices are to execute which layers, which objects, or the like, thus constituting a user constraint of the AR framework. In some case, a user preference may constitute a soft constraint, e.g., which may be overwritten in some cases, while in other cases a user preference may constitute a hard constraint, e.g., which must be fulfilled. In some exemplary embodiments, certain layers can only be executed on a certain platforms, e.g., for technical reasons, which may constitute an additional technical constraint. For example, a layer of facial recognition configured to recognize the user's friends may require access to a personal database of images, which may only be accessible to any device. According to this example, in case only the AR device has access to the personal database, the layer may be executed on the AR device alone, in order to comply with the technical constraint. In other cases, any other platform or device may have access to the personal database. As another example, a skin may be installed on a first platform and not on a second platform, adding a technical constraint as the skin can only be executed where it is installed. It may be desired to find an enhanced distribution of execution platforms, e.g., in terms of resource utilization such as latency and execution time, while complying with one or more privacy constraints, user constraints, technical constraints, or the like.

On Step 910, a schedule of executions may be determined, obtained, or the like. A schedule allocator may determine a schedule of distributed executions while taking into consideration the user defined constraints, the technical constraints, as well as expected power usage (battery), computational resources, privacy requirements, speed, communication costs, or the like. In some exemplary embodiments, the schedule allocator may determine an execution schedule that is configured to minimize the computational cost, battery usage, overhead, and the like, maximize the performance speed, the AR quality, or the like, while complying with the constraints.

In some exemplary embodiments, the schedule allocator may be configured to schedule an execution platform for each layer or portion thereof that is to be executed. In some exemplary embodiments, the schedule allocator may utilize one or more optimization algorithms, resource allocation solvers, or the like, to determine an execution schedule that complies with the constraints and enhances a performance of the AR framework, e.g., timewise, computational-wise, resolution-wise, or the like. In some exemplary embodiments, the schedule allocator may utilize a classifier, a predictor, or the like.

In some exemplary embodiments, the schedule allocator may determine an execution schedule based on a predicted execution time of each layer. In some exemplary embodiments, a predictor may be deployed to estimate an execution time of different layers at different execution platforms, a communication time between devices, a quality of outcome associated with executing layers on certain execution platforms, or the like. In some exemplary embodiments, an estimated execution time for a frame may be determined, e.g., based on a plurality of identified objects in the frame and based on corresponding layers that are registered on each of the identified objects. In some exemplary embodiments, determining the estimated execution time may comprise determining for each identified object corresponding execution times of registered layers that are registered on the each identified object.

In some exemplary embodiments, upon identifying that an object of the plurality of identified objects has an execution time that is greater than execution times of remaining objects from the plurality of the identified objects, the object may be determined to be an execution bottleneck. In some exemplary embodiments, execution of registered layers that are registered on the object may be distributed to an execution platform. In some exemplary embodiments, the execution platform may be selected in case it has greater computational resources than the AR device.

In some exemplary embodiments, an object that has a large number of registered layers and is predicted to have a long execution time, may be identified as a bottleneck and may be sent to a device with a strong CPU so that the execution may be completed in the desired timeframe. For example, the schedule allocator may consider that a certain device, e.g., the user's laptop, has a strong CPU and based on this consideration, allocate computationally challenging tasks to the laptop, e.g., in case the privacy constraints and technical constraints enable the schedule allocator to do so.

On Step 920, computations of registered layers may be distributed according to the execution schedule. In some exemplary embodiments, the schedule allocator may schedule executions of layers that are registered on a current frame, of pre-processing tasks such as facial recognition tasks, of post-processing tasks such as combining different overlay outputs to create an AR view, or the like. In some exemplary embodiments, an execution of the layers may be configured to be distributed according to the schedule.

Figure 10:
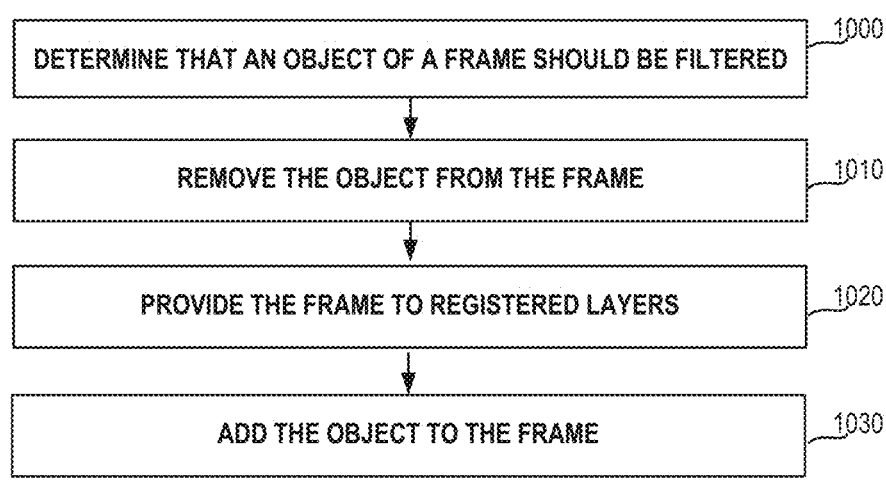
FIG. 10 shows a flowchart diagram of a method, in accordance with some exemplary embodiments of the disclosed subject matter.

Referring now to FIG. 10 illustrating a flowchart diagram of a method, in accordance with some exemplary embodiments of the disclosed subject matter.

On Step 1000, an object in a frame may be determined to be filtered. In some exemplary embodiments, a filtering technique may be used for hiding sensitive information from non-trusted computerized devices. In some exemplary embodiments, filtering may be used to preserve a user's privacy so that untrusted devices or software will not process private information, gain access to private information, or the like. In some exemplary embodiments, a filtering technique may be used to filter an object with regard to one or more skins alone, e.g., in order to enhance a computational performance. For example, a layer that is estimated to have no impact and to be overrun by a subsequent layer, may be configured to obtain a filtered frame that does not enable it to perform any processing. It is noted that the filtering may be for specific objects and not necessarily all objects of the same type. As an example, if a first skin is configured to color pets in red, and a second skin is configured to color all cats in blue, cats in the frame may be filtered out for the first skin, as its activity on them will not have an impact in the final output.

In some exemplary embodiments, skins may not be enabled to register to objects that are determined to be filtered. In some exemplary embodiments, objects that are assigned to be filtered may be automatically filtered by removing or cropping the object from the image so that the layers will not be executed on the filtered object. In some exemplary embodiments, objects may be filtered when belonging to a category that was selected to be filtered, when classified as sensitive, or the like.

In some exemplary embodiments, facial recognition may be performed to a human object to classify him to a defined group, e.g., of acquaintances, friends, strangers, romantic partners, or the like. In some exemplary embodiments, non-human objects may be classified according to any image processing technique to categories such as intimate objects, dangerous objects, or the like, which may be default categories, user-defined categories, or the like. In some cases, certain categories may be determined as sensitive categories by default. In some exemplary embodiments, a classification of objects may be performed based on databases, facial recognition techniques, object recognition techniques, or the like. In some exemplary embodiments, a user may indicate a group identity or category of different objects, e.g., human or non-human. For example, a user may indicate that a certain human object in a database is his friend, is a stranger, or the like. Additionally or alternatively, detected human or non-human objects may be classified according to a context such as identified behavior or attributes. For example, a human object that passes by in a public area may be classified as a stranger, a human object that is viewed often may be classified as an acquaintance, a non-human object that is recognized as a gun object may be classified as dangerous, or the like.

In some cases, the user may select certain classifications to be filtered, or indicate what classifications should be filtered. In some exemplary embodiments, certain types of private or non-private information may be determined to be filtered, e.g., a head of human objects, private body parts, or the like. In some exemplary embodiments, one or more categories may be filtered automatically, unless indicated otherwise by the user. In some exemplary embodiments, a classifier may be applied on a captured frame to classify one or more objects in the frame as sensitive objects, to identify one or more categories of the object, or the like, to which the filtering may be applied according to the user's choice.

For example, a lawful user may indicate that dangerous objects such as guns should not be classified as sensitive, as he may not be concerned that images depicting such objects may be used against him. However, a criminal user may wish to hide his weapon-based crimes and indicate that dangerous objects are sensitive and should not be shared with other devices or software.

On Step 1010, an object that is determined to be filtered may be removed from the frame, e.g., prior to executing registered skins of the frame. In some exemplary embodiments, filtered objects or frame portions may be cropped out of the frame, may be indicated as such, may be assigned a bit representation of zero in a bitmap of a frame, or the like, so they will not be processed by the skins. In some exemplary embodiments, a patch including a filtered object may be cropped out of the frame. In some exemplary embodiments, the patch may have a geometrical shape such as a square or any other shape non-geometrical that does not comprise an outline of the object, thus disabling a receiving party to determine an identity of the cropped object based on the outline of the missing patch. In some cases, a geometrical shape for the patch may be selected based on the dimensions of the object. For example, in case the filtered object is a thin and long gun, the cropped patch may be selected to have a shape of a rectangle that covers the gun, thereby preventing others from identifying the gun's outline while reducing an amount of excess cropping.

On Step 1020, the frame may be provided to registered layers, e.g., without the filtered object. In some exemplary embodiments, skins may only register to objects that remain in the frame after filtering out the one or more filtered objects.

For example, a law may require that driving signs will not be processed with AR layers at all. According to this example, driving signs may be configured to be filtered, e.g., automatically, based on user indications, or the like. In some exemplary embodiments, upon identifying a driving sign in a frame, the driving sign may be filtered out from the frame prior to forwarding the frame to be processed by any layer. According to this example, after processing remaining portion of the frame that do not depict a driving sign, the driving signs may be inserted back to the frame as part of the AR view. In some exemplary embodiments, a layer that registers to all types of signs may not register to the frame, as the sign was filtered out.

On Step 1030, the object may be added to the frame. In some exemplary embodiments, after executing the skins and obtaining a resulting overlay, the filtered objects may be added back to the AR view, together with the resulting overlay. In some cases, an end stage of the frame execution may be configured to ensure that the overlays obtained from the skins do not overlap with the area of the filtered object or with pixels thereof, e.g., using a bitmap representation of the filtered areas.

Figure 11:
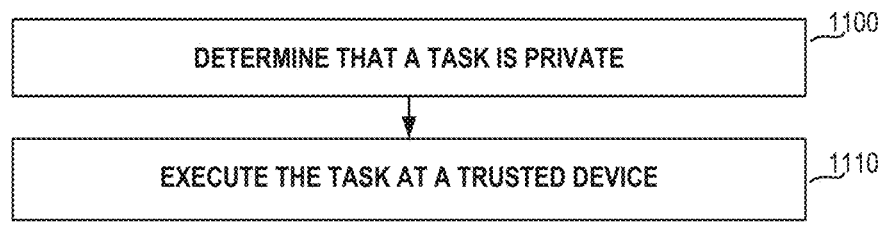
FIG. 11 shows a flowchart diagram of a method, in accordance with some exemplary embodiments of the disclosed subject matter.

Referring now to FIG. 11 illustrating a flowchart diagram of a method, in accordance with some exemplary embodiments of the disclosed subject matter.

On Step 1100, a task associated with an object in a frame, an entire frame, a portion of the frame, or the like, may be determined to be private. In some exemplary embodiments, a user may not want untrusted devices to receive access to private information such as data indicating sensitive objects, his field of view, the object he is viewing, an active layer, or the like. For example, an active layer may include an embarrassing layer such as an undressing application which may be desired to remain private. In some exemplary embodiments, private objects may include objects that the user would prefer not to reveal to a third party, not to enable leakage thereof, or the like. In some exemplary embodiments, the user may not wish that a third party will know with whom he is talking, his location, at what objects he is looking at, or the like. As an example, the private objects may be faces of people, intimate body parts, a document having a "confidential" title, a screen showing source code of a program, or the like. In some cases, certain defined locations may be determined or defined to be confidential, e.g., a home location, a work location, or the like.

In some exemplary embodiments, a user may wish to hide the fact that she utilizes a certain skin. The skin may be considered as a private information and the execution thereof may be a private task, to avoid revealing the user's usage of the private skin. As an example, the skin may be a dating skin, a skin that performs unethical operations, such as undressing bystanders, a skin that accesses non-legitimate data sources, such as dark web or illegal databases, a skin that is ethical but may be embarrassing to the user such as a memory aid skin, a translation skin, or a social aid skin for socially awkward people, or the like. In some exemplary embodiments, the fact that the user utilizes a skin may be, generally, disclosable information. However, the specific configuration of the skin may be considered as private information. For example, the user may provide parameters to a skin that affect its operation. The user may wish to conceal the parameters. Additionally or alternatively, the user may wish to conceal some operation of the skin, such as when operating on a specific object, a specific type of object, or the like. Accordingly, execution of the skin may be considered as private tasks depending on the operation of the skin, on whether or not the parameters are provided to the execution environment, on whether the content of the parameters is reflected by the objects being processed, or the like. As an example, the user may configure a skin to operate on both minors and adults and may wish to conceal the fact that the skin is being applied on minors. Hence, execution of the skin on an object representing an adult may be considered a non-private task, while execution of the skin on an object representing a minor may be considered as a private task. Additionally or alternatively, the application of a skin on a minor may be considered as a private task to avoid divulging information regarding minors to untrusted parties, such as information reflected from the frame or obtained by the skin when operating.

In some exemplary embodiments, in order to prevent private information from being accessed by untrusted devices, AR tasks may be classified to private tasks and to non-private tasks. The non-private tasks may be executed by any available device, including non-trusted devices, while the private tasks may be executed by a trusted device. In some exemplary embodiments, private tasks may include any task that involves private information. In some exemplary embodiments, classifying the private tasks and the non-private tasks may be based on a privacy policy. In some exemplary embodiments, the privacy policy may define private information, private information that is to be executed on trusted devices alone, non-private information that is to be executed on trusted devices alone, or the like. As an example, the privacy policy may require executing a skin that is configured to identify faces, on a trusted device such as an edge server, the AR device, or the like. Additionally or alternatively, a non-private task may comprise executing non-private skins registered on non-private objects, on non-trusted devices.

In some exemplary embodiments, based on the privacy policy, the skins may be distributed to execution platforms that match the privacy constraints of the user. In some exemplary embodiments, the privacy policy may indicate for each skin whether or not it is defined as a private skin, for each object whether or not it is defined as a private, or the like. In some exemplary embodiments, for each new object, new frame, new implementation of object recognition techniques, or the like, the framework may determine whether or not they are classified by the privacy policy as comprising private information, being a private task, or the like.

On Step 1110, a schedule allocator may allocate a private task may be executed on a trusted device, e.g., the AR device, the edge device, or the like. In some exemplary embodiments, upon identifying that a certain task is private, the task may be executed on trusted devices alone. In some exemplary embodiments, the trustiness property of a device may be determined by the user, determined based on rules such as ownership of the device, or the like. In some exemplary embodiments, the trustiness property of a device may differ based on context. For example, an AR device that is lent to the user by third parties may be considered a non-trusted device. An edge device that is owned by the user, such as an edge device installed in his car or in his home or a mobile device acting as an edge device, may be considered as a trusted device, while an edge device installed in a rental car, in a hotel room, in a shopping mall, or the like, may be considered as a non-trusted device. As another example, the trustiness property of the cloud server may differ. In some cases, the user may trust the cloud server as it is owned and controlled by a company that he trusts, even more so than an edge device controlled by a third party. In other cases, the cloud server may not be trusted.

In some exemplary embodiments, the AR device, along with one or more additional devices such as edge device owned by the user, may be considered as trusted devices. In some exemplary embodiments, the AR device may be a trusted device. Additionally, or alternatively, the AR device may be a non-trusted device. As an example, a user may rent an AR device, borrow an AR device, or the like. The owner of the AR device may be able to obtain a portion of the data from the AR device. Hence, the AR device may not be considered as a trusted device. In some exemplary embodiments, an edge device may be a trusted device. The edge device may be a personal computer, a smart phone of the user, or the like. Additionally or alternatively, the edge device may be a non-trusted device. As an example, a user may rent a car. The car infotainment system may be the edge device. As the user has no control over the data that the car infotainment system may collect, the edge device may be a non-trusted device.

In some exemplary embodiments, trust levels that are required from computerized devices may be defined in order to execute tasks with corresponding privacy levels. In case that there are no computerized devices having a trust score that is above a determined threshold for executing a private skin on object thereon, the AR system may exclude that skin from the set of skins, exclude the object from the set of objects, or the like.

Figure 12:
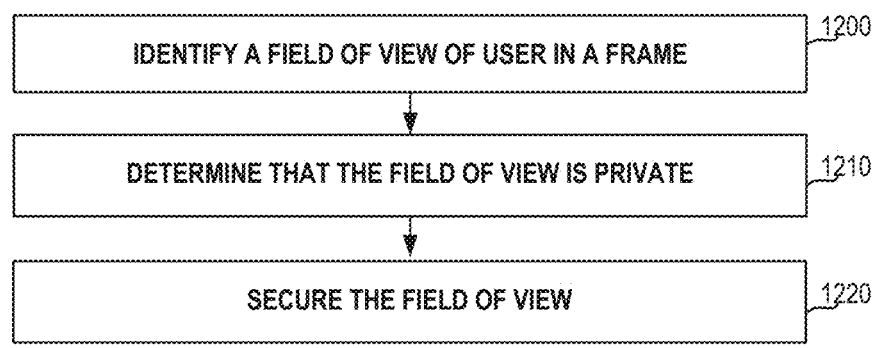
FIG. 12 shows a flowchart diagram of a method, in accordance with some exemplary embodiments of the disclosed subject matter.

Referring now to FIG. 12 illustrating a flowchart diagram of a method, in accordance with some exemplary embodiments of the disclosed subject matter.

On Step 1200, a field of view of a user may be identified. In some exemplary embodiments, an AR device may be configured to monitor the point of fixation of the user, e.g., using a sensor, an eye tracking device, a camera, an infrared camera, or the like. The point of fixation may be an area in the frame at which the user is looking. In some exemplary embodiments, it may be desired to hide images and objects that the user is fixating at from non-trusted devices. As an example, the user may be on a date, watching a show. The user may be staring at an actress' bosom, not paying any attention to the show. The user may wish to hide it from his date. In some exemplary embodiments, it may be desired to hide the point of fixation of a user from any device in order to minimize the ability of third parties to create a psychological profile of the user.

In some exemplary embodiments, based on the field of view of the user, a peripheral portion of the frame may be determined. In some exemplary embodiments, the peripheral portion of the frame may a portion that is sensed by the user's peripheral vision. The frame may be divided to peripheral portion and non-peripheral portion. In some exemplary embodiments, the non-peripheral portion of the frame may be an area in the frame corresponding to the area on which the user is looking. In some cases, peripheral portions of frames may be processed differently, such as in a lower resolution to conserve resources.

In some exemplary embodiments, the AR device may be configured to utilize field of view information in preparing the AR display. For example, in order to decrease battery consumption of the AR display, resolution of the AR display may be reduced in the areas of a frame that are outside the point of fixation of the user or are captured by the peripheral vision of the user. As another example, in some cases, objects that are not in the point of fixation of the user, may not be processed by skins. As an example, a skin may analyze people and provide additional information about that person, such as name, position, or the like. It may be desired to only process people that the user is looking at, e.g., within the user's focal point.

Although the eye tracking information may be useful and required for such processing, the user may wish to guard his privacy and avoid sharing such information. As an example, a person looking at a crowd, may not wish to share with third parties the fact that he is looking at a woman's bosom. In some exemplary embodiments, a skin may register on an object in case the object is not in a peripheral view of the user, or vice versa. In some exemplary embodiments, a user or any other entity may decide that a skin is only to be registered on a non-peripheral view of the user. As an example, a user may decide that low-priority skins, entertainment skins, or the like, are only to be processed in case their registered object is in the focus of the user, is in his direct field of view, or the like.

On Step 1210, it may be determined whether the field of view of the user is private in a certain frame, e.g., based on the content of the frame, such as comprising confidential objects, based on information embodied therein, or the like. In some exemplary embodiments, the frame's field of view portion may be automatically determined to be private, e.g., regardless of the frame's content.

On Step 1220, in case the user's the field of view is determined to be private, the user's field of view may be secured. In some exemplary embodiments, in case the frame is configured to be executed at a trusted device, e.g., by the execution schedule, the field of view of the user may be fully shared with the trusted device. In some exemplary embodiments, in case the frame is configured to be executed at a non-trusted device, the viewing direction may not be shared in order to ensure that a viewing direction of the user is not accessed by untrusted devices.

In some exemplary embodiments, in order to conceal the user's field of view, information about the field of view may be disabled, may not be shared, may be shared in part, or the like. In some cases, while using untrusted devices to execute a layer, the viewing direction may not be shared at all. In some exemplary embodiments, in order to conceal the user's field of view, information about the field of view may be provided implicitly to processing layers, e.g., in an unrestorable manner. As an example, the AR device may provide an indication of a number of portions of the frame that are to be processed in high resolution, while the portions include the field of view portion of the frame. In some cases, the additional portions may comprise randomly selected portions, or any other portions, thereby reducing an ability to track the user's field of view.

In some exemplary embodiments, in case the viewing direction is configured to be used to enhance a resolution of the viewed area, and the frame is configured to be executed at a non-trusted device, a resolution of the frame including the viewing direction may be downscaled or retained prior to being sent to the untrusted device, and after receiving the output overlay, the resolution of the viewing direction may be enhanced at a trusted device such as the AR device.

Additionally or alternatively, in case the viewing direction is configured to be used to enhance a resolution of the viewed area, a number of areas, including the viewing direction, may be randomly selected to have an enhanced resolution so that the viewing direction may not be determinable at the untrusted device. In some exemplary embodiments, a number of areas may be randomly determined to have an enhanced resolution, including the viewing direction, so that the viewing direction may not be determinable at the untrusted device. In some exemplary embodiments, the AR device may downscale a resolution of the additional portions upon receiving results from the layers.

In some exemplary embodiments, in case the viewing direction is configured to be used to process viewed objects, the AR device may provide one or more additional patches of the frame to be processed, in addition to patches depicting the objects that are included in the user' field of view. In case only objects that are in the field of view of the user are to be processed, the AR device may provide one or more additional patches of the frame to be processed, in addition to patches depicting the objects that are included in the user' field of view.

Figure 13:
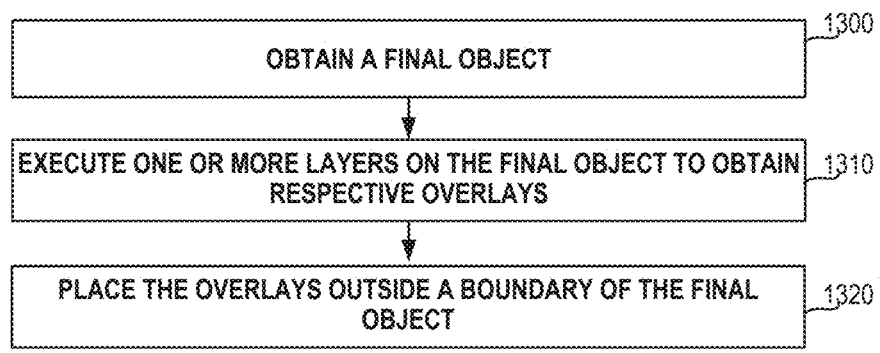
FIG. 13 shows a flowchart diagram of a method, in accordance with some exemplary embodiments of the disclosed subject matter.

Referring now to FIG. 13 illustrating a flowchart diagram of a method, in accordance with some exemplary embodiments of the disclosed subject matter.

On Step 1300, objects or frame portions that are unchangeable, untouchable, final, or the like, may be determined, defined, indicated, obtained, or the like. In some exemplary embodiments, regions of a frame may be defined as frame portions that are final and thus are untouchable, unmodifiable, or the like. In some exemplary embodiments, one or more defined portions of a frame may be defined as non-touchable portions, e.g., in order to enhance an AR experience of the user, enhance a privacy of the user, or the like.

In some exemplary embodiments, layers may be assigned with different permissions relating to permitted access to data, permitted actions, permission to assign an object as final, permission to filter an object. In some exemplary embodiments, layers that have permission to assign objects as final may include, for example, layers that create real-time alerts, layers that detect or create objects that should be untouchable, or the like. In some exemplary embodiments, objects may be assigned as final in any other manner, e.g., by user instructions, designer indications, default settings, rules, classifiers, heuristics, or the like. For example, a graphic designer may determine that certain objects should be considered to be final and should not be modified, e.g., in order to enhance an esthetic aspect of the AR experience, or for any other reason. As another example, a layer may be configured to create a new object such as a label and assign it to be final.

On Step 1310, one or more layers of the final object may be executed on the final object to obtain respective overlays. In some exemplary embodiments, layers that are registered on objects or frame portions that are final may nevertheless be executed on the final objects to provide output overlays. In some exemplary embodiments, in contrary to filtered objects that are not to be processed by any layer, an area that is indicated as final may be processed, but no output of any layer may be enabled to overwrite on any part of the final object.

On Step 1320, the overlays may be placed outside of a boundary of the object. In some exemplary embodiments, a final object or frame portion may be implemented by a bitmap indicating which pixels are not final and can be modified (having a value of "0") and which pixels are final and thus cannot be modified (having a value of "1"). In some cases, the bitmap may be implemented in an opposite manner (a value of "1" for non-final portions, a value of "0" for final portions), or in any other manner. For example, instead of indicating every pixel as final or not final, only borders of final objects may be indicated. In some exemplary embodiments, during a final phase of generating the AR view, the final objects may be verified to be fully untouched and unmodified.

As an example, an AR application that attaches definitions of objects as labels may process balloon objects that are defined to be final and add the label "balloons" near the balloons without modifying the balloons themselves. Specifically, the label may be attached to an outer boundary of the balloons, but since they are defined as final, the label may not overwrite any pixel of the balloons. As another example, a highlighting application may be configured to generate a thick visible border around a final object, e.g., in order to highlight an identified final object such as chameleon during a walk in nature.

Figure 14:
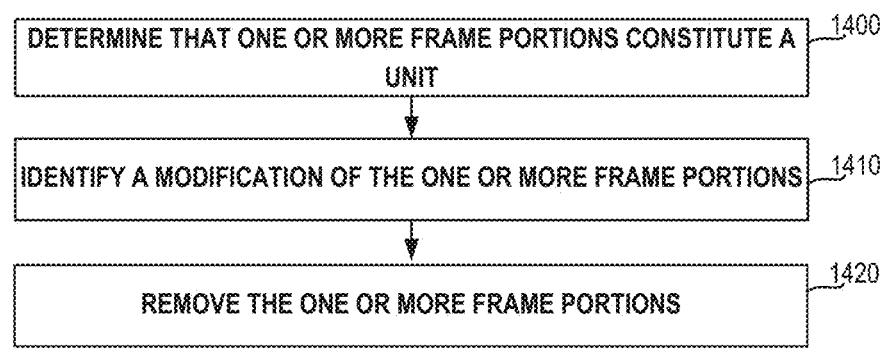
FIG. 14 shows a flowchart diagram of a method, in accordance with some exemplary embodiments of the disclosed subject matter.

Referring now to FIG. 14 illustrating a flowchart diagram of a method, in accordance with some exemplary embodiments of the disclosed subject matter.

On Step 1400, one or more frame portions may be determined to constitute a single closed unit, e.g., that depends logically on each other. In some exemplary embodiments, the unit may include a group of objects, a single object, one or more frame portions that are not an object, or the like. In some exemplary embodiments, one or more objects or other frame portions may be identified as a closed unit that must be kept together in its entirety, or at least partially. For example, a text that is placed near an object to display the object's definition is useless if part of the text is hidden, if the object is hidden, or the like, e.g., making the text unreadable or meaningless. In such cases, when only a portion of the unit is available or remains, the entire unit should be removed.

In some exemplary embodiments, a closed unit may be entirely dependent on each other, or may have any other dependency relationship. In some exemplary embodiments, in case each portion of the unit depends on each other portion, a modification of one portion may cause the entire unit to become meaningless. In some exemplary embodiments, in case a first portion of the unit depends on a second portion, a modification of the first portion may cause the first portion to become meaningless, and a modification of the second portion may cause the first portion to become meaningless, but a modification of both portions may not cause the second portion to become meaningless.

In some exemplary embodiments, a closed unit may be defined in a more specific or detailed dependency level. In some cases, only a certain portion of the unit may be defined as a necessary portion, and a modification of a remaining portion that is not obligatory may not be considered sufficient to remove the entire unit. For example, for a label that has a thick surrounding boundaries, the label's text may be defined as necessary, while modifications that effect the boundaries but do not affect the text may not be regarded as a meaningful modification.

On Step 1410, a modification or change to the one or more frame portions of the unit may be identified. In some exemplary embodiments, the modification may modify a dependent portion of the unit, an independent portion thereof, or the like.

On Step 1420, a modification of the one or more frame portions may be determined. In some exemplary embodiments, the one or more frame portions may be removed, e.g., in response to identifying the modification. In some exemplary embodiments, in case the one or more frame portions are determined to be part of a unit that is only meaningful together, and at least one portion thereof is modified, the entire unit may be removed. In some exemplary embodiments, the modification may be due to a final object overwriting a unit portion, due to one or more layers modifying a unit portion, due to a high priority object hiding a portion of the unit, or the like.

As an example, the unit may comprise a "balloons" label placed near a balloon object, e.g., as a descriptive label. A peanut alert may be indicated as a final portion or as an untouchable portion that cannot be overwritten and thus has priority over a portion of the "balloons" label. According to this example, since the "balloons" label is only meaningful when all the words are visible, and since the "balloons" label has lower priority than the final peanut alert, the entire label will be removed.

In some exemplary embodiments, in case the modified portion is a dependent portion that depends on the remaining unit, only the modified portion may be removed. For example, a first layer may generate a tree object replacing a car object, and a second layer may add a bird nest to the tree of the first layer. In such a case, the bird nest is dependent on the tree should not be visible without the tree, e.g., since the tree is where the nest can be located. According to this example, in case a third layer replaces the tree object with a bicycle, the bird nest should be removed as well.

In some exemplary embodiments, in case the modification is a minor modification that does not modify a meaning of the modified portion, the unit may not be removed. For example, in the example above where the first layer generates a tree object and the second layer adds a bird nest to the tree of the first layer, the bird nest and the tree may be determined to be a unit. In case the bird nest or the tree are mildly modified by a subsequent layer, e.g., removing one branch of the tree, the unit may not lose its meaningfulness and may not be removed.

Figure 15:
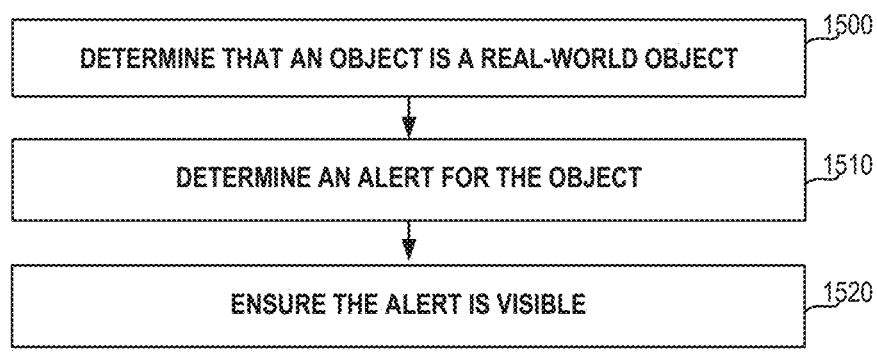
FIG. 15 shows a flowchart diagram of a method, in accordance with some exemplary embodiments of the disclosed subject matter.

Referring now to FIG. 15 illustrating a flowchart diagram of a method, in accordance with some exemplary embodiments of the disclosed subject matter.

On Step 1500, an object may be determined to be a real-world object, e.g., being in a non-virtual surroundings of the user. In some exemplary embodiments, a "realness" attribute may refer to the object being real, e.g., not being created by a software, a layer or the like, the object not being displayed on a displaying platform such as a screen or sign, or the like. Alternatively, the "realness" attribute may refer to information associated to the frame being real, such as real-time communicated information that may be processed by a skin and displayed as an overlay, driving information that is indicated by a road sign, or the like. In some exemplary embodiments, an object may be classified as real or not, or as indicating real information, in order to provide an alert to the user, perform a real-world functionality, or the like. For example, a layer may wish to add overlay glasses to real-world cats alone. As another example, a layer may wish to add real-time traffic information obtained from the police department. As another example, for a user that is allergic to peanuts, it may be desired to identify whether a displayed peanut or peanut-based snack in a frame is a real world peanut, or whether the peanut is an overlay from a previous layer, is displayed by a real-world screen, is displayed on a real-world sign, or the like. In case the peanut is indeed a real-world non-virtual peanut, it may be required to generate an alert to the user to indicate the immediate danger. Alerting the user of a fake peanut, e.g., that is filmed in a movie, or the like, may not be desired.

In some exemplary embodiments, in order to differentiate between real objects and fake objects, a plurality of techniques may be utilized such as image processing techniques, 3D analysis of distances within the frame, identification of screens, or the like. In some exemplary embodiments, a classifier, a predictor, or the like, may be trained to identify whether or not frame objects or other frame portions are real or not, e.g., based on a tagged dataset of real and non-real objects, information gathered over time, success rates of previous classifications, heuristics, or the like. In some exemplary embodiments, failure and success rates of the classifier may be utilized to further enhance precision of the classifier's predictions. In some exemplary embodiments, the classifier may be trained based on a big data analysis. In some exemplary embodiments, the classifier may be trained based on any other information, using any classification technique, or the like.

In some exemplary embodiments, the classifier may obtain as an input the raw data frame, e.g., which may not comprise processed overlays. In some exemplary embodiments, prior to determining an order of execution of registered layers that are registered on a frame, the layers may be classified as real-world layers that are registered to raw frames, semi real-world layers that are registered to at least some raw portions or indications of a frame, or regular layers that are not sensitive to a realness attribute of the frame. In some exemplary embodiments, real-world layers or applications may be processed based on the original frame alone. In some exemplary embodiments, semi real-world layers or applications may be processed based on a combination of real and artificial data. For example, a layer may obtain a processed frame depicted a colored cat, query the AR framework whether or not a depicted cat is real, and in case that the cat is real, the layer may add glasses to the cat regardless of previous executions that were performed on the cat object such as coloring the cat.

In some exemplary embodiments, real-world object detection may be performed as part of a pre-processing process prior to registering layers to the frame. In some exemplary embodiments, since real-world layers require raw data, they may be executed in parallel, in a non-sequential order, in overlapping timeframes, or the like. In some exemplary embodiments, based on the classification of objects in the frame as real-world objects, an optimization algorithm may be implemented to determine desired execution configurations and locations of the layers, that comply with any user instructions (if exist).

On Step 1510, an alert may be determined for the real-world object. In some exemplary embodiments, based on the classification of the object as a real-world object, layers that are registered to such real-world objects may process them accordingly. In some exemplary embodiments, layers that are not concerned with realness of frame portions may not obtain or determine realness attributes of objects or may ignore such information.

In some exemplary embodiments, some real-world layers may be configured to generate alerts, notifications, warnings, or the like, upon identifying a real-world object that is estimated to be dangerous. For example, a medical real-world layer identifying ingredients that the user is allergic to may generate an alert, a military layer identifying military dangers may generate an alert, or the like. Such layers and overlays may be considered of high priority.

In some cases, real-world layers may not generate or display an alert, have high priority, or the like. For example, a real-world layer that replaces only real-world dogs with rabbits that have a similar color, may not be considered sensitive and may not require an alert.

On Step 1520, the AR framework may ensure that a generated alert is visible, e.g., so that it will not be hidden or modified on the final AR view. In some exemplary embodiments, the alert may be assigned to be final, e.g., according to the method of FIG. 13. In some exemplary embodiments, the alert may not be assigned to be final, but the final or ending stage of the AR view generation may be configured to ensure that the alert is entirely visible. In some exemplary embodiments, the final stage may obtain output overlays from the layers and may be combine the overlays to create the AR display. In some exemplary embodiments, the final stage may include ensuring that the alert is visible and unmodified in the AR display, that the object to which the alert relates is visible and unmodified, or the like.

In some exemplary embodiments, output alerts of real-world layers may have priority over other overlays in the final output, and in some cases, they may cancel at least some of the AR effects that were added by one or more skins. For example, an application may warn a person that is allergic to peanuts that a bag of snacks that is detected includes peanuts. In some cases, the peanut warning may cancel any processing that was done to the bag of snacks, even if modification to the bag of snacks were performed as final unmodifiable changes. In some cases, the final output of all layers may be examined to ensure that the alerted object is not hidden and that the warning or any other sign is visible.

Figure 16:
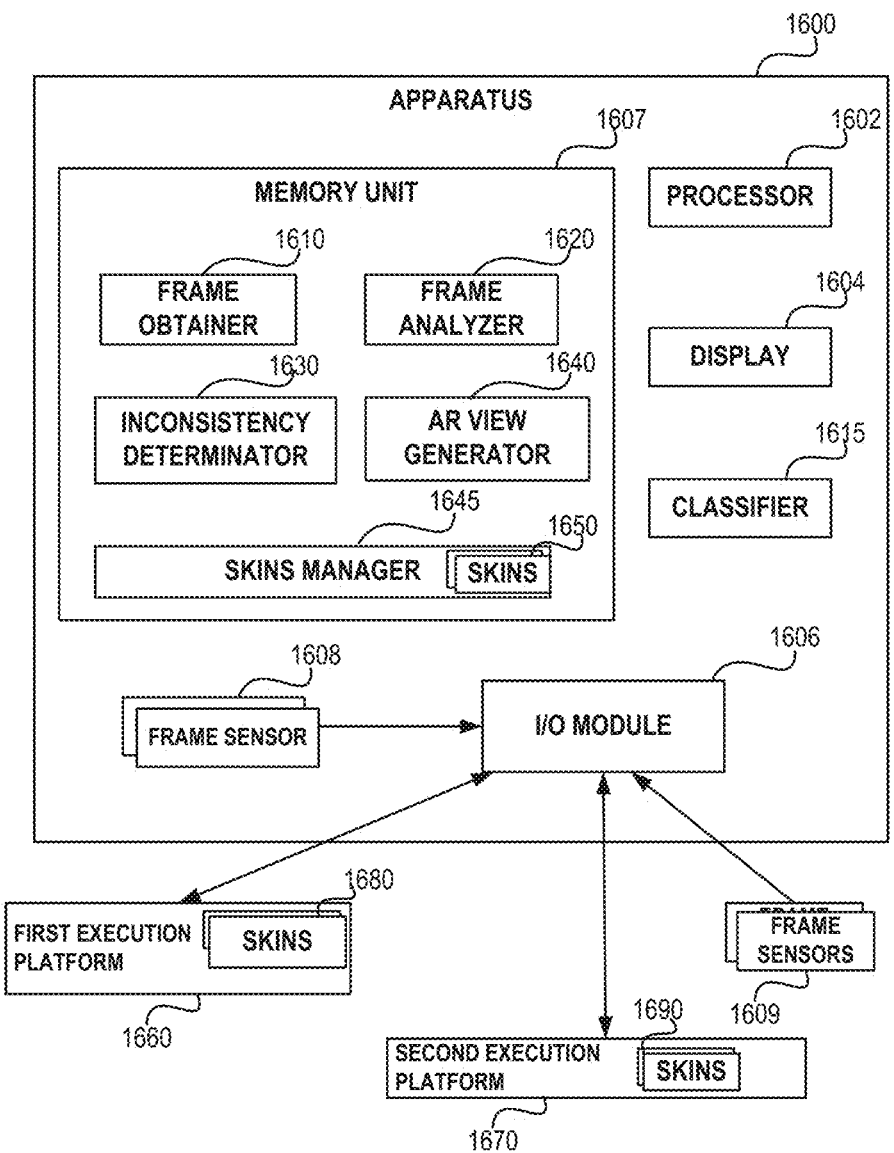
FIG. 16 shows an apparatus, in accordance with some exemplary embodiments of the disclosed subject matter.

Referring now to FIG. 16 showing an apparatus, in accordance with some exemplary embodiments of the disclosed subject matter.

In some exemplary embodiments, Apparatus 1600 may comprise Processor 1602. Processor 1602 may be a Central Processing Unit (CPU), a microprocessor, an electronic circuit, an Integrated Circuit (IC) or the like. Additionally or alternatively, Apparatus 1600 can be implemented as firmware written for or ported to a specific processor such as Digital Signal Processor (DSP) or microcontrollers or can be implemented as hardware or configurable hardware such as Field Programmable Gate Array (FPGA) or Application Specific Integrated Circuit (ASIC). Processor 1602 may be utilized to perform computations required by Apparatus 1600 or any of its subcomponents.

In some exemplary embodiments, Apparatus 1600 may comprise a Frame Sensor 1608. In some exemplary embodiments, Frame Sensor 1608 may include one or more imaging sensors, cameras, or the like, which may be configured to capture one or more frames. In some cases, Frame Sensor 1608 may be an integral part of an augmented reality devices such as AR glasses worn by the use, or any other AR device. In some cases, Frame Sensor 1608 may be external or internal to Apparatus 1600.

In some exemplary embodiments, Apparatus 1600 may comprise a Display 1604. Display 1604 may display augmented images to a user. The augmented images may be the result of frames captured by Frame Sensor 1608 and processed by Apparatus 1600, e.g., by Processor 1602.

In some exemplary embodiments, Apparatus 1600 may comprise an I/O Module 1606. Apparatus 1600 may utilize I/O Module 1606 as an interface to transmit and/or receive information and instructions between Apparatus 1600 and external I/O devices such as, First Execution Platform 1660, Second Execution Platform 1670, Frame Sensors 1609, or the like. Additionally, or alternatively, I/O Module 1606 may be used by Apparatus 1600 in order to send frames to First Execution Platform 1660, Second Execution Platform 1670, or the like. Additionally, or alternatively, I/O Module 1606 may be utilized in order to obtain overlays from First Execution Platform 1660, Second Execution Platform 1670, or the like.

In some exemplary embodiments, Apparatus 1600 may comprise AR glasses, which may enable to display augmented overlays that combine naturally with the surroundings of the user. In some exemplary embodiments, Apparatus 1600 may comprise a user device with a screen and a camera, such as a camera device, a personal computer, a television, a mobile device, a Tablet, or the like. In such cases, applications in the user device may be used to capture photos or videos, and augment thereto virtual overlays. For example, Apparatus 1600 may comprise a television or portion thereof that obtains television frames from a content source, and utilizes one or more skins to generate and display one or more virtual overlays over the television frames. As another example, Apparatus 1600 may comprise a mobile device application such as the ZOOM™ application that may utilize one or more skins to generate and display one or more virtual overlays over the rendered ZOOM™ videos, e.g., changing a background of a video, changing a human depicted in a video, or the like.

In some exemplary embodiments, First Execution Platform 1660 and Second Execution Platform 1670 may be communicate with I/O Module 1606 of Apparatus 1600, e.g., via a medium such as a wireless or wired network, a Wide Area Network (WAN) such as the Internet, a platform, or the like. For example, I/O Module 1606 may connect with Second Execution Platform 1670 via First Execution Platform 1660. In some exemplary embodiments, First Execution Platform 1660 and Second Execution Platform 1670 may be internal components of Apparatus 1600. In some exemplary embodiments, First Execution Platform 1660 and Second Execution Platform 1670 may be remote cloud servers, edge devices, or the like. For example, First Execution Platform 1660 may be an edge device such as a laptop, and Second Execution Platform 1670 may be a remote cloud server. Apparatus 1600 may utilize First Execution Platform 1660, Second Execution Platform 1670, or any other execution platform, in order to invoke skins thereon and obtain overlay results therefrom. Executing a skin on external execution platforms that are external to Apparatus 1600 may yield power saving results compared to executing the skin locally, e.g., at Apparatus 1600.

In some exemplary embodiments, Apparatus 1600 may comprise at least one Classifier 1615, or may have access thereto. In some exemplary embodiments, Classifier 1615 may comprise one or more classifiers, predictors, execution schedulers, resource allocators, or the like. In some exemplary embodiments, Classifier 1615 may comprise a trained Artificial Neural Network (ANN), a data-driven module, a heuristic-based module, an image processing module, or the like. In some exemplary embodiments, Classifier 1615 may be configured to predict outcomes of skins on objects, to predict one or more estimated execution times of skins, or the like.

In some exemplary embodiments, Apparatus 1600 may comprise a Memory Unit 1607. Memory Unit 1607 may be persistent or volatile. For example, Memory Unit 1607 can be a Flash disk, a Random Access Memory (RAM), a memory chip, an optical storage device such as a CD, a DVD, or a laser disk; a magnetic storage device such as a tape, a hard disk, Storage Area Network (SAN), a Network Attached Storage (NAS), or the like; a semiconductor storage device such as Flash device, memory stick, or the like. In some exemplary embodiments, Memory Unit 1607 may retain program code to activate Processor 1602 to perform acts associated with any of the steps shown in FIGS. 2-4 and 6-15.

In some exemplary embodiments, Skins 1650 may be executed locally in Memory Unit 1607 or remotely on execution platforms such as First Execution Platform 1660, Second Execution Platform 1670, or the like. In some exemplary embodiments, Skins 1650 may be controlled by Skins Manager 1645, which may be configured to identify for each frame which skins of Skins 1650 are registered thereto, in what order, or the like.

The components detailed below may be implemented as one or more sets of interrelated computer instructions, executed for example by Processor 1602 or by another processor. The components may be arranged as one or more executable files, dynamic libraries, static libraries, methods, functions, services, or the like, programmed in any programming language and under any computing environment.

In some exemplary embodiments, Memory Unit 1607 may comprise a Frame Obtainer 1610. Frame Obtainer 1610 may obtain one or more subsequent frames from Frame Sensor 1608, from Frame Sensor 1609, from a remote cloud server, from an edge device, or the like.

In some exemplary embodiments, Memory Unit 1607 may comprise a Frame Analyzer 1620. Frame Analyzer 1620 may be configured to perform one or more pre-processing calculation of the frame, for example, to analyze frames in order to identify objects therein, e.g., via object recognition techniques, to perform facial recognition, to determine whether one or more depicted objects are artificial or real, to determine types of objects comprised by the frame, to determine a point of fixation of the user in the frame, or the like. In some exemplary embodiments, Frame Analyzer 1620 may provide its initial processing results to Skins Manager 1645.

In some exemplary embodiments, Memory Unit 1607 may comprise a Skins Manager 1645. In some exemplary embodiments, Skins Manager 1645 may be configured to obtain from Frame Analyzer 1620 frame information and identify one or more skins from Skins 1650 that are registered on each object in the frame. In some exemplary embodiments, Skins Manager 1645 may be configured to schedule executions of skins that are registered to a same object, to determine execution platforms for each layer, to determine whether or not speculative execution should be performed for two or more skins, to determine whether shadowing should be performed, to determine whether a reduced version of the skins should be provided, to filter one or more objects, or the like.

In some exemplary embodiments, Skins Manager 1645 may be configured to schedule execution of one or more of Skins 1650 that are registered on a same object, in parallel. For example, two or more skins may be executed in a non-sequential manner at Apparatus 1600 or at any other one or more platforms, e.g., First Execution Platform 1660 or Second Execution Platform 1670, regardless of the defined execution order between the skins. In some exemplary embodiments, Skins Manager 1645 may determine an execution schedule for skins based on predictions from Classifier 1615. In case results from Classifier 1615 indicate that two or more skins will have consistent overlays when processed non-sequentially, Skins Manager 1645 may schedule non-sequential execution for the skins, and vice versa.

In some exemplary embodiments, Skins Manager 1645 may be configured to distribute the execution of Skins 1650 to one or more execution platforms, devices, or the like. In some exemplary embodiments, Skins 1650 may be executed locally at Apparatus 1600, on one or more edge devices such as First Execution Platform 1660, on one or more remote external platforms such as Second Execution Platform 1670, or the like. For example, Skins Manager 1645 may be configured to determine a first skin in Skins 1650 to be executed locally by Apparatus 1600, a second skin in Skins 1680 to be executed on First Execution Platform 1660, a third skin in Skins 1690 to be executed on Second Execution Platform 1670, or the like.

In some exemplary embodiments, Apparatus 1600 may comprise Inconsistency Determinator 1630. Inconsistency Determinator 1630 may be configured to obtain two or more overlays that were generated in a non-sequential execution, and determine whether the overlays are inconsistent, have conflicting pixels, or the like. Inconsistency Determinator 1630 may determine that overlays are inconsistent in case that they are overlapping in pixels, in object areas, in frame regions, modify a semantic meaning of each other, or the like.

In some exemplary embodiments, upon identifying an inconsistency, Inconsistency Determinator 1630 may be configured to determine whether the inconsistency is minor and can be efficiently amended, or whether the inconsistency is major, and the second skin is to be regenerated based on the first overlay. Inconsistency Determinator 1630 may utilize Classifier 1615 in order to classify inconsistencies as minor or major, may utilize a threshold, may determine whether the resources are sufficient for an amendment, or the like.

In some exemplary embodiments, Skins Manager 1645 may be configured to reorder an execution order of Skins 1650, e.g., at an at least partially idle platform. In some exemplary embodiments, an alternative execution order may be determined randomly, based on Classifier 1615 indicating an order that is estimated to reduce resource utilization, or the like. In some exemplary embodiments, Inconsistency Determinator 1630 may determine whether the resulting overlay from the original order of execution is identical to the resulting overlay from the alternative execution order. In case they are identical, and the alternative execution order is determined to reduce resource utilization, the alternative execution order may be replaced with the original order of execution. In some exemplary embodiments, Skins Manager 1645 may be configured to obtain priorities of skins and exclude low priority skins in case the resources are insufficient for executing all of Skins 1650. In some exemplary embodiments, Skins Manager 1645 may be configured to reduce resolutions of one or more frame portions in order to reduce an execution time.

In some exemplary embodiments, Skins Manager 1645 may be configured to schedule executions of private tasks on trusted devices, e.g., Apparatus 1600 or a trusted edge device, and schedule executions of non-private tasks on any available platform. In some exemplary embodiments, Skins Manager 1645 may be configured to determine a schedule for skin execution based on one or more privacy constraints indicating whether a trusted device is required, one or more technical constraints indicating what execution platforms have sufficient data or software to execute a skin, or the like. In some exemplary embodiments, Skins Manager 1645 may be configured to determine the schedule to comply with constraints while reducing a latency, a CPU usage, a battery power usage, or the like.

In some exemplary embodiments, Apparatus 1600 may comprise an AR View Generator 1640. AR View Generator 1640 may be configured to obtain overlays generated by Skins 1650, e.g., according to Skins Manager 1645. AR View Generator 1640 may be configured to merge the overlays in order to form the AR view and to provide the AR view to Display 1604, e.g., while ensuring real-world alerts and final objects are not modified, units are retained fully, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method performed by an Augmented Reality (AR) system, wherein the AR system is configured to provide an AR view, wherein the AR system comprises an AR device and at least one frame sensor, wherein the AR system is configured to utilize a first skin and a second skin, each of which is configured to provide an augmented overlay to be used by the AR system in determining the AR view, wherein the first and second skins are configured to process an augmented display according to a skin execution order, wherein the skin execution order defines that the second skin processes an augmented overlay provided by the first skin, the method comprising:
   obtaining a frame from the at least one frame sensor;
   executing the first skin on the frame or portion thereof to obtain a first overlay;
   executing the second skin on the frame or portion thereof to obtain a second overlay, wherein said executing the second skin is performed without providing the first overlay to the second skin;
   determining whether the second overlay can be utilized for providing the AR view;
   generating the AR view based on the first overlay and based on said determining whether the second overlay can be utilized for providing the AR view; and
   providing the AR view via the AR device.

2. The method of claim 1, wherein said determining whether the second overlay can be utilized for providing the AR view comprises determining whether the first and second overlays are inconsistent with each other.

3. The method of claim 2, wherein upon determining that the first and second overlays are inconsistent with each other, modifying the second overlay based on the first overlay to obtain a modified second overlay, wherein said generating the AR view comprises utilizing the modified second overlay.

4. The method of claim 3, wherein said modifying the second overlay comprises at least one of: amending pixels of the second overlay, and regenerating the second overlay by executing the second skin on the first overlay.

5. The method of claim 2, wherein upon determining that the first and second overlays are not inconsistent with each other, utilizing the second overlay, without modifications, for generating the AR view.

6. The method of claim 2, wherein said determining whether the first and second overlays are inconsistent with each other comprises utilizing first metadata of the first overlay and second metadata of the second overlay.

7. The method of claim 2, wherein said determining whether the first and second overlays are inconsistent with each other comprises identifying overlapping pixels between the first and second overlays.

8. The method of claim 1,
   wherein said determining whether the second overlay can be utilized for providing the AR view comprises:
   determining, based on the first overlay, that the second overlay is inconsistent with the first overlay;
   wherein said generating comprises executing again the second skin based on the frame and on the first overlay to obtain a new second overlay; and
   wherein said generating the AR overlay for the frame is based on the new second overlay.

9. The method of claim 1, wherein said executing the first skin and said executing the second skin are performed in parallel.

10. The method of claim 1, wherein said executing the first skin is performed at a first execution platform and said executing the second skin is performed at a second execution platform.

11. The method of claim 1 comprising determining, based on a predictor, whether to perform said executing the second skin, wherein the predictor is configured to predict a probability that the first overlay will be inconsistent with the second overlay.

12. The method of claim 11 comprising performing a partial execution of said executing the second skin, wherein said partial execution comprises generating a partial second overlay that is predicted to have a low probability of being inconsistent with the first overlay, wherein said generating the AR view comprises utilizing the first overlay, utilizing the partial second overlay, and completing execution of the second overlay based on the first overlay.

13. The method of claim 1,
   wherein said executing the first skin is performed at a first execution platform;

wherein the method further comprises executing the first skin on a second execution platform to obtain a shadow overlay;

wherein said executing the second skin is performed at the second execution platform based on the shadow overlay.

14. The method of claim 1, further comprising:

obtaining a first order of execution, wherein the first order of execution defines an order of skin executions of a plurality of skins comprising the first and second skins, wherein the plurality of skins are registered on a same object in the frame, wherein the first order of execution comprises the skin execution order;

obtaining a second order of execution between the plurality of skins, wherein the second order of execution defines that the second skin is to be executed before the first skin;

executing the plurality of skins according to the first order of execution to obtain a first result;

executing the plurality of skins according to the second order of execution to obtain a second result; and based on a determination that the first and second results are identical, determining that the first order of execution is replaceable with the second order of execution.

15. The method of claim 1 comprises:

performing object recognition on the frame to obtain one or more object types;

determining a refresh timeframe;

obtaining one or more subsequent frames from the at least one frame sensor during the refresh timeframe;

estimating that the one or more subsequent frames comprise the one or more object types; and utilizing the one or more object types for the processing the one or more subsequent frames without performing object recognition to the one or more subsequent frames during the refresh timeframe.

16. The method of claim 1 comprising:

reducing a resolution level of the frame prior to said executing the first skin, thereby providing to the first skin a low-resolution frame;

executing the first skin on the low-resolution frame; and restoring the resolution level after said executing the first skin.

17. The method of claim 1 comprising distributing execution to an edge device in proximity of the AR device, wherein the edge device has one or more sensors, wherein said distributing comprises providing partial information of the frame to the edge device, thereby enabling the edge device to complete the partial information based on the one or more sensors.

18. The method of claim 1 comprising:

determining that the first skin is a real-world skin that utilizes real-world frames, and that the second skin is not a real-world skin, wherein the first overlay from the first skin comprises a real-world alert of a real-world object in the frame, and determining whether to utilize the second overlay based on whether the second overlay is inconsistent with the alert or with the real-world object.

19. The method of claim 1 comprising:

reducing a resolution level of a first portion the frame prior to executing the first and second layers on the frame;

obtaining a subsequent frame from the at least one frame sensor; and reducing a resolution level of a second portion the subsequent frame prior to executing layers on the subsequent frame, wherein the first and second portions comprise different coordinate areas in a frame structure.

20. The method of claim 1 comprising:

segmenting the frame into two or more patches;

distributing executions of the two or more patches to two or more execution platforms based on an execution schedule;

obtaining from the two or more execution platforms two or more corresponding overlays; and combining the corresponding overlays to generate the AR view.

* * * * *